United States Patent
Lin et al.

(10) Patent No.: US 9,070,149 B2
(45) Date of Patent: Jun. 30, 2015

(54) MEDIA GIFTING DEVICES AND METHODS

(75) Inventors: Gloria Lin, San Ramon, CA (US); Amir Mahmood Mikhak, Cambridge, MA (US); Taido Lantz Nakajima, Cupertino, CA (US); Sean Anthony Mayo, Dover, NH (US); Michael Rosenblatt, Campbell, CA (US); Andrew Hodge, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1632 days.

(21) Appl. No.: 12/286,447

(22) Filed: Sep. 30, 2008

(65) Prior Publication Data

US 2010/0082448 A1    Apr. 1, 2010

(51) Int. Cl.
*G06F 21/00* (2013.01)
*G06Q 30/06* (2012.01)
*G06F 21/10* (2013.01)
*G06Q 20/10* (2012.01)
*G06Q 20/12* (2012.01)
*G06Q 20/32* (2012.01)
(Continued)

(52) U.S. Cl.
CPC ............ *G06Q 30/0601* (2013.01); *G06F 21/10* (2013.01); *G06F 2221/0786* (2013.01); *G06Q 20/10* (2013.01); *G06Q 20/1235* (2013.01); *G06Q 20/32* (2013.01); *G06Q 20/3278* (2013.01); *G06Q 30/02* (2013.01); *G06Q 30/06* (2013.01); *G06F 17/3007* (2013.01)

(58) Field of Classification Search
USPC .............................................. 705/50, 51, 52
See application file for complete search history.

(56) References Cited

U.S. PATENT DOCUMENTS

| | | | |
|---|---|---|---|
| 4,701,601 A | 10/1987 | Francini et al. |
| 4,868,376 A | 9/1989 | Lessin et al. |
| 4,929,819 A | 5/1990 | Collins, Jr. |

(Continued)

FOREIGN PATENT DOCUMENTS

| | | |
|---|---|---|
| EP | 1331561 A2 | 7/2003 |
| WO | 02/08863 A2 | 1/2002 |

(Continued)

OTHER PUBLICATIONS

NFC Forum; Near Field Communication and the NFC Forum: The Keys to Truly Interoperable Communications; http://www.nfc-forum.org/resources/white_papers/nfc_forum_marketing_white_paper.pdf; Wakefield, MA, USA 2007.

(Continued)

*Primary Examiner* — Mamon Obeid
(74) *Attorney, Agent, or Firm* — Novak Druce Connolly Bove + Quigg LLP

(57) ABSTRACT

Various techniques are provided for the gifting between multiple electronic devices of media content provided by an online digital media provider. An offer and acceptance of a selected gift file is accomplished between a gifter device and a receiving giftee device using a near-field communication (NFC) connection. If a connection to the online provider is available, the gifter device may transmit a gift request by which the gifter's account is charged for the gift file. Thereafter, a gift file created using DRM keys associated with the giftee's account may be downloaded to the giftee device. If a network connection is unavailable, the giftee device may transfer a locked gift file and a corresponding gift license to the giftee device using a peer-to-peer connection. The giftee device may authenticate the license and unlock the gift file once a connection to the online provider is available.

24 Claims, 38 Drawing Sheets

(51) Int. Cl.
   *G06Q 30/02* (2012.01)
   *G06F 17/30* (2006.01)

(56) References Cited

U.S. PATENT DOCUMENTS

| | | | |
|---|---|---|---|
| 5,239,167 A | 8/1993 | Kipp | |
| 5,276,311 A | 1/1994 | Hennige | |
| 5,540,301 A | 7/1996 | Dumont | |
| 5,917,913 A | 6/1999 | Wang | |
| 6,047,265 A * | 4/2000 | Sugimori | 705/64 |
| 6,175,922 B1 | 1/2001 | Wang | |
| 6,400,270 B1 | 6/2002 | Person | |
| 6,684,269 B2 | 1/2004 | Wagner | |
| 6,694,387 B2 | 2/2004 | Wagner | |
| 6,910,697 B2 | 6/2005 | Varatharajah et al. | |
| 7,089,214 B2 | 8/2006 | Wang | |
| 7,128,274 B2 | 10/2006 | Kelley et al. | |
| 7,216,109 B1 | 5/2007 | Donner | |
| 7,239,877 B2 * | 7/2007 | Corneille et al. | 455/456.3 |
| 7,240,036 B1 | 7/2007 | Mamdani et al. | |
| 7,334,728 B2 | 2/2008 | Williams | |
| 7,376,591 B2 | 5/2008 | Owens | |
| 7,412,411 B2 * | 8/2008 | Horel et al. | 705/26.8 |
| 7,464,050 B1 | 12/2008 | Deaton et al. | |
| 7,555,532 B2 * | 6/2009 | Decasper et al. | 709/217 |
| 7,716,300 B2 * | 5/2010 | Kott et al. | 709/216 |
| 7,723,069 B2 * | 5/2010 | Soll et al. | 435/69.1 |
| 7,783,729 B1 * | 8/2010 | Macaluso | 709/220 |
| 2002/0082931 A1 | 6/2002 | Siegel et al. | |
| 2002/0178088 A1 | 11/2002 | Lurie et al. | |
| 2003/0074265 A1 * | 4/2003 | Oshima | 705/26 |
| 2004/0039702 A1 * | 2/2004 | Blair et al. | 705/43 |
| 2004/0203352 A1 | 10/2004 | Hall et al. | |
| 2005/0116027 A1 | 6/2005 | Algiene et al. | |
| 2005/0119947 A1 * | 6/2005 | Lin | 705/27 |
| 2005/0125343 A1 | 6/2005 | Mendelovich | |
| 2005/0131871 A1 | 6/2005 | Howard et al. | |
| 2005/0222961 A1 | 10/2005 | Staib et al. | |
| 2005/0261988 A1 * | 11/2005 | Horel et al. | 705/27 |
| 2005/0283791 A1 | 12/2005 | McCarthy et al. | |
| 2006/0111944 A1 | 5/2006 | Sirmans et al. | |
| 2006/0143134 A1 * | 6/2006 | So et al. | 705/59 |
| 2006/0161621 A1 * | 7/2006 | Rosenberg | 709/204 |
| 2006/0206582 A1 | 9/2006 | Finn | |
| 2006/0213972 A1 | 9/2006 | Kelley et al. | |
| 2006/0243609 A1 | 11/2006 | Cole et al. | |
| 2006/0266822 A1 | 11/2006 | Kelley et al. | |
| 2006/0287004 A1 | 12/2006 | Fuqua | |
| 2006/0293967 A1 * | 12/2006 | Deluca et al. | 705/26 |
| 2007/0022058 A1 | 1/2007 | Labrou et al. | |
| 2007/0038576 A1 * | 2/2007 | Lee | 705/59 |
| 2007/0143189 A1 * | 6/2007 | Mitchem | 705/26 |
| 2007/0150369 A1 | 6/2007 | Zivin | |
| 2007/0155307 A1 | 7/2007 | Ng et al. | |
| 2007/0161402 A1 | 7/2007 | Ng et al. | |
| 2007/0172065 A1 * | 7/2007 | Lee et al. | 380/259 |
| 2007/0190939 A1 | 8/2007 | Abel | |
| 2007/0198434 A1 * | 8/2007 | Jang et al. | 705/67 |
| 2007/0205275 A1 | 9/2007 | Nicola et al. | |
| 2007/0228179 A1 | 10/2007 | Atkinson | |
| 2007/0235539 A1 | 10/2007 | Sevanto et al. | |
| 2007/0255652 A1 | 11/2007 | Tumminaro et al. | |
| 2007/0265033 A1 | 11/2007 | Brostrom | |
| 2007/0276767 A1 * | 11/2007 | Kim et al. | 705/77 |
| 2007/0278290 A1 | 12/2007 | Messerges et al. | |
| 2007/0299780 A1 * | 12/2007 | Vanska et al. | 705/59 |
| 2008/0005195 A1 | 1/2008 | Li | |
| 2008/0052226 A1 * | 2/2008 | Agarwal et al. | 705/39 |
| 2008/0052243 A1 | 2/2008 | Narayanaswami et al. | |
| 2008/0059323 A1 | 3/2008 | Cheng et al. | |
| 2008/0113614 A1 | 5/2008 | Rosenblatt | |
| 2008/0134032 A1 * | 6/2008 | Pirnack et al. | 715/700 |
| 2008/0154734 A1 | 6/2008 | Fernandez et al. | |
| 2008/0170701 A1 * | 7/2008 | Matsuo et al. | 380/281 |
| 2008/0189188 A1 * | 8/2008 | Morgenstern | 705/26 |
| 2008/0249874 A1 * | 10/2008 | Seo | 705/14 |
| 2008/0259829 A1 | 10/2008 | Rosenblatt | |
| 2008/0261528 A1 | 10/2008 | Rosenblatt | |
| 2008/0261529 A1 | 10/2008 | Rosenblatt | |
| 2008/0294453 A1 * | 11/2008 | Baird-Smith et al. | 705/1 |
| 2008/0294977 A1 * | 11/2008 | Friedman et al. | 715/224 |
| 2008/0301007 A1 * | 12/2008 | Horel et al. | 705/27 |
| 2009/0007216 A1 * | 1/2009 | Ku et al. | 725/142 |
| 2009/0048940 A1 * | 2/2009 | Hill et al. | 705/26 |
| 2009/0094046 A1 * | 4/2009 | Hyman et al. | 705/1 |
| 2009/0132383 A1 * | 5/2009 | Piepenbrink et al. | 705/26 |
| 2009/0164776 A1 * | 6/2009 | Tuoriniemi | 713/158 |
| 2009/0204510 A1 * | 8/2009 | Hwang | 705/27 |
| 2009/0216653 A1 * | 8/2009 | Sanguinetti et al. | 705/26 |
| 2009/0240593 A1 * | 9/2009 | Kelly et al. | 705/26 |
| 2009/0258678 A1 * | 10/2009 | Chava et al. | 455/557 |
| 2009/0259562 A1 * | 10/2009 | Choi et al. | 705/26 |
| 2009/0317065 A1 * | 12/2009 | Fyock et al. | 386/124 |
| 2009/0327129 A1 * | 12/2009 | Collas et al. | 705/41 |
| 2010/0017278 A1 * | 1/2010 | Wilen et al. | 705/14.2 |
| 2010/0043060 A1 * | 2/2010 | Reuzel et al. | 726/4 |
| 2010/0161450 A1 * | 6/2010 | Hsu et al. | 705/27 |
| 2010/0235257 A1 * | 9/2010 | Bentue-Ferrer et al. | 705/27 |

FOREIGN PATENT DOCUMENTS

| | | |
|---|---|---|
| WO | 2008/112497 A1 | 9/2008 |
| WO | 2009/018255 A2 | 2/2009 |

OTHER PUBLICATIONS

Near Field Communication in the real world part I; Turning the NFC promise into profitable, everyday applications; http://www.nfc-forum.org/resources/white_papers/Innovision_whitePaper1.pdf ; Innovation Research & Technology plc; Gloucestershire, United Kingdom.
Near Field Communication in the real world part II, Using the right NFC tag type for the right NFC application; http://www.nfc-forum.org/resources/white_papers/Innovision_whitePaper2.pdf ; Innovation Research & Technology plc; Gloucestershire, United Kingdom.
Near Field Communication in the real world part III, Moving to System on Chip (SoC) integration; http://www.nfc-forum.org/resources/white_papers/Innovision_whitePaper3.pdf ; Innovation Research & Technology plc; Gloucestershire, United Kingdom 2007.
Ricker Thomas; Nokia's 6212 with Bluetooth NFC: Let the Pairing revolution being!; http://www.engadget.com/2008/04/15/nokias-6212-with-bluetooth-nfc-let-the-pairing-revolution-begi/; Engadget; 2008.
NFC trial in NYC enables merchant and transit payment via cell phones; http://www .contactlessnews.com/2006/12/14/nfc-trial-in-nyc-enables-merchant-and-transit-payments-via-cell-phones; Citi/ATT/MasterCard/Nokia run trial in NYC with MTA et al.; Contactless News; 2008.
Port Authority, NJ Transit to test contactless cards; http://www.contactlessnews.com/2008/02/25/port-authority-nj-transit-to-test-contactless-cards/; Port Authority/NJ Transit run compatible trial with NYC; Contactless News 2008.
Bart NFC trial first to use mobile phones to pay for fares, food; http://www.contactlessnews.com/2008/01/29/bart-nfc-trial-first-to-use-mobile-phones-to-pay-for-fares-food/; Bart et al. run trial for automated food and transit payments; Contactless News 2008.
New NFC trial launched in Spokane; U.S. Bank/MasterCard run trial in Spokane, WA; http://www.contactlessnews.com/2008/01/28/new-nfc-trial-launched-in-spokane/; Contactless News 2008.
K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

* cited by examiner

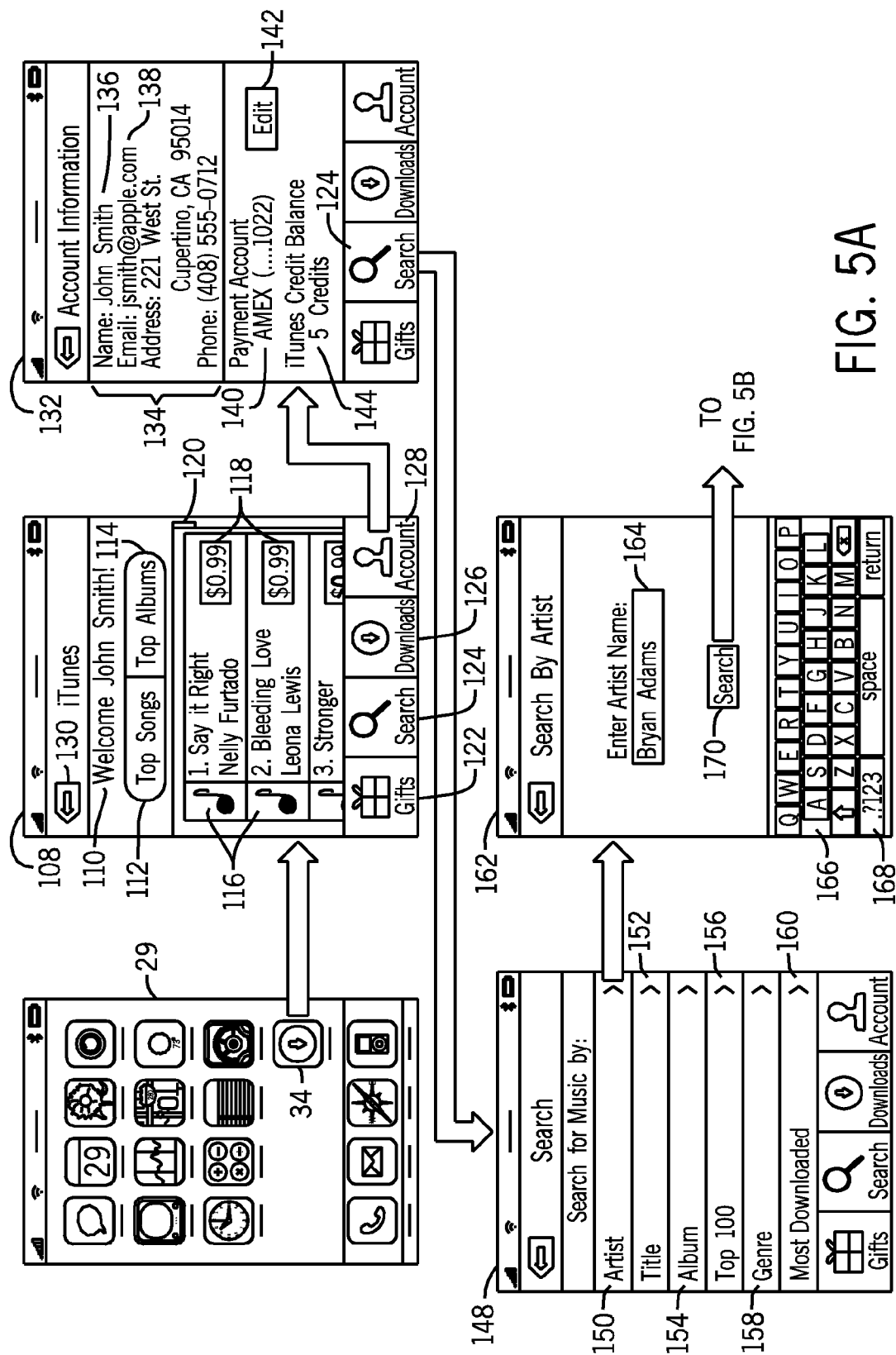

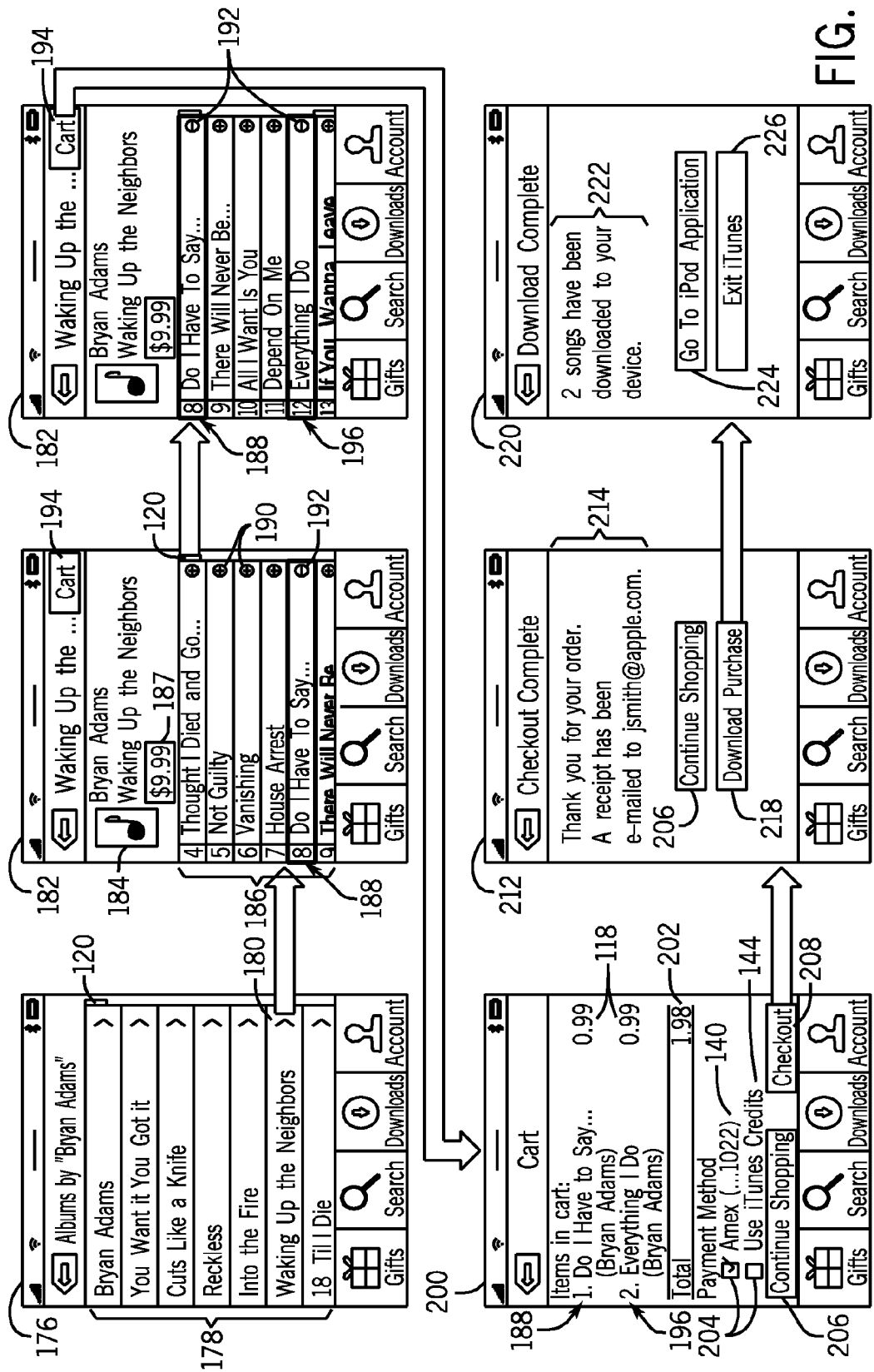

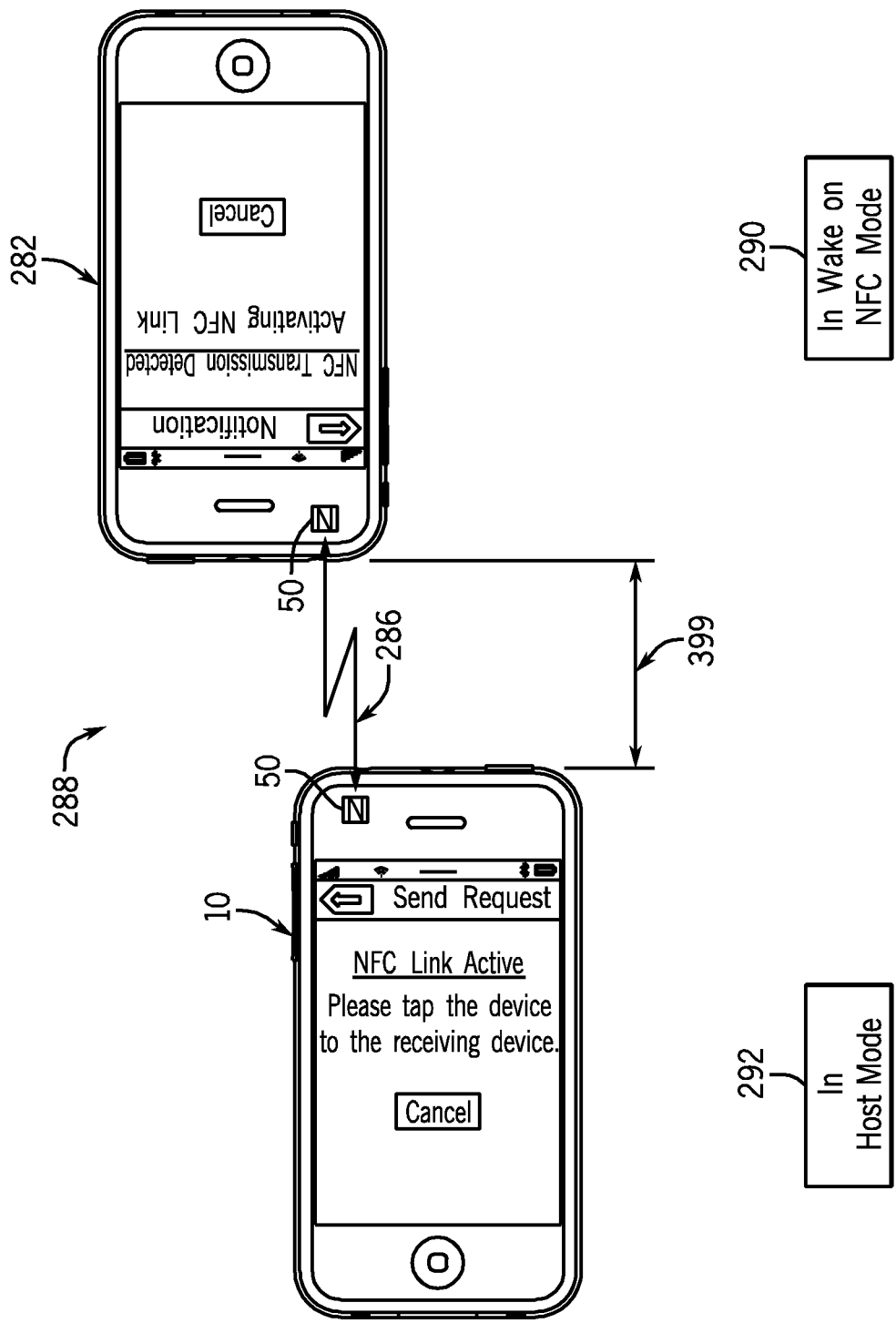

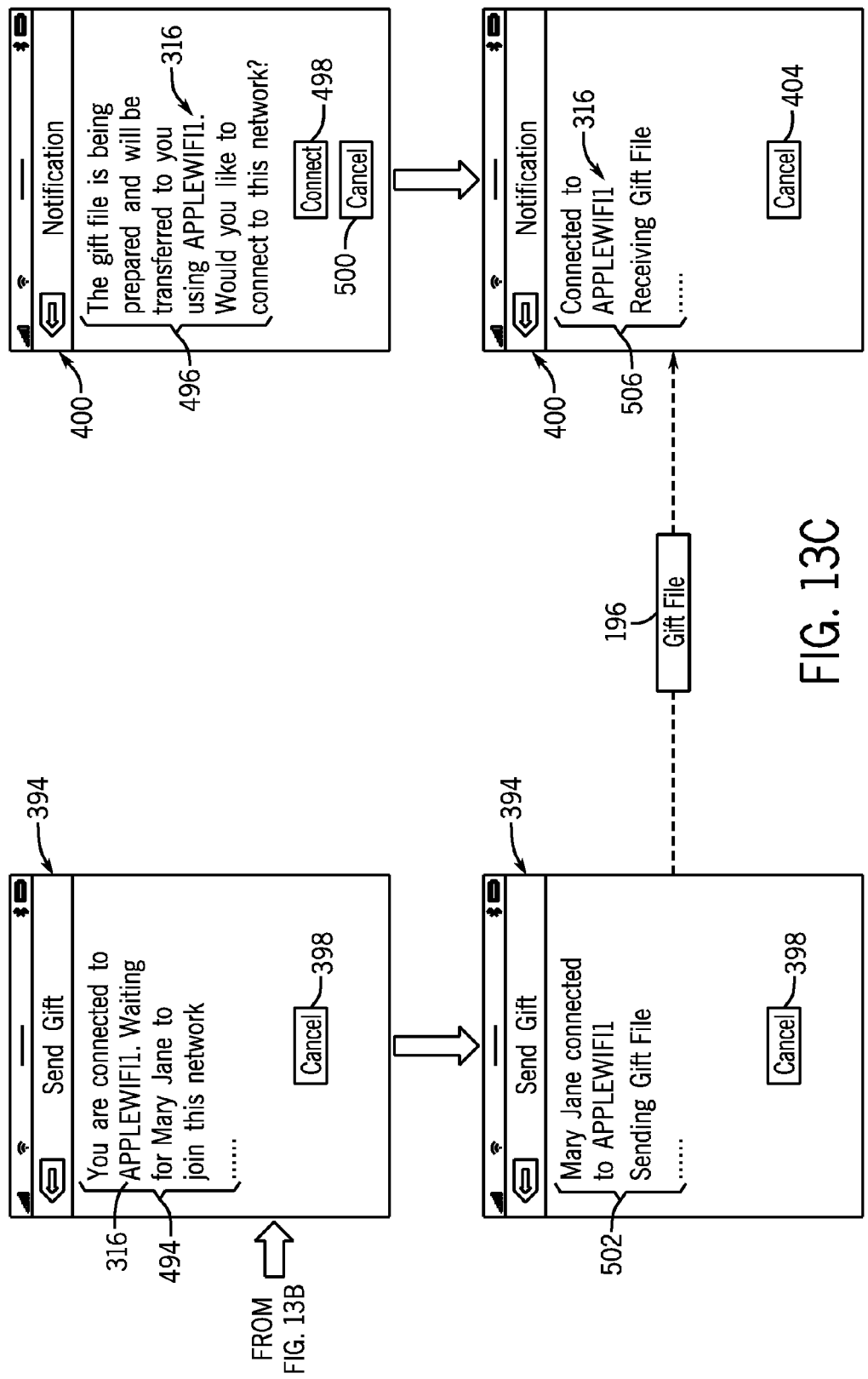

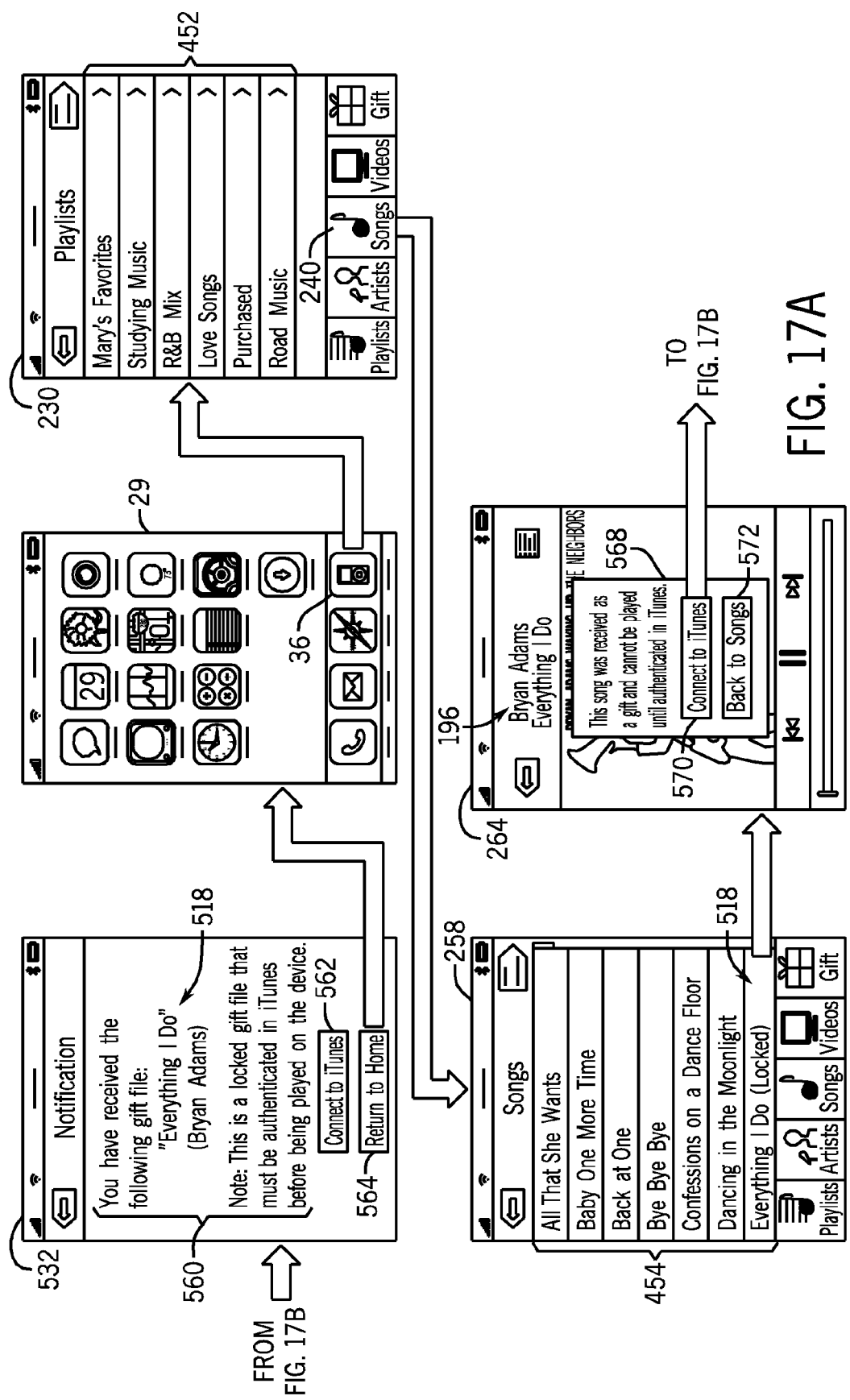

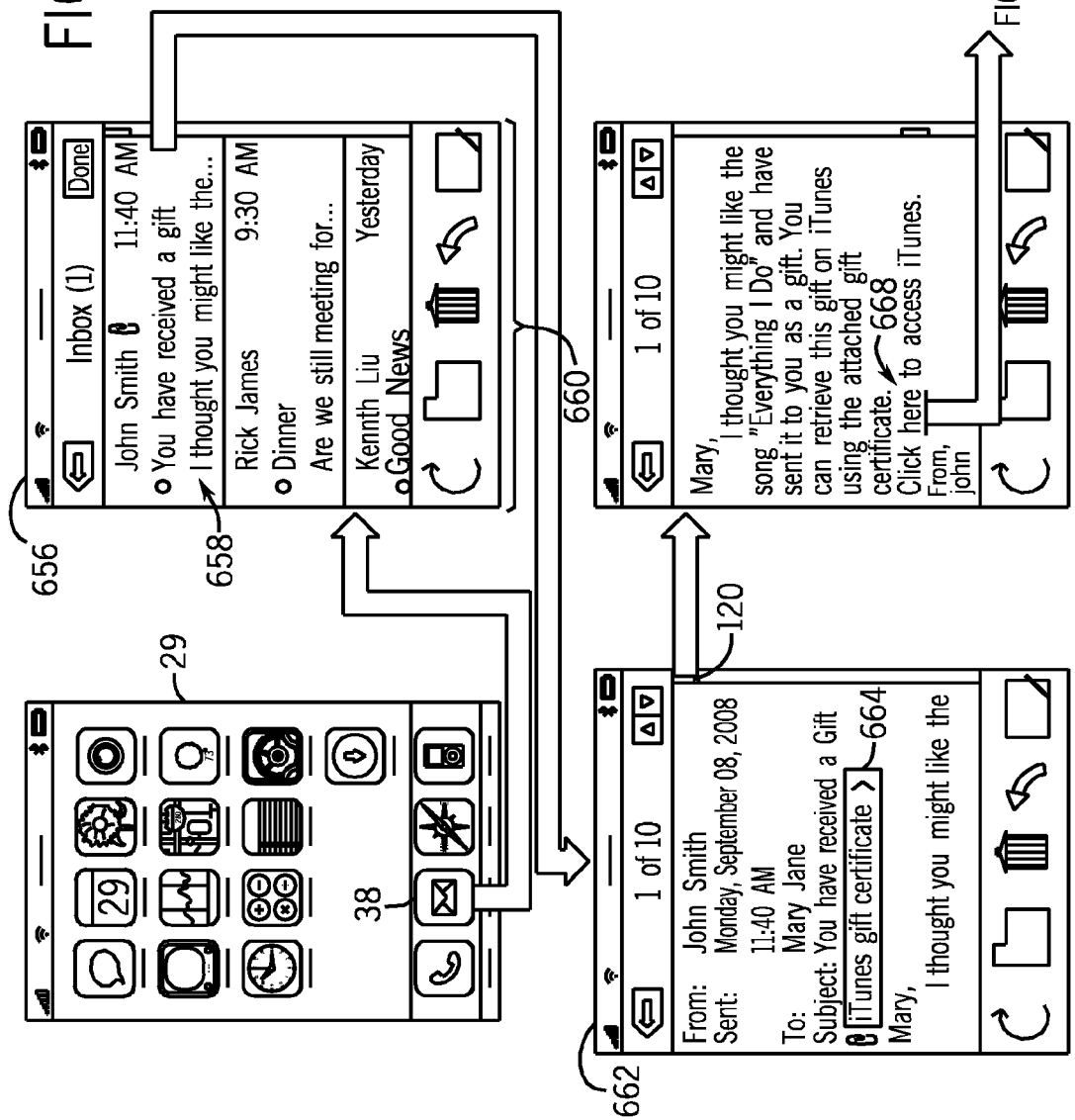

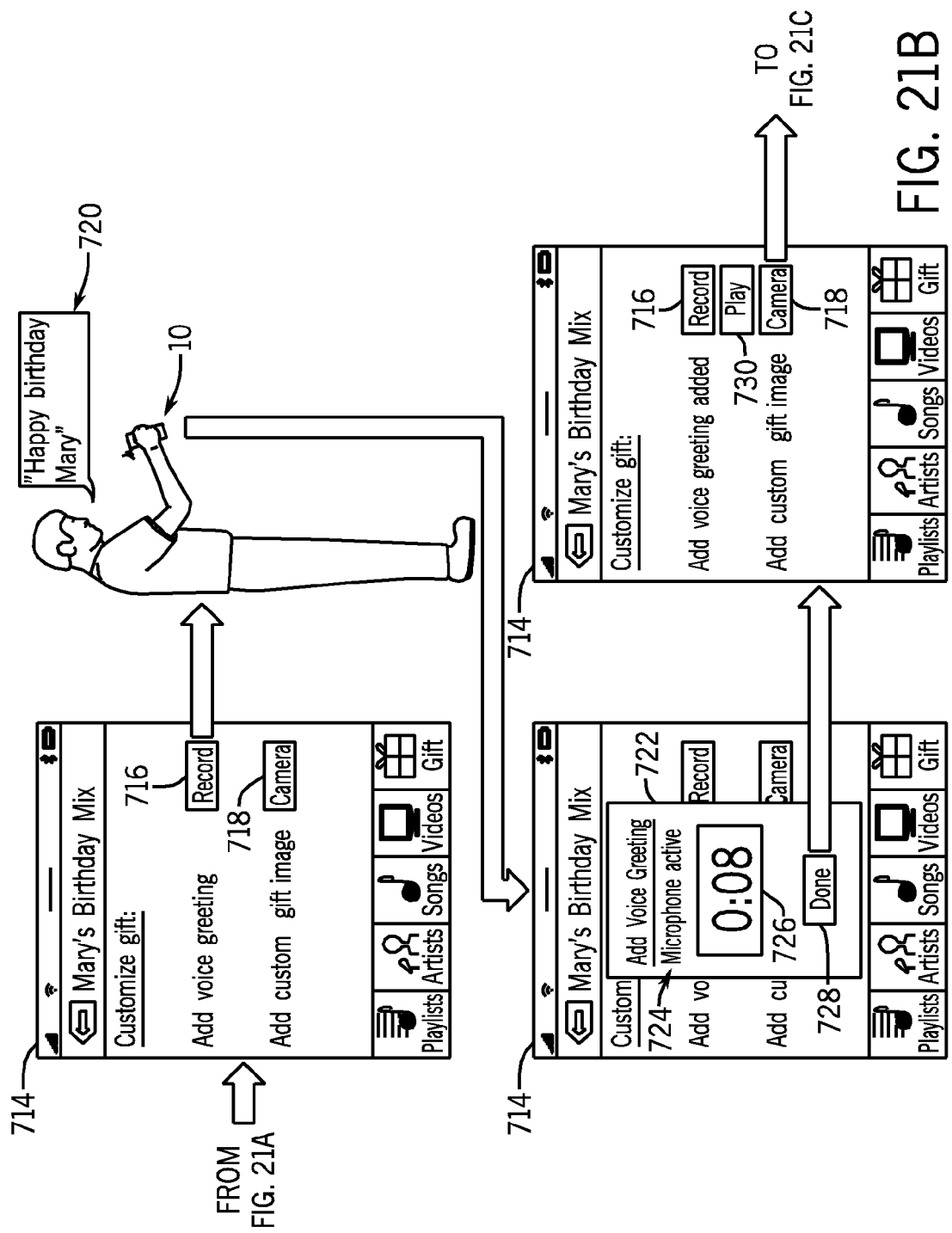

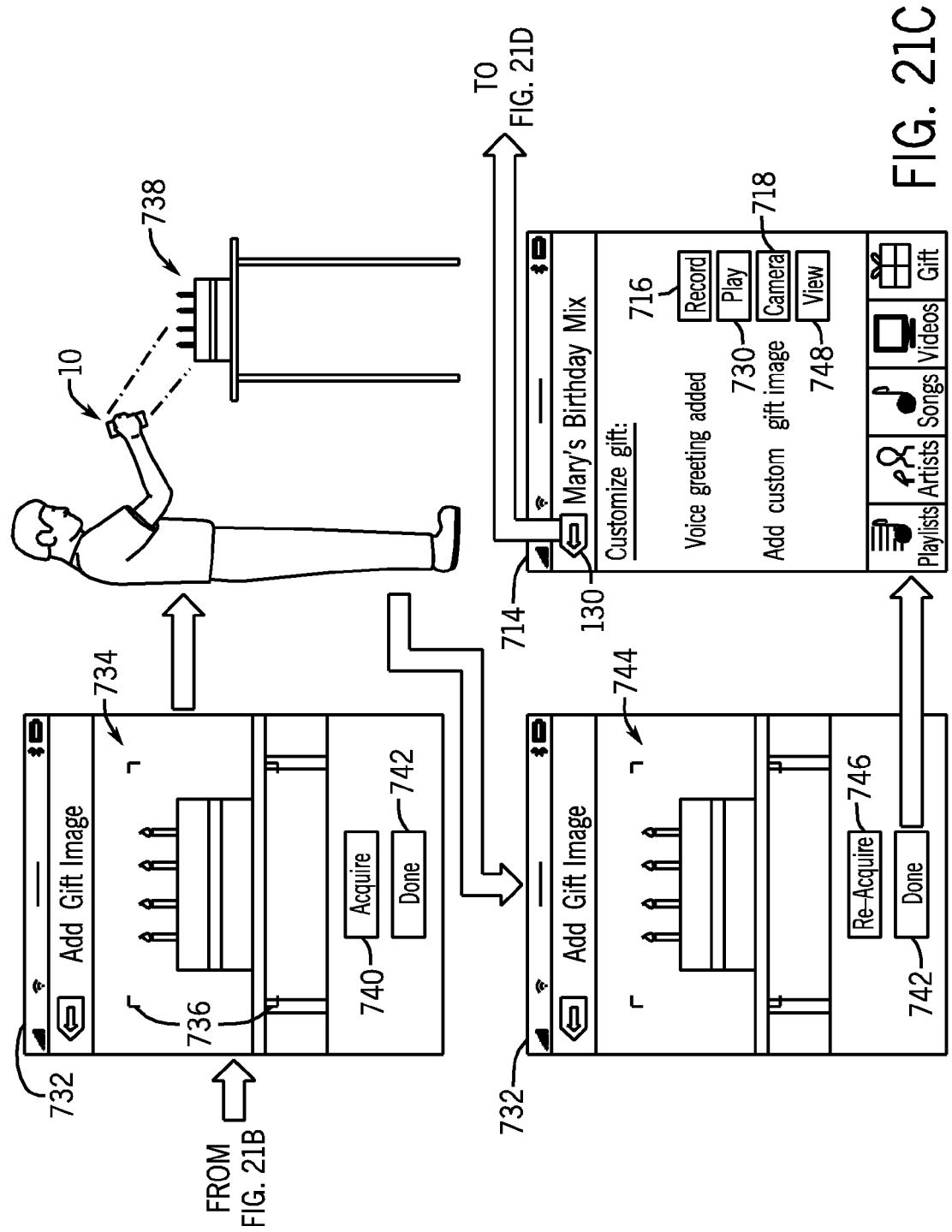

MEDIA GIFTING DEVICES AND METHODS

BACKGROUND

1. Technical Field

Embodiments of the present disclosure relate generally to the gifting of digital media content and, more particularly, to various systems, methods, and electronic devices configured to perform the gifting of digital media content.

2. Description of the Related Art

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, the declining popularity of audio cassette tapes and compact discs in conjunction with the growing popularity of electronic devices capable of playing various forms of digital media content has led to a dramatic increase in the demand for downloadable digital media content. Many such digital media player devices, particular portable devices, are currently available on the market and support a wide variety of file formats that digital media files might take. For instance, downloadable digital music files are commonly provided in the following file formats, just to provide a few examples: MP3, AIFF, WAV, MPEG-4, AAC, etc.

Thus, as a result of market demands, various online digital media providers have been established and currently exist as a retailer for downloadable digital media content. Often times, downloaded media content may be received directly, on a digital media player device and immediately played back, listened to, or viewed by a user of the device. In other instances, the downloaded media content may be received on a desktop computer and subsequently transferred to a digital media player for playback. To provide one example, an online digital media provider offering the above mentioned services may be the iTunes® online service, operated by Apple Inc. of Cupertino, Calif.

While the download of digital media files directly to digital media player devices from an online digital media content provider may offer a convenient and simple solution to store various digital media files in a common location for playback on demand, the transfer of such files between individuals is often times problematic due to the nature of copyright protection. For example, downloadable digital media content may be protected using a variety of digital rights management techniques, which may generally refer to access control methods used by device manufacturers, content publishers/providers, and copyright holders in order to limit usage and distribution of digital media content. This ensures that the copyright holder's rights are honored and that the copyright holder is compensated for each sale of a copyrighted digital work. Thus, the transfer of a copyright protected digital media file from one device to a separate receiving device may oftentimes result in the transferred file being unplayable or inaccessible on the receiving device.

SUMMARY

Certain aspects of embodiments disclosed herein by way of example are summarized below. It should be understood that these aspects are presented merely to provide the reader with a brief summary of certain forms that any implementation disclosed and/or claimed herein might take and that these aspects are not intended to limit the scope of the present disclosure. Indeed, any implementation disclosed and/or claimed herein may encompass a variety of aspects that may not be set forth below.

The present disclosure generally relates to various techniques for gifting downloadable media files provided by an online digital media provider between multiple electronic devices. In accordance with one embodiment, a first device may initiate a gifting process by selecting one or more media files to be gifted to a receiving device. For example, in initiating the gifting the process, the user of the initiating device may authorize a gift charge to be applied to the user's account associated with the online digital media provider. Thereafter, a gift offer may be transmitted from the initiating device to the receiving device using a close range communication protocol, such as near-field communication (NFC) connection. The receiving device, upon receiving the offer, may transmit an acceptance message using the NFC connection, in which the receiver's account information associated with the online digital media provider is included and transferred to the initiating device.

The initiating device may then transmit a gift request to the online digital media provider. The online digital media provider may then process the gift request to charge the initiator's account for the gifting of the selected file. Thereafter, a gift file may be created using the receiver's digital media protection keys, such as a DRM key, such the gift file may be authorized for playback on the receiving device in accordance with copyright regulations. The gift file may then be downloaded to the receiving device, upon which the user of the receiving device may playback the gifted file. In one implementation, the gift file may be created by a server operated by the online digital media provider. In other implementations, the online digital media provider may provide the receiver's DRM key to the initiating device and the initiating device may be delegated the task of generating the gift file.

Further implementations of the present techniques are also provided in which after the offer and acceptance of the gift file, the initiating device is unable to establish a connection with the online digital media provider to transmit a gift request. In such situations, the initiating device may instead generate a locked gift file and a gift license to be transmitted directly to the receiving device. The locked gift file may not be played on the receiving device until a connection is later established with the online digital media provider, and the gift license is authenticated, whereby the initiator's account is charged the gift, and the locked gift file is unlocked for playback on the receiving device. The present techniques also provide for the gifting of media files where the initiating and receiving devices are in remote locations, such as by using electronic gift certificates generated by the initiating device and sent by an e-mail communication to the receiving device. The electronic gift certificate may then be redeemed by the receiving device with the online digital media provider, after which the selected gift file corresponding to the electronic gift certificate may be downloaded to the receiving device. The present techniques further provide for the gifting of multiple media files in a single transaction, as well as the customization and personalization of such gifts.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein:

FIGS. 5A and 5B show a plurality of screen images that may be displayed on the device of FIG. 1 illustrating a method for connecting to the online service of FIG. 4 and selecting a media file for purchase;

FIG. 10C illustrates the establishment of the communication path of FIG. 10B;

FIG. 13C shows a plurality of screen images depicting the transmission of the gift file created in FIG. 13B from the gifter device to the giftee device;

FIG. 17A shows a plurality of screen images depicting how the locked gift file from FIG. 16B must be authenticated with the online service prior to being played back on the giftee device;

FIGS. 20A-20C show a plurality of screen images that may be displayed on the giftee device depicting a process for redeeming the electronic gift certificate with the online service and receiving a gift file in accordance with the gifting process of FIG. 18;

FIGS. 21A-21D show a plurality of screen images depicting various techniques for personalizing a playlist having a plurality of media files to be gifted to a giftee device;

DETAILED DESCRIPTION OF SPECIFIC EMBODIMENTS

One or more specific embodiments of the present techniques will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
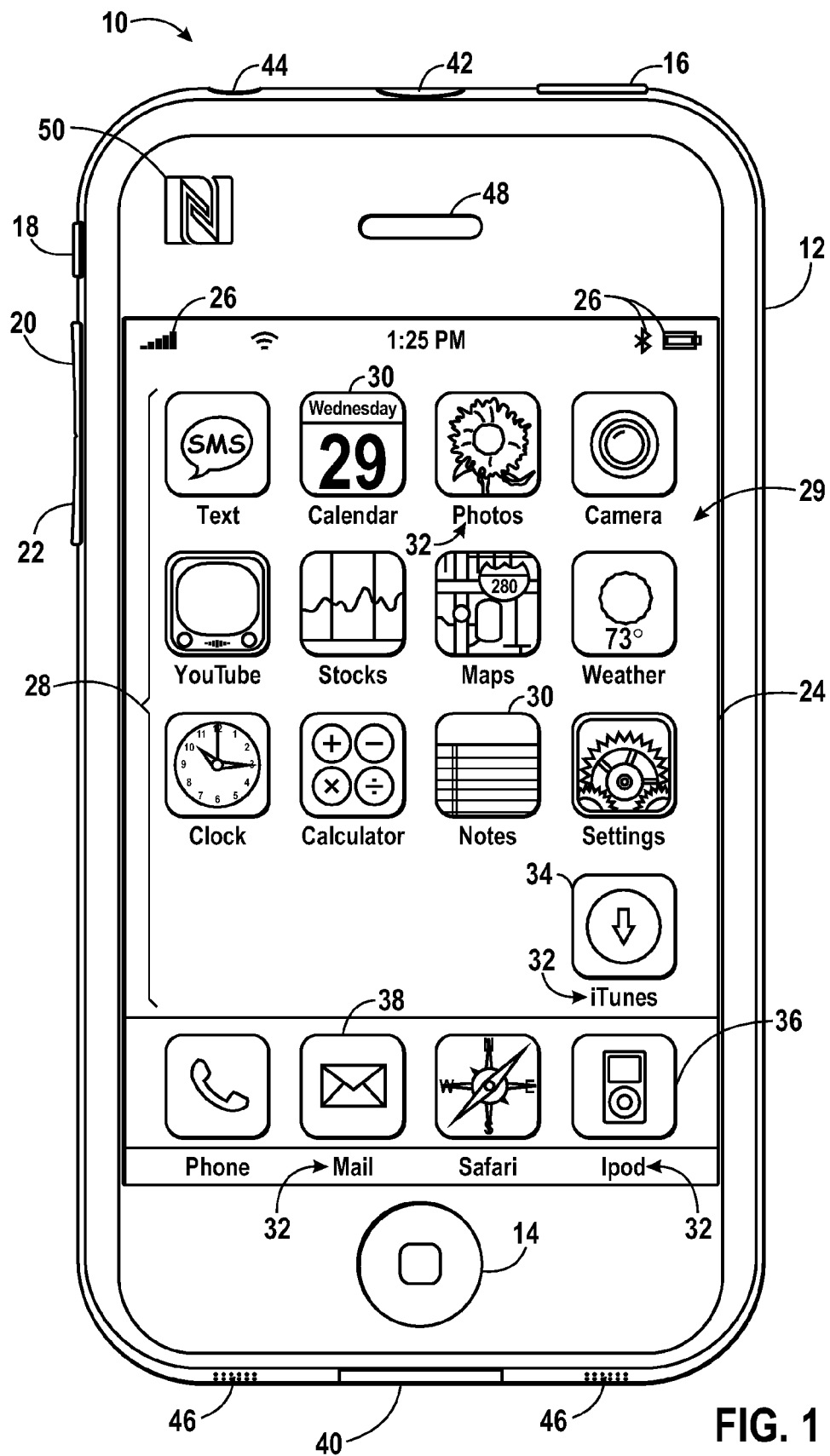
FIG. 1 is a front view of a handheld electronic device in accordance with one embodiment.

Turning to the drawings and referring initially to FIG. 1, an electronic device that may include one or more applications for providing the media gifting techniques and capabilities briefly mentioned above is illustrated and generally referred to by reference numeral 10. In accordance with the illustrated embodiment, the electronic device 10 may be a handheld device incorporating the functionality of one or more portable devices, such as a media player, a cellular phone, a personal data organizer, and so forth. Thus, depending on the functionalities provided by the electronic device 10, a user may listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connection protocols, such as Bluetooth and near field communication (NFC). By way of example only, the electronic device 10 may be a model of an iPhone®, available from Apple Inc. of Cupertino, Calif.

As shown in the illustrated embodiment, the device 10 may be enclosed by an enclosure or housing 12. The enclosure 12 may serve to protect the internal components of the device 10 from physical damage. In addition, the enclosure 12 may also provide the device 10 and its internal components shielding from electromagnetic interference. As will be appreciated by those skilled in the art, the enclosure 12 may be formed and/or constructed from any suitable material such as plastic, metal, or a composite material and may allow certain frequencies of electromagnetic radiation to pass through to wireless communication circuitry within the device 10 for facilitation of wireless communications.

The enclosure 12 may further provide for access to various user input structures, depicted in FIG. 1 by reference numerals 14, 16, 18, 20, and 22. By way of these user input structures, a user may interface with the device 10, wherein each user input structure 14, 16, 18, 20, and 22 may be configured to control one or more device functions when pressed or actuated. By way of example, the input structure 14 may include a button that when pressed or actuated causes a home screen or menu to be displayed on the device. The input structure 16 may include a button for toggling the device 10 between one or more modes of operation, such as a sleep mode, a wake mode, or a powered on/off mode, for example. The input structure 18 may include a dual-position sliding structure that may mute or silence a ringer in embodiments where the device 10 includes a cell phone application. Further, the input structures 20 and 22 may include buttons for increasing and decreasing the volume output of the device 10. It should be understood that the illustrated input structures 14, 16, 18, 20, and 22 are merely exemplary, and that the electronic device 10 may include any number of user input structures existing in various forms including buttons, switches, control pads, keys, knobs, scroll wheels, and so forth, depending on specific implementation requirements.

The electronic device 10 may further include a display 24 configured to display various images generated by the device 10. By way of example, the display 24 may be configured to display photos, movies, album art associated with digital media files stored on the device 10, and/or data, such as text documents, spreadsheets, text messages, and e-mail, among other things. The display 24 may also display various system indicators 26 that provide feedback to a user, such as power status, signal strength, call status, external device connections, or the like. The display 24 may be any type of display, such as a liquid crystal display (LCD), a light emitting diode (LED) display, an organic light emitting diode (OLED) display, or other suitable display. In certain embodiments, the device 10 may include a touch sensitive element, such as a touch screen interface (not shown in FIG. 1) disposed adjacent to the display 24 that may function as an additional user input structure (e.g., in addition to structures 14, 16, 18, 20, and 22). By way of this touch screen interface, a user may select elements displayed on the display 24 such as, for example, by touching certain elements using the user's finger or a stylus.

As further shown in the present embodiment, the display 24 may be configured to display a graphical user interface ("GUI") 28 that allows a user to interact with the device 10. The GUI 28 may include various graphical layers, windows, screens, templates, elements, or other components that may be displayed on all or a portion of the display 24. For instance, the GUI 28 may display a plurality of graphical elements, depicted here generally as icons 30. By default, such as when the device 10 is first powered on, the GUI 28 may be configured to display the illustrated icons 30 as a "home screen," represented herein by the reference numeral 29. In certain embodiments, the user input structures 14, 16,18, 20, and 22, may be used to navigate through the GUI 28 and, accordingly, away from the home screen 29. For example, one or more of the user input structures may include a wheel structure that may allow a user to select various icons 30 displayed by the GUI 28. Additionally, the icons 30 may also be selected via the touch screen interface.

As will be appreciated, the icons 30 may represent various layers, windows, screens, templates, elements, or other components that may be displayed in some or all of the areas of the display 24 upon selection by the user. Furthermore, the selection of an icon 30 may lead to or initiate a hierarchical screen navigation process. For instance, the selection of an icon 30 may cause the display 24 to display another screen that includes one or more additional icons 30 or other GUI elements. Also, as shown in the present embodiment, each graphical element 30 may have one or more textual indicators 32 associated therewith, which may be displayed on or near its respective graphical element 30 to facilitate user interpretation of each graphical element 30. For example, as shown in the present figure, the icons 34, 36, and 38 may be associated with the textual indicators "iTunes," "iPod," and "Mail," respectively. It should be appreciated that the GUI 28 may include various components arranged in hierarchical and/or non-hierarchical structures.

When an icon 30 is selected, the device 10 may be configured to initiate, open, or run an application associated with the selected icon 30 and to display a corresponding screen. For example, when the icon 34 is selected, the device 10 may connect to and display an application providing the user an interface to an online service. By way of the example, the online service 34 may be an online service providing various downloadable digital media content, such as music or video files, electronic books (e-books), audiobooks, podcasts, software applications and programs, video games, or the like, which may be purchased by a user of the device 10 and subsequently downloaded to the device 10. In one implementation, the online digital media provider may be provided by the iTunes® digital media service/store, offered and maintained by Apple Inc. When the icon 36 is selected, the device may initiate a media player application and display a listing of media files available for playback on the device 10. By way of example, in one implementation, the media player application may be provided by an iPod® application available from Apple Inc. Similarly, the icon 38 may represent an e-mail program and, when selected, may initiate an e-mail application through which the user may read or send e-mail messages. Thus, for each application provided on the device 10, one or more respective screen or screens may be displayed on the display 24 that may include various user interface elements corresponding to a respective application. Further, it should be understood that the embodiments provided herein have been described with reference to iTunes® by way of example only. Indeed, in other applications of the present technique, any suitable digital media provider may be utilized. For instance, where the gifted digital files are software applications, the online digital media provider may be provided by App Store®, also offered and maintained by Apple Inc.

The electronic device 10 may also include various input/output (I/O) ports, such as the illustrated I/O ports 40, 42, 44. These I/O ports may allow a user to connect the device 10 to or interface the device 10 with one or more external devices. For example, the input/output port 40 may include a proprietary connection port for transmitting and receiving data files, such as media files. The input/output port 42 may include a connection slot for receiving a subscriber identify module (SIM) card, for instance, where the device 10 includes cell phone functionality. The input/output port 44 may be an audio jack that provides for connection of audio headphones or speakers. As will be appreciated, the device 10 may include any number of input/output ports configured to connect to a variety of external devices, such as to a power source, a printer, and a computer, or an external storage device, just to name a few examples. As will be appreciated, the I/O ports may include any suitable interface type such as a universal serial bus (USB) port, serial connection port, FireWire port (IEEE-1394), or AC/DC power connection port.

Further, in some embodiments, certain I/O ports may be configured to provide for more than one function. For instance, in one embodiment, the I/O port 40 may be configured to not only transmit and receive data files, as described above, but may be further configured to couple the device to a power charging interface, such as an power adaptor designed to provide power from a electrical wall outlet, or an interface cable configured to draw power from another electrical device, such as a desktop computer. Thus, the I/O port 40 may be configured to function dually as both a data transfer port and an AC/DC power connection port depending, for example, on the external component being coupled to the device 10 through the I/O port 40.

The electronic device 10 may also include various audio input and output elements. For example, the audio input/output elements, depicted generally by reference numeral 46, may include an input receiver, which may be provided one or more microphones. For instance, where the electronic device 10 includes cell phone functionality, the input receivers may be configured to receive user audio input such as a user's voice. Additionally, the audio input/output elements 46 may include one or more output transmitters. Thus, the output transmitters may include one or more speakers which may be utilized by the device 10 in conjunction with the above-mentioned media player application 36 for transmitting audio signals to a user, such as while playing back music or video files, for example.

Further, where the electronic device 10 includes a cell phone application, an additional audio output transmitter 48 may be provided, as shown in FIG. 1. Like the output transmitter of the audio input/output elements 46, the output transmitter 48 may also include one or more speakers configured to transmit audio signals to a user, such as voice data received during a telephone call. Thus, the input receivers and the output transmitters of the audio input/output elements 46 and the output transmitter 48 may operate in conjunction to function as the audio receiving and transmitting elements of a telephone.

In the illustrated embodiment, the electronic device 10 further includes a near field communication (NFC) device 50. The NFC device 46 may be located within the enclosure 12, and a mark or symbol on the exterior of the enclosure 12 may identify its location within the enclosure 12. The NFC device 50 may include an antenna that may generally be positioned along the circumference of the housing 12, and may allow for close range communication at relatively low data rates (e.g., 424 kb/s), and may comply with standards such as ISO 18092 or ISO 21481. In some embodiments, the NFC device 50 may also allow for close range communication at relatively high data rates (e.g., 560 Mbps), and may comply with the Trans-ferJet® protocol. As used herein, it should be understood that the term "NFC device" refers to both an NFC communication device 50, as well as the above-mentioned antenna.

In certain embodiments, the communication using the NFC device 50 may occur within a range of approximately 2 to 4 cm. As will be appreciated by those skilled in the art, close range communication using the NFC device 50 may take place via magnetic field induction, thus allowing the NFC device 50 to communicate with other NFC-enabled devices or to retrieve information from tags having radio frequency identification (RFID) circuitry, for instance. Additionally, magnetic field induction may also allow the NFC device 50 to "wake" or induce another NFC-enabled device that is in a passive or sleep mode into an active mode. As will discussed in further detail below, the NFC device 50 may be utilized in conjunction with the media player application described above (e.g., represented by graphical element 36) to provide for the gifting (both sending and receiving) of media content.

Figure 2:
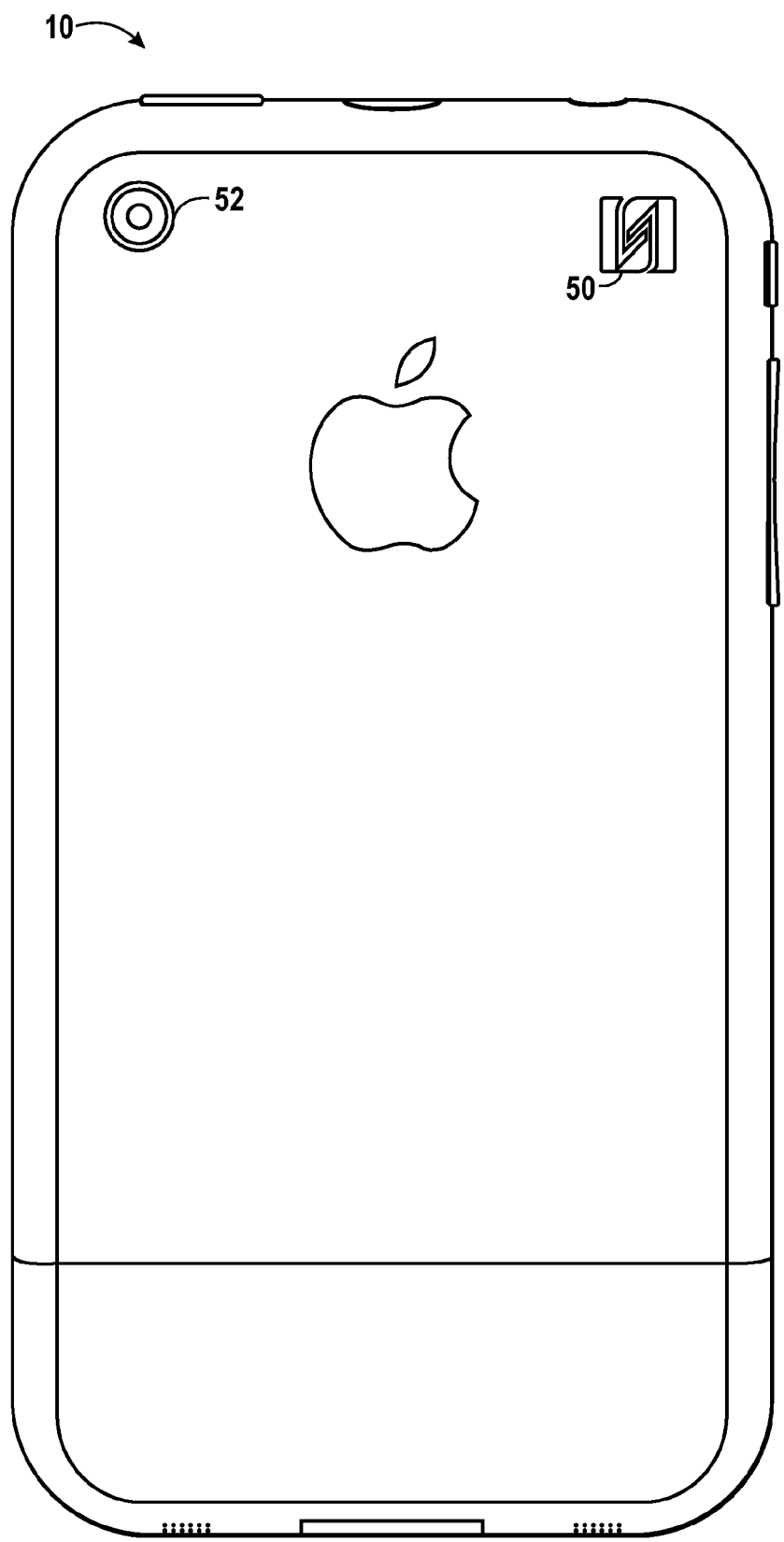
FIG. 2 is a rear view of the handheld electronic device illustrated in FIG. 1.

Continuing now to FIG. 2, a rear view of the electronic device 10 depicted in FIG. 1 is illustrated. As shown in FIG. 2, the device 10 may include a camera 52. The camera 52 may be used to acquire digital still or moving images, such as digital photographs or movies. As will be discussed in further detail below, the camera 52 may be utilized in conjunction with the aforementioned media player application 36, in order to acquire one or more images to be sent with gifted media files.

Figure 3:
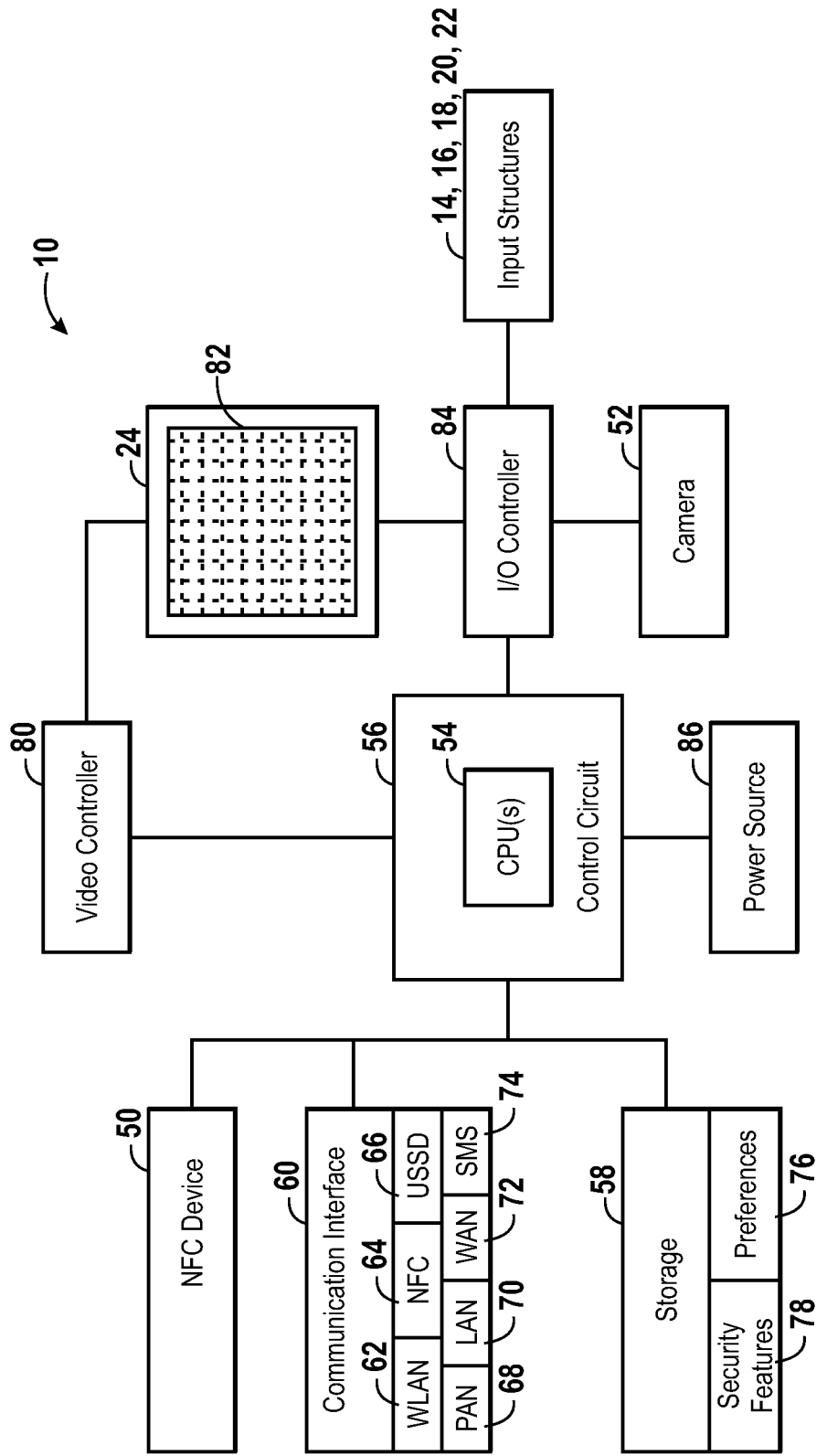
FIG. 3 is a simplified block diagram depicting components which may be used in the handheld electronic device illustrated in FIG. 1.

Additional details of the illustrative device 10 may be better understood through reference to FIG. 3, which is a block diagram illustrating various components and features of the device 10 in accordance with one implementation of the present disclosure. As shown in FIG. 3, the device 10 may include the above discussed display 24, the NFC device 50, and the camera 52, as well as one or more central processing units (CPU) 54, control circuitry 56, a storage device 58, a plurality of communication interfaces 60, a video controller 80, a touch screen interface 82, an I/O controller 84, and a power source 86.

The operation of the device 10 may be generally controlled by the central processing unit (CPU) 54 and the control circuit 56. In cooperation, these elements may provide the processing capability required to execute an operating system, application programs (e.g., including the online service application 34, the media player application 36, and the e-mail application), the GUI 28, and any other functions provided on the device 10. The CPU 54 may include a single processor or, in other embodiments, it may include a plurality of processors. By way of example, the CPU 54 may include "general purpose" microprocessors, a combination of general and application-specific microprocessors, instruction set processors, graphics processors, video processors, as well as related chips sets and/or special purpose microprocessors. The control circuit 56 may include one or more data buses for transferring data and instructions between components of the device 10. The control circuit 56 also may further include on board memory (RAM) for caching purposes. Additionally, although not illustrated in FIG. 3, the device 10 may include a standalone random access memory (RAM) in communication with the CPU 54 by way of one or more memory controllers, which may be integrated within the control circuit 56.

Information used by the CPU 54 may be stored within a long-term storage device, represented by reference numeral 58. The storage device 58 of the electronic device 10 may be utilized for storing data required for the operation of the CPU 54, data to be processed or executed by the CPU 54, as well as other data required by the device 10, such as application and program data. By way of example, the storage device 58 may be configured to store the firmware for the electronic device 10 that is used by the CPU 54. The firmware may include an operating system, as well as other programs, such as the above-mentioned applications represented by the icons 34, 36, and 38, or drivers that enable various functions of the electronic device 10, GUI functions, and/or processor functions. The storage device 58 may also store components for the GUI 28, such as graphical elements, screens, and templates. Additionally, the storage device 58 may store data files such as media (e.g., music and video files), image data, application software, preference information (e.g., media playback preferences, general user preferences), wireless connection information (e.g., information that may enable the device 10 to establish a wireless connection, such as a telephone or Internet connection), subscription information (e.g., information that maintains a record of podcasts, television shows or other media to which a user subscribes), telephone information (e.g., telephone numbers), and any other suitable data required by the device 10.

The long term storage 58 may be non-volatile memory such as read only memory, flash or solid state memory, a hard disk drive, or any other suitable optical, magnetic, or solid-state computer readable media, as well as a combination thereof. Thus, although the long term storage 58 is depicted as a single device for purposes of illustration, it should understood that the long term storage 58 may include one or more of a combination of the above-listed storage devices operating in conjunction with the CPU 54.

The device 10 may further include one or more communication interfaces, illustrated in FIG. 3 by reference numeral 60, for providing additional connectivity channels for receiving and transmitting information. For example, communication interface 60 may represent one or more network interface cards (NIC) and/or a network controller as well as various associated communication protocols. The communication interface 60 may include several types of communication interfaces, including but not limited to, a wireless local area network (WLAN) interface 62, an NFC interface 64, an unstructured supplementary service data (USSD) interface 66, a personal area network (PAN) interface 68, a local area network (LAN) interface 70, a wide area network (WAN) interface 72, and a short message service (SMS) interface 74.

The PAN interface 68 may provide capabilities to network with, for example, a Bluetooth® network, an IEEE 802.15.4 (e.g., ZigBee) network, or an ultra wideband network (UWB). As will be appreciated, the networks accessible by the PAN interface 68 may, but do not necessarily, represent low power, low bandwidth, or close range wireless connections. The PAN interface 68 may permit one electronic device 10 to connect to another local electronic device, such as a computer or portable media player, via an ad-hoc or peer-to-peer connection. However, as can be appreciated, the connection may be disrupted if the physical distance between the two electronic devices exceeds the effective range of the PAN interface 68.

The LAN interface 70 and WLAN interface 62 may provide longer-range communication channels, generally exceeding the range available via the PAN interface 68. The LAN interface 70 may represent, for example, an interface to a wired Ethernet-based network providing a connection to an Intranet or the Internet, and the WLAN interface 62 may represent an interface for connecting to a wireless LAN, such as an IEEE 802.11a/b/g wireless network. Additionally, in many cases, a connection between two electronic devices via the LAN interface 70 or the WLAN interface 62 may involve communication through one or more network routers, switches, gateways, or some other intermediary device.

Connection to a wide area network (WAN) may be provided by way of the WAN interface 72. The WAN interface 72 may permit a private and/or secure connection to a cellular data network, such as the Enhanced Data rates for GSM Evolution (EDGE) network or the 3G network (e.g., based on the IMT-2000 standard). When connected via the WAN interface 72, the electronic device 10 may remain connected to the Internet and, in some embodiments, to one or more additional electronic devices, despite changes in location that might otherwise disrupt a connection through the PAN interface 68, LAN interface 70, or the WLAN interface 62.

In certain embodiments, the electronic device 10 may also include a service discovery networking protocol configured to interact with the above-discussed communication interfaces in order to establish a connection with an external device through one of the communication interfaces. For example, both the device 10 and the external device may broadcast identification information using internet protocol standards (IP). In some embodiments, the external device may additionally broadcast information relating to the available services the external device is capable of providing (e.g., printing services for a networked printer). The devices may then use the identification information to establish a network connection, such as a PAN connection or a WLAN connection, between the devices. By way of example, a device identification protocol may be provided by Bonjour®, developed by and available from Apple Inc.

Small size communications may be sent using the USSD interface 66 and the SMS interface 74. The SMS interface 74 may allow transmission of text messages of 140 bytes or less.

In certain embodiments, larger size messages may be sent using concatenated SMS. The USSD interface 66 may facilitate the transmission of real time text messages over GSM signaling channels. By way of example, the USSD interface 66 may be used to query for locations and addresses, movie showing times, stock quotes, or the like.

The device 10 may be further provided with close range communication capabilities by way of the NFC interface 64. The NFC interface 64 may operate in conjunction with the above-described NFC device 50 to provide for close range communications between the device 10 and an external NFC-enabled device. The NFC interface 64 may exist as a separate component, may be integrated into another chipset, or may be integrated into the NFC device 50 itself, for example, as part of a system-on-chip (SoC) circuit. The NFC interface 64 may include one or more protocols, such as the Near Field Communication Interface and Protocols (NFCIP-1), for communicating with another NFC-enabled device. The protocols may be used to adapt the communication speed and to designate one of the connected devices as an initiating device that controls and/or initiates the NFC connection. In certain embodiments, the NFC interface 64 may be used to receive information, such as a service set identifier (SSID), channel, and/or encryption key that may be required to permit a connection through another communication interface, such as the WLAN interface 62, the PAN interface 68, the LAN interface 70, or the WAN interface 72.

In certain embodiments, the NFC interface 64 may enable the electronic device 10 to communicate in a peer-to-peer mode for exchanging data with another NFC-enabled device. By way of example, the media gifting techniques briefly mentioned above, which will be discussed in further detail below, may be initiated between an NFC-enabled gifting device ("gifter") and an NFC-enabled receiving device ("giftee") using a respective NFC interface 64 on each device. The NFC interface 64 also may be configured to switch the NFC device 50 between a "host" or active mode in which the NFC device 50 generates its own RF field, as well as a passive mode or "wake-on-NFC" mode in which the NFC device 50 may be induced into an active state for performing the transfer or receiving of data upon detection of an RF field generated by another device. As will be appreciated, operation of the NFC device 50 and interface 64 in the passive mode may prolong the battery life of the device 10. In additional embodiments, the NFC device 50 may be controlled based on user or manufacturer preferences, represented herein by reference number 76, which may be pre-configured by a manufacturer or vendor, or subsequently configured by a user of the device 10 based on the user's preferences. As shown in the present figure, these preferences 76, whether pre-configured or later configured, may be stored in the storage device 58.

In certain embodiments, the preferences 76 may further determine properties of the above-mentioned communication interfaces 60 (e.g., including 62, 64, 66, 68, 70, 72, and 74). For instance, the preferences 76 may include a list of networks that the device 10 may connect to and may further govern the order or priority between the communication interfaces 60. By way of example, the device 10 may be configured to communicate through the NFC interface 64 if the communication is with regard to sending a media gifting request to or receiving a media gifting notification from an external device. Similarly, the device 10 may be configured to communicate through the WLAN 58 or LAN 66 interfaces if the communication is with regard to communicating with an online service, such as an online digital media service provider, to authenticate or retrieve a gifted media file.

As will be further appreciated, the communication preferences associated with the preferences 76 may be further dependent upon security features 78 available for each respective communication interface 62, 64, 66, 68, 70, 72, and 74. The security features 78 may be stored in the storage device 58 and may include one or more cryptographic protocols, such as a secure sockets layer (SSL) protocol or a transport layer security (TLS) protocol, for establishing secure communications between the device 10 and an external device. The security features 78 may also include one or more encryption applications for encrypting information sent from the device 10. These features may be particularly useful when transmitting information of a sensitive nature, such as a user's account information, which may include a credit card account, associated with an online digital media provider.

To provide one example, a user's online digital media store account may be provided by an iTunes® account available through the iTunes® online digital media service, as discussed above. An iTunes® account may store payment information relating to one or more credit or debit card accounts by which an account holder may use to purchase media files, such as music files, video and movie files, e-books, audio-books, podcasts, software applications, or the like. Additionally, in some implementations, an iTunes® account may store information regarding a number of non-monetary "credits" by which the account holder may redeem or exchange at the iTunes® online media store for selected media files (e.g., as opposed to charging a credit card account).

The security features 78 may also include a secure access-restricted storage area (e.g., within the storage device 58) to limit access to the data that may be required by the certain aspects of the security features 78, such as encryption keys, passcodes and passwords, digital certificates, or the like. In one embodiment, the secure storage area may store one or more encryption keys relating to the distribution, management, and playback of digital copyright protected media. For instance, as will be appreciated by those skilled in the art, digital rights management (DRM) techniques may be applied to various digital copyrighted media in order to prevent unauthorized distribution or playback of the copyrighted media by unauthorized persons or devices. As will be discussed in further detail below, copyrighted media that is obtained or purchased by a user from an authorized source may include DRM protection such that the purchased media file or files may only be accessed or played back on devices having the purchaser's DRM key stored thereon. Additionally, the use of DRM techniques may also ensure that the owner of the copyrighted material receives compensation for each sale of the media file to a user. For instance, where the media file is a digital music file, the use of DRM techniques may ensure that the artist gets credited with the sale. By way of example, a DRM system for managing the distribution of digital copyrighted media may be provided by FairPlay®, also available through Apple Inc. Further, as will be understood by those skilled in the art, the digital content is a software application, copyright protection by way of software license keys or serial numbers may be utilized.

In certain embodiments, the secure storage area may include a microcontroller embedded within the electronic device 10. Additionally, in some embodiments, the secure storage area, in addition to storing the above-mentioned sensitive data, may be further protected by its own respective password or authorization "personal identification number" (PIN), for example, in order to prevent unauthorized access to the information stored therein.

In accordance with further embodiments, the security features 78 may further allow a user to lock or temporarily disable all (e.g., lock on power-up) or only certain functions on the device 10, such as the media gifting functionalities which may be provided by media player application (e.g., represented by the icon 36) described above. By way of example, when locked, the media gifting features briefly discussed above may be disabled or inaccessible by users until a user-specified PIN or password is provided. Further, the security features 78 may additionally include requiring that the PIN be provided prior to gifting a media file to an external device. As can be appreciated, the security features 78 described herein may aid to prevent the device 10 from being used to gift media files by unauthorized users.

As discussed above, the device 10 may also include the video controller 80, which may be operatively coupled to the display 24 and configured to receive image data and to send voltage signals corresponding to the pixel values of the image data to the display 24. The displayed image data may be representative of information received through the communication interface 60, as well as information contained in the storage device 58. As will be understood by those skilled in the art, pixel values may be numerical assignments corresponding to respective pixel intensities. Thus, the display 24 may receive the voltage signals from the video controller 80 as an input and produce an image corresponding to the voltage signals. For instance, an image produced by the signals provided by the video controller 80 may represent a screen of the GUI 28 described above with reference to FIG. 1.

As further noted above, a user operating the device 10 may select various graphical elements which may represent applications or information that may be displayed through the GUI 28. As shown in FIG. 3, a touch screen interface 82 may be positioned in front of or behind the display 24 and may provide a user the ability to select graphical elements, such as the various icons 30 displayed by the GUI 28 described above in FIG. 1. The touch screen interface 82 may be configured to receive inputs based on a physical contact (e.g., touching the display 24) either by the user or an object (e.g., stylus) being controlled or manipulated by the user, and to send "touch event" information to the CPU 54. The CPU 54 may then process the detected touch event information and perform a corresponding action. For instance, referring briefly back to FIG. 1, the "touching" of the icon 36 may be processed by the CPU 50 as an instruction to execute or initiate the corresponding media player application. The touch screen interface 82 may employ any suitable type of touch screen technology such as resistive, capacitive, infrared, surface acoustic wave, electromagnetic, or near field imaging. Furthermore, the touch screen interface 78 may employ single point or multi-point sensing.

The I/O controller 84 depicted in FIG. 3 may provide an infrastructure for allowing a user to communicate with the CPU 54 through various input structures provided on the device 10, such as the input structures represented by the reference numerals 14, 16, 18, 20, and 22 in FIG. 1. The user input structures 14, 16, 18, 20, and 22 may be used in conjunction with, or independently of, the touch screen interface 80 to provide input information to the device 10.

The power source 86 of the device 10 may include the capability to power the device 10 in both non-portable and portable settings. For example, in a portable setting, in order to facilitate transport and ease of motion, the device 10 may include an integrated power source 86 for powering the device 10. The power source 86 may include one or more batteries, such as a Li-Ion battery, which may be user-removable or secured to the enclosure 12. In certain embodiments, the proprietary connection I/O port 40 may be used to connect the device 10 to a power source for recharging the battery. In other embodiments, the one or more batteries may be non-integrated and may include one or more rechargeable or replaceable batteries. Further, in a non-portable setting, the power source 86 may include AC power, such as provided by an electrical outlet.

Figure 4:
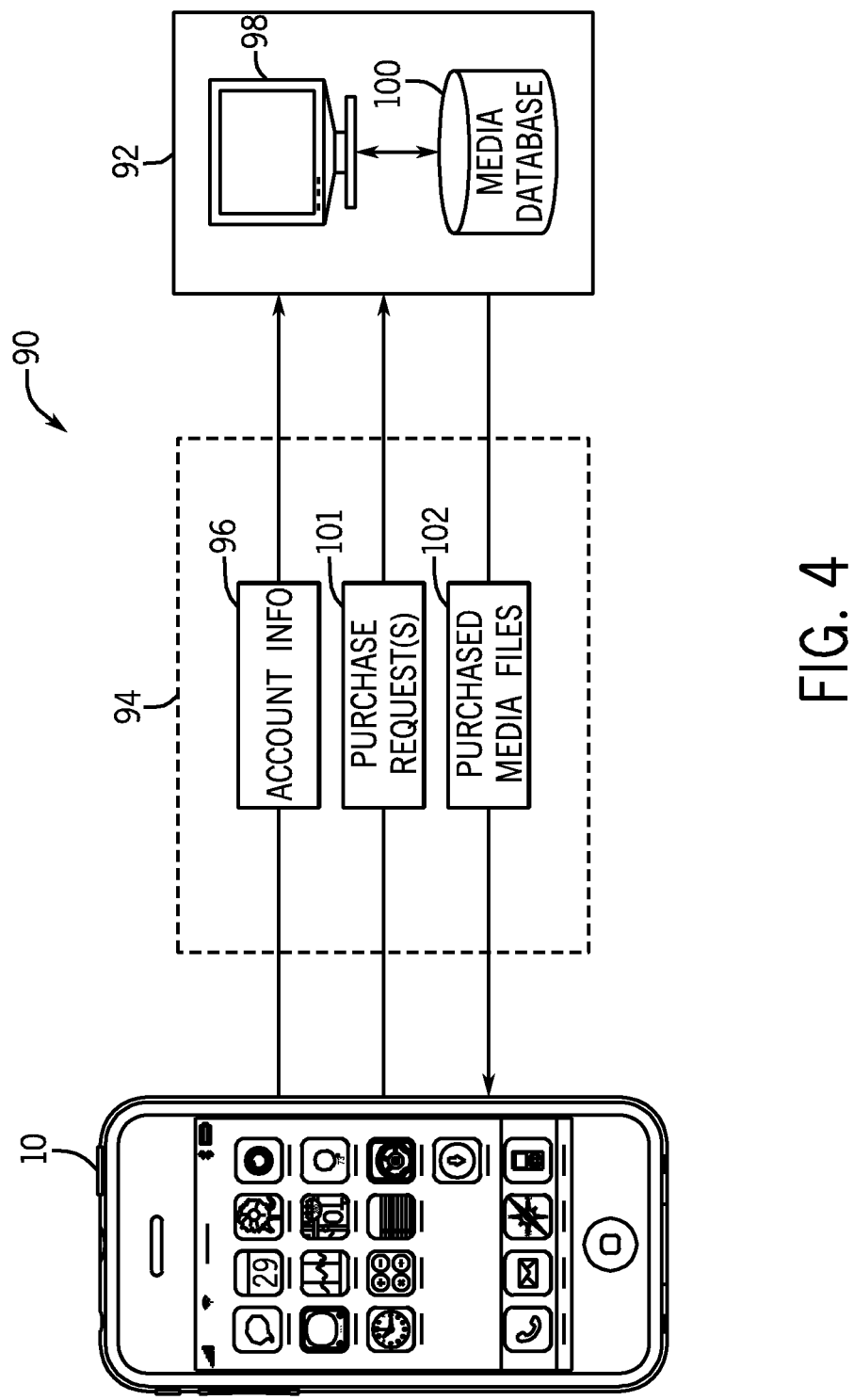
FIG. 4 is a schematic representation depicting the use of the handheld electronic device of FIG. 1 to purchase of one or more media files from an online service in accordance with one embodiment.

As mentioned above, the device 10 of FIG. 1 may include the application 34 which may provide a function by which the device 10 may connect to an online provider, such as an online digital media provider, to purchase and download various media files. Turning now to FIG. 4, a schematic representation of a system by which the electronic device 10 may communicate with an online digital media provider for the purchase or acquisition of media files is illustrated and generally referred to by the reference numeral 90. The online digital media provider 92 may be provided by the iTunes® service, as discussed above. While the present example is presented in the context of an online digital media store, it should be appreciated that the present techniques may be applicable to any online service provider offering digital downloadable products or services. As illustrated here, the device 10 may communicate with the online digital media provider 92 by way of a network 94, which may be provided by any type of suitable network, such as one or more of the communication interfaces discussed above and generally represented by the numeral 60. By way of example, where the electronic device includes a mobile cellular phone, the network 94 may be provided by a wide area network, such as a 3G or an EDGE network connection using the wide area network interface 72 discussed above. Additionally, the network 94 may also be provided by a LAN (e.g., using the LAN interface 70) or wireless LAN connection (e.g., using the WLAN interface 62).

In order to communicate with the online digital media provider 92, the electronic device 10 may first transmit the user's account information, referred to here by the reference numeral 96, to the online digital media store. The online digital media store may include a server 98 which may be configured to receive the account information and to determine the identity of the user. Thus, the server 98 may further store credit card information pertaining to the provided account 96, which may then be used to purchase media files from the online digital media provider 92. As shown in FIG. 4, the online digital media provider 92 may further include a database, illustrated here by the reference numeral 100, which may store a variety of downloadable media content that may be selected and purchased by the user of the electronic device 10. Additionally, it should be understood that although the server 98 is depicted as a single server for purposes of illustration, in practice, the online media service provider 92 may utilize a plurality of servers configured to perform the functions described herein.

As will be described in further detail below, once the user of the device 10 has successfully connected to the online digital media provider 92 using the account information 96, a virtual store interface that may be provided by the application 34 may be viewed on the display of the electronic device 10. Thus, as will be described in further detail below, the user of the device 10 may browse and enter search queries through the store interface in order to identify one or more media files which the user wishes to purchase. Once the desired media files have been identified, the user may transmit a purchase request, referred to here by the reference numeral 101 to the online digital media provider 92 using the network 94. The purchase request 101 may be received by the server 98, which may calculate a total payment owed for the requested files, and charge the requested amount to the user's account 96. For example, the charges may be applied to a credit card account associated with the user's account, as mentioned above. Once the charge to the user's account has been authorized, the requested media files specified in the purchase request 101 may be retrieved from the database 100.

As discussed above, due to the nature of copyright protection, digital copyrighted media files purchased by the user may need to be processed using one or more digital rights management techniques. By way of example, the user's account 96 may include one or more a digital rights management (DRM) encryption keys, which may have been assigned to the user upon establishing the account 96 with the online digital media provider. For instance, the user's DRM key or keys may be stored locally on the server 98, as well as on the electronic device 10. Thus, any media files purchased by the user of the device 10 may be protected by applying DRM protection to the purchased files, represented here by the reference number 102, using the DRM keys associated with the user's account prior to transmitting the purchased files to the user's device 10 using the network 94. Further, as will be appreciated, the DRM protected purchased media files 102 may be played back on the device 10 using the DRM keys stored on the device 10.

While the use of DRM keys has been described herein as a copyright protection mechanism with regard to the media files discussed above, it should be understood that the present technique may be applicable to other forms digital copyrights media, such as software applications. By way of example, the present technique may be applicable with regard to software programs purchased through the App Store®, operated by Apple Inc. Further, it should be understood that digital rights management techniques for software applications may utilize serial numbers, software activation keys, and so forth. For instance, if a software application is purchased from the App Store® and subsequently gifted to a giftee device, a gift license or serial number may be generated by the App Store® server (e.g., in addition to or instead of a DRM key) to authorize the gifting of the software application.

Figure 6:
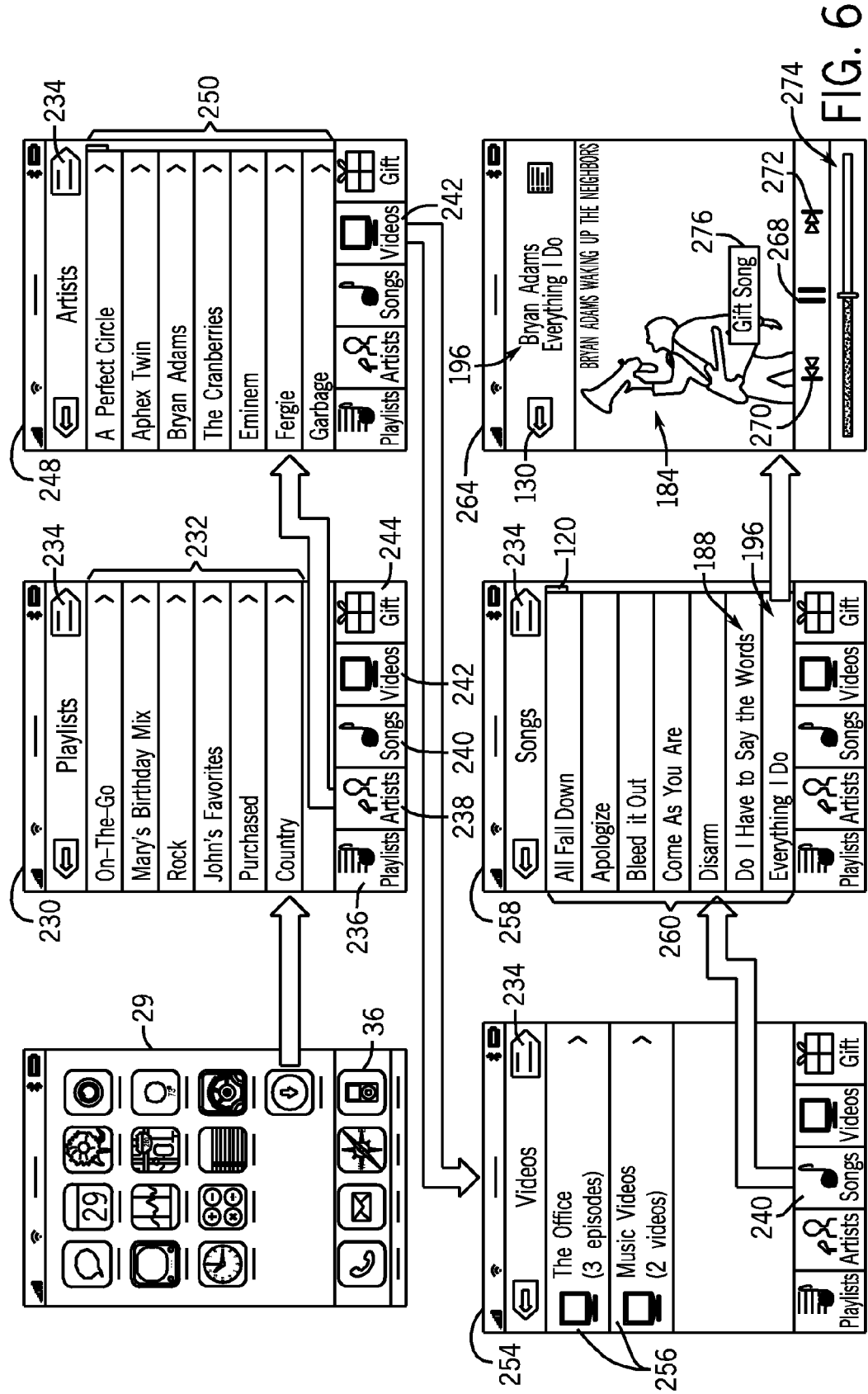
FIG. 6 shows a plurality of screen images illustrating the playback the purchased media file of FIGS. 5A and 5B on the device of FIG. 1 using a media player application.

Continuing with the present disclosure, FIGS. 5A-5B and FIG. 6 illustrate, by way of a plurality of screen images that may be displayed on the device 10, the selection and purchase of media files from the online digital media provider 92 as well as subsequent playback of the purchased media files on the device 10. The depicted screen images may be generated by the GUI 28 and displayed on the display 24. For instance, these screen images may be generated as the user interacts with the device 10, such as via the input structures 14, 16, 18, 20, and 22, and/or the touch screen interface 78.

As discussed above, the GUI 28, depending on the inputs and selections made by a user, may display various screens including icons (e.g., 30) and graphical elements. These elements may represent graphical and virtual elements or "buttons" which may be selected by the user by physically touching their respective location on the display 24 using the touch screen interface 76, for example. Accordingly, it should be understood that the term "button," "virtual button," "graphical button," "graphical elements," or the like, as used in the following description of screen images below, is meant to refer to the graphical representations of buttons or icons represented by the graphical elements provided on the display 24. Further, it should also be understood that the functionalities set forth and described in the subsequent figures may be achieved using a wide variety graphical elements and visual schemes. Therefore, the present invention is not intended to be limited to the precise user interface conventions depicted herein. Rather, embodiments of the present invention may include a wide variety of user interface styles.

Beginning with FIGS. 5A and 5B, these figures collectively illustrate screen images that may be displayed on the device 10 and depict a technique for interfacing connecting to the online digital media provider 92 and selecting and purchasing one or more media files in accordance with one embodiment. Referring first to FIG. 5A, the user may select the graphical icon 34 from the home screen 29 of the GUI 28 displayed on the device 10 in order to connect to the online digital media provider 92. As discussed above, the process of connecting or logging in to the online digital media store 92 may include the providing of account information 96 from the device 10 to the server 98. Once the user's account information 96 has been authenticated by the server 98, the screen 108 may be displayed on the device 10.

The screen 108 may essentially provide a "home" or "main" screen for a virtual store interface initiated through the selection of the graphical icon 34, by which the user may browse or search for specific media files that the user wishes to purchase from the online digital media provider 92. As shown here, the screen 108 may display a message 110 confirming the identity of the user, for example, based on the account information 96 provided during the login process discussed above. The screen 108 may also display the graphical buttons 112 and 114. The graphical button 112 may be initially selected by default and may display various music files on the screen 108, such as those referred to by the reference numeral 116. By way of example, the music files 116 displayed on the screen 108 may correspond to the current most popular music files, for instance. Essentially, the listings of the music files 116 on the screen 108 may serve to provide recommendations for various music files which the user may purchase. Each of the listed music files 116 may have associated therewith a graphical button 118. The graphical button 118 may indicate the price of the music file 116. Accordingly, the user of the device 10 may select a graphical button 118 corresponding to one of the music files 116 in order to purchase the selected music file 116.

The screen 108 may further display a scroll bar element to provide a scrolling function, as represented here by the reference numeral 120. Thus, where the listing of the music files 116 exceeds the display capabilities of the device 10, the user may interface with the scroll bar element 120 in order to navigate the remainder of the listing. Alternatively, the user may also choose to view media files arranged in groups, such as by music albums, by selecting the graphical button 114. As will be appreciated, an album may contain multiple musical files 116 which, in some instances, may be authored or recorded by the same artist, and may be provided as a package of media files that the user may select for purchase.

As shown in FIG. 5A, the screen 108 further includes the graphical buttons 122,124,126, and 128. Each of these graphical buttons may correspond to specific functions which will be described in further detail below. For instance the graphical button 122 may allow the user to access one or more of the media gifting functions briefly mentioned above. The graphical button 124 may allow the user to search for specific media files that the user wishes to purchase. The graphical button 126 may allow the user to view recently downloaded media files, as well as media files that are currently being downloaded onto the device 10. Further, the user may also select the graphical button 128 to view the user's account information. Finally, the screen 108 may also include the graphical button 130, which may provide the functionality of returning the user to the previous screen. By way of example, the selection of the graphical button 130 on the screen 108 may return the user to the home screen 29, and in certain embodiments, may disconnect the user from the online digital media provider 92.

As shown in the present figure, the selection of the graphical button 128 may navigate the user to the screen 132, which may display the user's account information. The user's account information, generally designated by the reference numeral 134, may include the user's identity 136, as well as an e-mail address 138 associated with the user's account. As can be appreciated, the e-mail address 138 may be used to receive confirmations or payment receipts with regard to media files purchased through the online digital media provider 92. Additionally, the screen 132 may display one or more payment account associated with the user's online digital media provider account. For example, as illustrated here, the payment account may be a credit card account 140. Thus, media files selected for purchase by the user from the online digital media provider 92 may be charged to the displayed credit card account 140. Additionally, the user may add or edit the preferred payment account by selecting the graphical button 142. The screen 132 may further display a credit unit balance, referred to here by the reference numeral 144. As will be appreciated, a "credit" may constitute a non-monetary unit of exchange that may be redeemed for media files from the online digital media provider. For example, the credits may be acquired as a gift from another user having an account with the online digital media provider 92.

To initiate the process of searching for media files to purchase, the user may select the graphical button 124. As shown here, the selection of the graphical button 124 may navigate the user to the screen 148. The screen 148 may display various methods by which the user may search for a particular media file, depicted by the reference numerals 150, 152, 154, 156, 158, and 160. For instance, the user may search for a particular media file by searching for a particular recording artist (e.g., 150) or by searching for the title of the media file 152. Additionally, the user may also search for groups of media files, such as a particular music album by a specific recording artist, as indicated here by the reference numeral 154. Further, if the user does not have a particular media file in mind, the user may select one of the search categories 156, 158, and 160, to view recommendations by music genres or by what particular media files are currently in demand by other users of the online digital media provider 92 due to popularity.

As shown in the illustrated embodiment, the user may select the search category 150 in order to search for media files by a particular recording artist. Upon selecting the search category 150, the user may be navigated to the screen 162. As shown here, the screen 162 may display a text field 164 by which the user may enter the identity or name of a desired recording artist. For example, the entry of the recording artist's name may be accomplished by way of the text keyboard interface, depicted here by the reference numeral 166. Further, though not shown in the present figure, where the recording artist's name includes numerical characters, the user may select the graphical button 168 to access a numerical keyboard for the input of numerical characters. Once the desired recording artist's name has been entered into the field 164, the user may initiate a search for music files associated with the selected artist by selecting the graphical button 170.

Continuing now to FIG. 5B, the search results corresponding to the search initiated by selecting the graphical button 170 may be displayed on the screen 176. As shown here, the search results displayed on the screen 176 may provide the user with a listing of music albums associated with the recording artist specified on the screen 162 in FIG. 5A. The user may select one or more of the albums displayed on the screen 176 in order to either purchase the entire album or to select individual songs from the album for purchase. For example, by selecting the album referred to by the reference numeral 180, the user may advance to the screen 182. The screen 182 may display an image 184 which may correspond to an image associated with the selected music album. For instance, the image 184 may represent "album art" (e.g., the cover of a compact disc liner insert), an image of the recording artist, or the like. The screen 182 may further display a listing 186 of all the music files associated with the selected album 180.

As shown here, where the listing of music files 186 exceeds the display capabilities of the display 24 on the device 10, the scroll bar element 120 discussed above may be provided to assist the user with navigating through the remainder of the listing 186. Additionally, the screen 182 may provide the graphical button 187 by which the user may select to purchase the entire album. In the presently illustrated figure, the graphical button 187 may include a total purchase price for the album 180. Each music file displayed in the listing 186 may be associated with a graphic, represented here by the reference numeral 190. Accordingly, the user may select a graphic element 190 corresponding to a particular music file in order to identify a corresponding music file as a selection for purchase. For instance, in the presently illustrated screen 182 the user may select the music file referred to here by the reference numeral 188. Upon selection of the music file 188, the graphical element 190 may be replaced with the graphical element 192 indicating that the music file 188 has been selected for purchase by the user. Next, the user may continue to select additional music files form the selected album 180 for purchase. For example, the user may view the remaining songs in the listing 186 by moving the scroll bar element 120 to further select the music file 196. Accordingly, once all the desired music files have been selected, the user may proceed to purchase and download the selected music files by selecting the graphical button 194.

Upon selection of the graphical button 194, the user may be advanced to the screen 200, which may display an invoice for the requested purchase. As will be appreciated, the screen 200 may represent a virtual "shopping cart" listing the file or files a user has selected for purchase. For instance, the screen 200 may display the selected music files 188 and 196, as well as the price associated with each of the selected music files 118. The prices 118 corresponding to each selected music file may further be summed to determine a total purchase amount, referred to here by the reference numeral 202. The screen 200 may further display the graphical checkbox elements 204, each corresponding to one of the credit card account 140 or the user's available credits 144, as discussed above. Thus, the user may select one of the graphical checkboxes 204 in order to specify a method of payment for the requested purchase price 202. In the illustrated embodiment, the user may select the credit account 140 as the payment method. Next, the user may either select the graphical button 206 or 208. The graphical button 206 may allow the user to return to the store interface of the online digital media provider 92, such as the screen 108, for example, to continue browsing or shopping for additional media files that the user may wish to purchase. Alternatively, if the music files 188 and 196 are the only files that that the user wishes to purchase in the present connection session, the user may complete the purchase by selecting the graphical button 208.

Upon selection of the graphical button 208, the user's credit card account 140 will be charged for the total purchase price 202. In some implementations, the process of charging the credit card account 140 may require communication with an external credit card verification server to authorize the charge for the purchase price 202. Once the credit card charge has been authorized, the user may be advanced to the screen 212, which may display the notification message 214 indicating to the user that the purchase has been completed and that a payment receipt has been provided, such as to the e-mail address 138 associated with the user's account, as indicated on the screen 132 of FIG. 5A. Here, the user may again have the option of returning to the screen 108 to continue shopping for additional music files, or the user may select the graphical button 218 to begin downloading the purchased media files. For instance, referring back to FIG. 4, the purchased media files 102 may be transmitted to the user device 10 by way of the network 94. Additionally, as discussed above, the prior to downloading the selected files, the files may be processed by the server 98 of the online digital media provider 92 to apply DRM protection to the files using the user's associated DRM keys.

Once the download of the files is completed, the screen 220 may be displayed on the device 10. As shown here, the screen 220 may include the notification message 222 informing the user that the two purchased media files have been downloaded to the device 10. Thereafter, the user may either select the graphical button 224, which may represent a function by which a media player application (e.g., 36) is initiated on the device 10, or the user may exit the online digital media store and return to the home screen 29 by selecting the graphical button 226.

Continuing now to FIG. 6, a plurality of screen images depicting the playback of a purchased media file on the device 10 using a media player application is illustrated. For example, by selecting the graphical button 226 from the screen 220, the user may be returned to the screen 29 of the device 10. Here, the user may initiate the media player application by selecting the graphical button 36. Upon selection of the graphical button 36, the user may be navigated to a home screen 230 of the media player application. As can be appreciated, the user may also be navigated to the screen 230 directly from the screen 220 by selecting the graphical button 224 in FIG. 5B instead of selecting the graphical button 226. As shown in FIG. 6, the screen 230 may initially display a plurality of playlists, referred to here by the reference numeral 232. As will be appreciated, a playlist may correspond to a specific grouping of songs defined by the user. In some instances, a playlist may constitute all the song files from an entire music album. Additionally, a playlist may be a custom "mix" of media files chosen by the user of the device 10. The screen 230 may also include the graphical button 234, which upon being selected, may display information pertaining to a current media file presently being played in the media player application 36.

The screen 230 also includes the graphical buttons 236, 238, 240, 242, and 244. Each of these graphical buttons may correspond to specific functions that will be described in further detail below. For example, the graphical button 236 may function to display the listing 232 of the playlists on the present screen if the user navigates away from the screen 230. The graphical button 238 may organize the media files stored on the device 10 by a listing of artists associated with each media file. The graphical button 240 may represent a function by which the media files corresponding specifically to music (e.g., song files) may be sorted and displayed on the device 10. For instance, the selection of the graphical button 240 may display all music files stored on the device alphabetically in a listing that may be navigated by the user. Additionally, the graphical button 242 may represent a function by which the user may access video files stored on the device. Finally, the graphical button 244 may represent one or more functions associated with the media gifting techniques mentioned above. These and other various techniques will be explained in further detail below.

As shown in the present figure, the selection of the graphical button 238 may navigate the user to the screen 248. In the screen 248, the music files stored on the device 10 may be organized according to the recording artist associated with each music file. In the presently illustrated screen, the listing 250 of the recording artist may be displayed alphabetically. The user may also select the graphical button 242 to access the screen 254 which may display one or more video files stored on the device 10, represented here by the reference numeral 256, which upon selection may be viewed on the device 10. The user may also select the graphical button 240 to navigate to the screen 258, which may display a listing of all music files stored on the device 10, as indicated by the reference numeral 260. Here again, the scroll bar function 120 may be provided so that the user may view the entirety of the listing 260 if the listing 260 exceeds the display capabilities of the device 10. In the presently illustrated figure, the music files may be provided on the screen 258 in alphabetical order. It should be noted that the media files 188 and 196 recently purchased from the online digital music provider 92 may be included in the listing 260. In order to play back or listen to one of these music files, the user may select the desired music file, in this case the music file 196, to continue to the screen 264.

As shown in the screen 264, information pertaining to the selected music file 196 may be displayed and generally depicted by the reference numeral 266. For instance, the information, which may include song information, may display the name of the recording artist, the title of the music file 196, as well as the album to which the music file is associated. The screen 264 may also display the album image 184, as discussed above with reference to the screen 182 in FIG. 5B. The screen 264 may further include the graphical buttons 268, 270, and 272. As will be appreciated, the graphical button 268 may allow the user to pause a media file that is presently being played back on the device 10. Though not illustrated here, it should be appreciated that the selection of the graphical button 268 while the media file 196 is paused may continue playback of the pause media file. Additionally, where the presently played media file 196 is part of a playlist, as discussed above, the graphical buttons 270 and 272 may represent the functions of returning to the previous file in the playlist or continuing to the subsequent file in the playlist. As can be appreciated, where a playlist is being played or in a random or shuffle mode, the graphical buttons 270 and 272 may function select a random file from the play list for playback.

The screen 264 may also include a progress indicator 274 indicating the total playing time of the selected media file, and the additional playback time required to complete the playback of the selected media file. In one embodiment, once the playback of the selected media file 196 has begun, the selected media file 196 may continue playing even if the user navigates away from the screen 264, such as by selecting the graphical button 130. Further, if the user chooses to navigate away from the screen 264, the user may return to the screen 264 at anytime by selecting the graphical button 234 from one of the screens 230, 248, 254, or 258. As discussed above, the media player application 36 may include one or more media gifting functionalities. For example, referring still to the screen 264, the graphical button 276 may be displayed during the playback of the media file 196. As will be explained in further detail in the subsequent figures, the selection of the graphical button 276 may allow the user to initiate a variety of media gifting functions.

Figure 7:
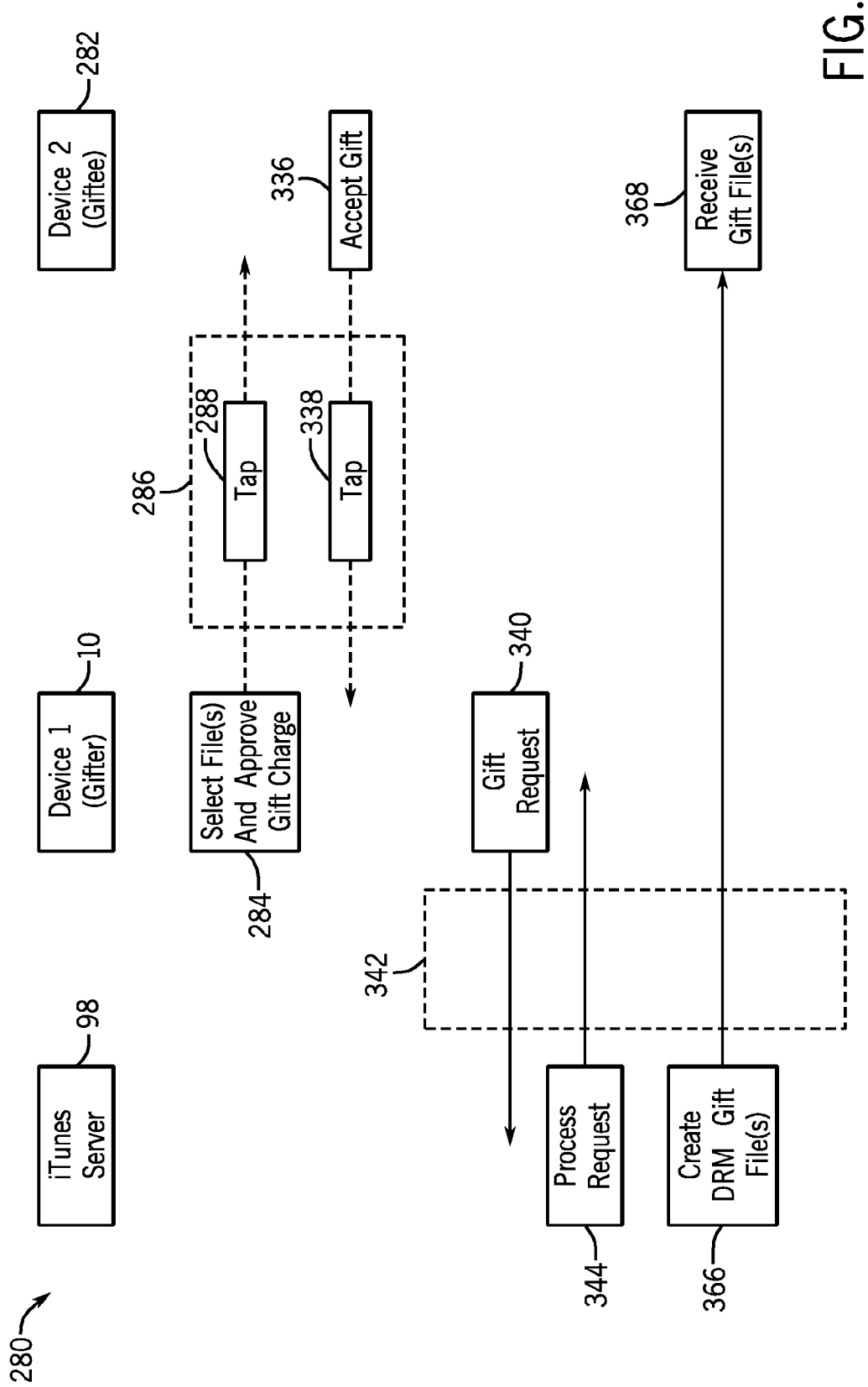
FIG. 7 is a schematic representation illustrating the gifting of the purchased media file of FIG. 5B from the handheld electronic device of FIG. 1 to a separate device in accordance with one implementation of the present technique, wherein the handheld electronic device of FIG. 1 acts as a gifter device and the separate device acts as a giftee device, and wherein the gifted media file is created by an online service depicted in FIG. 4.

Referring now to FIG. 7, a schematic representation of a system 280 configured to provide for a technique for gifting of one or more media files from the electronic device 10 ("gifter device") to a separate receiving device ("giftee device") is illustrated in accordance with one implementation of the present technique. Before continuing with the present discussion, it should be noted that the term "gifter," as used herein, shall refer to an individual who is using a device to send or provide a media file to another individual as a gift. Additionally, it should be understood that the term "giftee" shall refer to an individual who is using a device to receive a media file from another individual as a gift. Thus, the terms "gifter device" and "giftee device" shall be understood to refer to the electronic device 10 and the electronic device 282 being operated by the gifter and the giftee, respectively. Further, in the various embodiments that will be described below, it should be kept in mind that the giftee device 282 may be an NFC-enabled device similar to the gifter device 10, and may include similar applications, such as the above-discussed applications represented by the graphical icons 34, 36, and 38.

As shown in the system 280, one or more media files may be initially selected on the gifter device 10. Prior to initiating the gifting of the selected files, the gifter may be prompted, such as by a notification displayed on the display of the device 10 to approve the payment charges that may be associated with the files to be gifted. As can be appreciated, the payment charges may essentially be the cost of the gift files to be received by the giftee device 282, but paid for by the gifter. These actions may be generally referred to as a "gifting offer" or "gifting request," and referred to by the reference numeral 284. Once the gift charges corresponding to the selected media file or files have been approved by the gifter, the gifting request or offer may be transmitted to the giftee device 282. As noted above, the gifter device 10 and the giftee device 282 may both be NFC-enabled devices. Accordingly, the gifting offer 284 may be transmitted from the gifter device 10 to the giftee device 282 by way of an NFC connection 286 established using a tap operation, referred to here by the reference number 288.

As used herein, the term "tap" and "tap operation," or the like shall be understood to mean the action of placing one NFC-enabled device within the proximity of one or more additional NFC-enabled devices such that an NFC-based connection may be established between the devices. As discussed above, one technique for establishing an NFC-based connection may be through magnetic field induction, whereby a first NFC-enabled device acting as a host device generates an RF field, which in turn induces an NFC device located within a separate device to transition from a passive state to an active state, thus establishing an NFC connection. Once established, information may be exchanged between the devices by way of the NFC connection.

Figure 8:
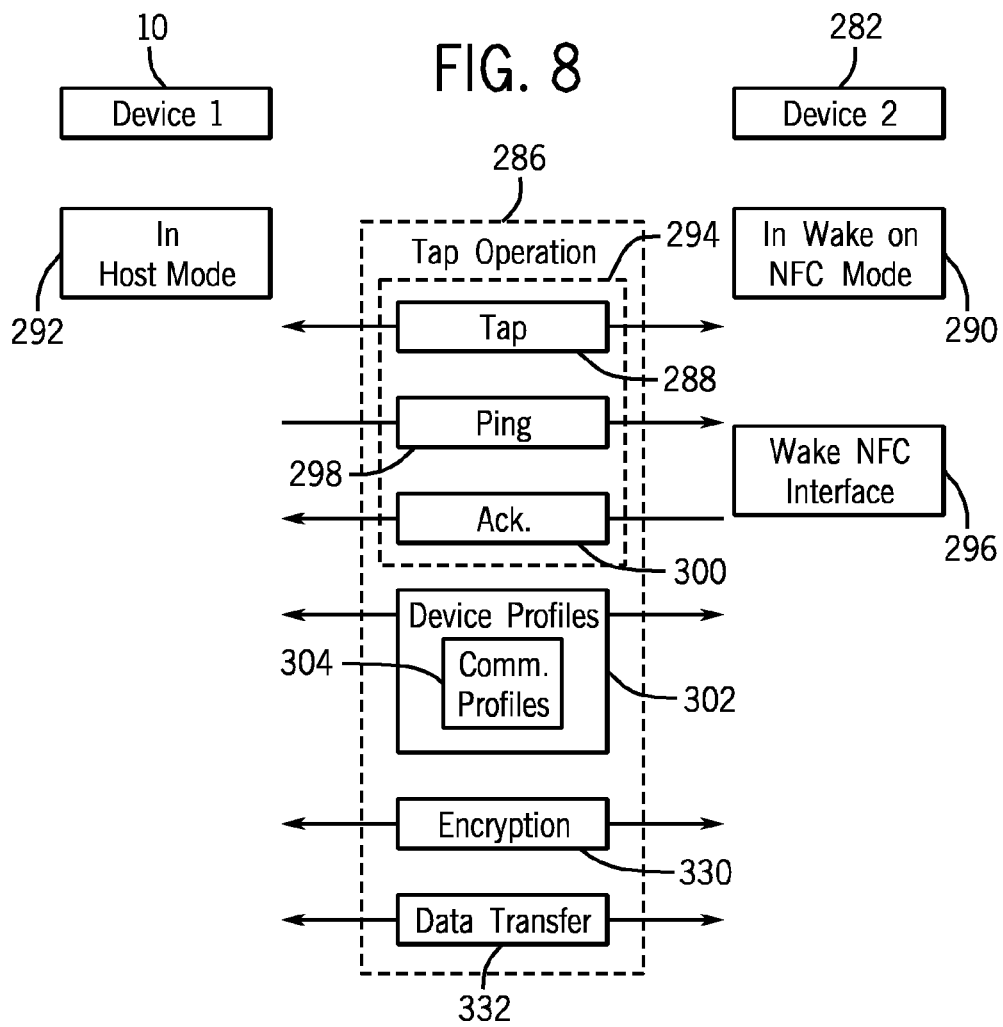
FIG. 8 is a schematic representation illustrating a communication process that may occur between the gifter and giftee devices during the gifting process depicted in FIG. 7.

Referring now to FIG. 8, a tap operation 288 is illustrated in further detail. For instance, prior to the initiation of the NFC connection 286, the giftee device 282 may be in a passive or a "wake on NFC" mode, as denoted by reference numeral 290. While in the passive state, an NFC device 50 and an NFC interface 64 that may be included in the giftee device 282 may remain inactive until the NFC interface 64 detects an NFC transmission from a separate external device, such as the gifter device 10. By way of example, once the gifter device 10 is operated to transmit the gift offer 284, the NFC interface 64 and corresponding NFC device 50 located within the gifter device 10 may transition to an active or host mode, as indicated by reference numeral 292. While in the host mode 292, the NFC device 50 of the gifter device 10 may periodically emit NFC communication signals to seek out other NFC-enabled devices having their own respective NFC interfaces 64 and NFC devices 50 that are within the appropriate range to facilitate and establish an NFC connection 286.

For instance, when the gifter device 10 and the giftee device 282 are placed within an appropriate range (e.g., the tap operation 288) for establishing an NFC connection, the establishment of the connection may begin with an initiation handshake, referred to herein by reference numeral 294. It should be understood, that in tapping the devices, it is important that the NFC devices 50 within each respective device are positioned in such a way that the distance between the respective NFC devices 50 is suitable for establishing an NFC-based connection. For example, if the giftee device 282 is a relatively large non-portable device, the gifter would be required to position the gifter device 10 such that the NFC device 50 within the gifter device 10 is within the appropriate distance of any corresponding NFC circuitry within the giftee device 282 in order to establish the NFC connection 286.

While the NFC interface 64 and the NFC device 50 of the gifter device 10 are operating in the host mode 292, the gifter device 10 may periodically emit ping messages 298. The corresponding NFC interface 64 of the giftee device 282 may receive the ping messages 298, thus causing the NFC device 50 located within the giftee device 282 to awake upon the detection of the NFC transmission (e.g., wake on NFC), thereby transitioning from a passive mode to an active mode, as indicated by reference numeral 296. Thus, once powered on and active, the NFC device 50 of the giftee device 282 may reply in response to the ping message 298 by sending an acknowledgement message 300 which may be received via the opposite NFC interface 64 of the gifter device 10, thus completing the initiation handshake 294.

Following this initiation handshake 294, the gifter device 10 and the giftee device 282 may exchange device profiles as indicated by the reference numeral 302. The device profiles 302 may include a variety of information regarding the functions available on each of the devices 10 and 282. In one embodiment, the device profiles 302 may be represented by data messages of any suitable form, including extensible markup language (XML), which may denote the device name, serial number, owner name, device type, as well as any other type of identifying information. For example, where one or both of the devices 10 and 282 includes telephone functionality, additional identifying information may include the name of a service provider, such as a network or cellular telephone service provider. The device profiles 302 may additionally include information with regard to the capabilities of the gifter device 10 or the giftee device 282 by indicating which applications, drivers, or services may be installed on each device, as well as a communication profiles, referred to here by the reference number 304, which may indicate the communication networks to which the devices 10 and 282 are capable of establishing a network connection.

Figure 9:
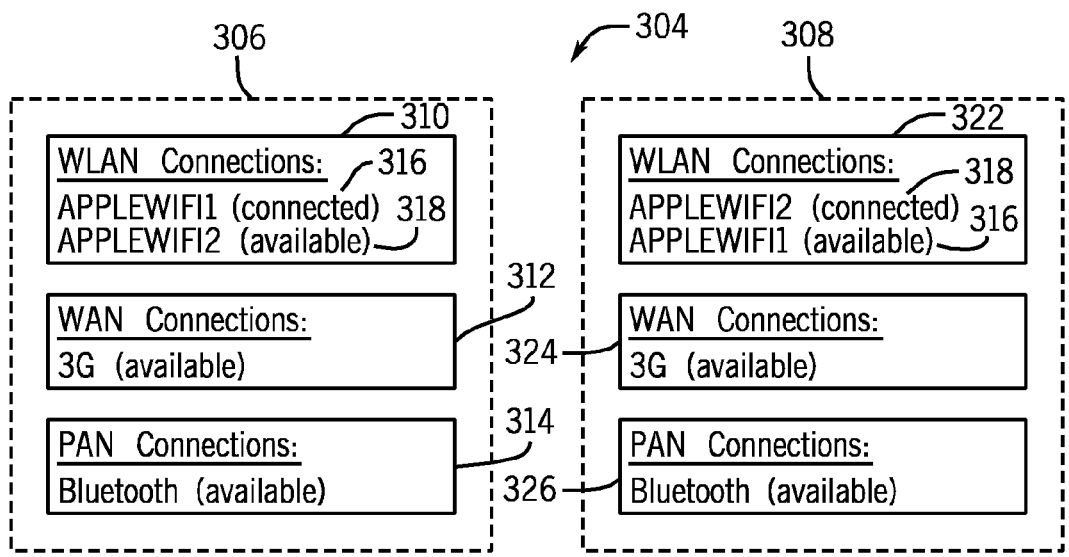
FIG. 9 is a schematic representation of respective communication profiles associated with each of the gifter device and giftee device which may be exchanged between the gifter device and the giftee device during the communication process of FIG. 8.

Turning now to FIG. 9, the communication profiles 304 may include a first communication profile 306 corresponding to the gifter device 10 and a second communication profile 308 corresponding to the giftee device 282. For instance, as depicted by the communication profile 306, the gifter device 10 may be capable of connecting to one or more wireless LAN connections, as indicated by the reference number 310, a wide area network connection 312, or may further be capable of connecting to a personal area network (PAN) connection 314. As illustrated by the communication profile 306, the gifter device 10 may be capable of establishing a network connection with either of the wireless LAN networks 316 and 318 and may be presently connected to the wireless LAN network 316.

The communication profile 308 for the giftee device 282 may also include one or more wireless LAN network connections, referred to here by the reference number 322, a wide are network connection 324, as well as a personal area network connection 326, such as a Bluetooth connection. In the illustrated embodiment, the giftee device 282 may be capable of establishing a network connection with either of the wireless LAN networks 316 and 318 and may be presently connected to the wireless LAN network 318. Thus, the gifter device 10 and the giftee device 282 may presently be connected to different wireless LAN networks. Based on the NFC tap operation 288, the communication profiles 306 and 308 may be broadcasted to each respective device. As mentioned above, in one embodiment, a service discovery networking protocol, such as Bonjour®, may be provided such that the devices 10 and 282 may automatically, or in response to a prompt from one of the devices 10 or 282, establish a connection to a common network thru which data, including media files, may be transferred. By way of example, the giftee device 282, based on the communication profile information 306 received from the gifter device 10, may automatically (or via a prompt to a user of the giftee device 282) establish a connection with the wireless LAN network 316 such that a common network connection exists between the devices 10 and 282.

Referring back the FIG. 8, the gifter device 10 and the giftee device 282 may also exchange information with regard to the encryption capabilities available on each device, as represented by reference numeral 330. As discussed above, because the process of gifting media files may invariably involve the transfer of certain sensitive data, such as information relating to the giftee's and the gifter's accounts associated with the online digital media provider 92, the use of one or more encryption measures for protecting the gifting information being transferred between a gifter device 10 and a giftee device 282, as well as to one or more servers (e.g., server 98) associated with the online digital media provider 92, may be implemented. Thus, once the NFC connection 286 is established and the device profiles 302 and encryption capabilities 330 are exchanged, data may be exchanged between the devices 10 and 282, as indicated by reference numeral 332 using a secure connection. For instance, the data 332 transferred between the devices 10 and 282 may include the gifter's and the giftee's online digital media provider account information, as well as information indicating the media file or files to be gifted to the giftee device 282.

Returning to FIG. 7, upon receiving the gift offer 284 from the gifter device 10, the giftee device 282 may transmit an acceptance message, referred to here by the reference number 336, to the gifter device 10 by way of the NFC connection 286 using a second tap operation 338. The acceptance message 336 may include the giftee's account information associated with the online digital media provider 92. Once the acceptance 336 of the gifting request is received by the gifter device 10, the gifter device 10 may transmit a gift request, referred here by the reference numeral 340, to one or more servers 98 associated with the online digital media provider 92 by way of a network 342. The network 342 may be provided by any suitable networking interface available on the gifter device 10, such as the various network interfaces discussed above with reference to the communication interface circuitry 60 of FIG. 3. For instance, the network 342 may be a wireless internet connection established by way of the wireless LAN interface 62, a local area network connection established through the LAN interface 70, or a wide area network connection established by way of the WAN interface 72, which may include one of various WAN mobile communication protocols, such as a General Packet Radio Service (GPRS) connection, an EDGE connection (Enhanced Data rates for GSM Evolution connection), or a 3G connection, such as in accordance with the IMT-2000 standard discussed above. Further, it should be noted in certain instances, where the giftee device 282 and the gifter device 10 maintain the NFC connection 286, such as be remaining within a suitable proximity or range (e.g., 2-4 cm) for facilitating an NFC connection, that a second tap operation (e.g., 338) may not be required.

The gift request 340 may include the gifter's account information, the giftee's account information (e.g., received in the acceptance message 336), as well as the identity of the selected media files to be gifted to the giftee device 282. Once the gift request is received by the server 98, the gift request 340 may be processed by the server 98, as indicated by the reference numeral 344. By way of example, the processing of the gift request 340 may include accessing the gifter's account and charging an appropriate amount for the selected gift files. As noted above, the charges may be applied to a credit card account associated with the gifter's online digital media provider account. Thereafter, once the gift request 340 has been processed, an approval message may be transmitted to the gifter device 10 by way of the network 342.

Once the gifter's account has been charged for the gifted media file or files, the server 98, using one or more DRM keys associated with the giftee's account, may identify the selected media files (e.g., stored in the database 100 of FIG. 4) and create a gift copy of the media file which may be processed to apply DRM protection, as indicated by the reference number 366. Once the DRM protected the gift files have been created by the server 98, these files may be transmitted to the giftee device 282 by way of the network 342. In one embodiment, the DRM protected gift files may be automatically transferred to the giftee device 282, such as by attachment in an e-mail message. In further embodiments, the gift files may remain on the server 98 until the giftee device 282 connects to the online digital media provider 92 to retrieve the gift files. Upon receiving the gift files, indicated here by the reference number 368, the giftee may play the gift files on the giftee device 282, such as by using the media player application 36, as discussed above.

Figure 10A:
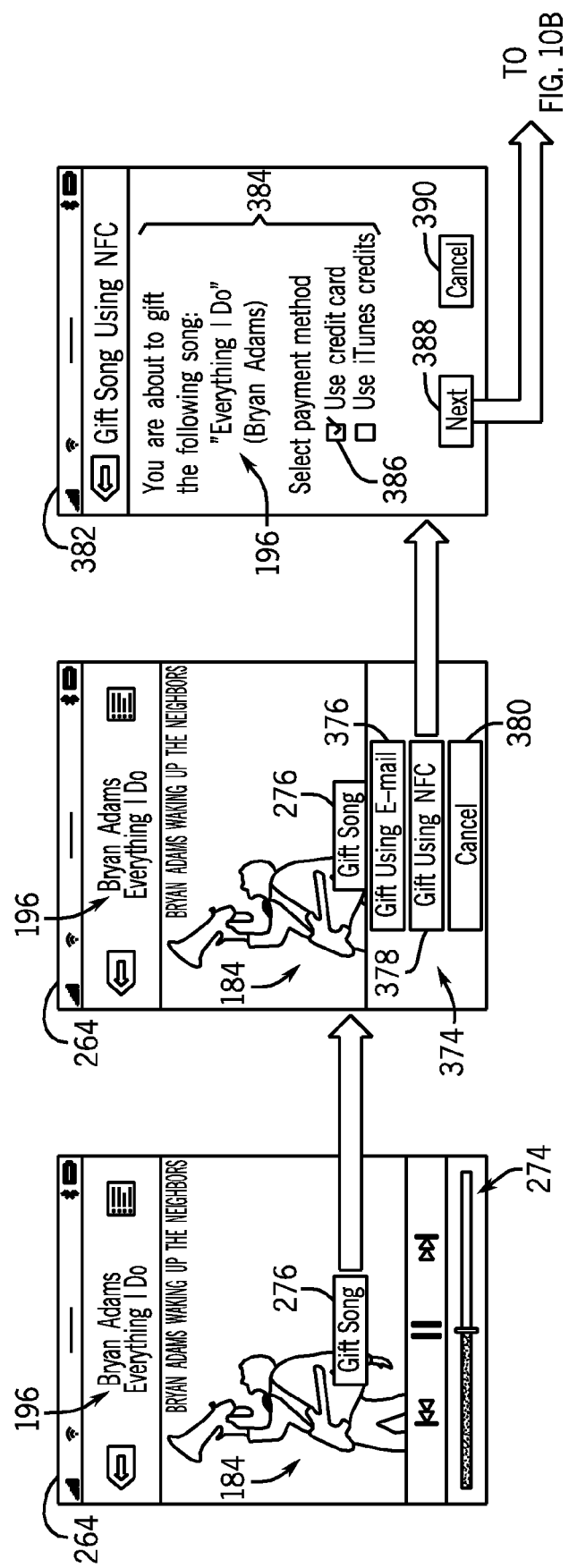
FIG. 10A shows a plurality of screen images that may be displayed on the giftee device illustrating a method for initiating the gifting process of FIG. 7.
Figure 10B:
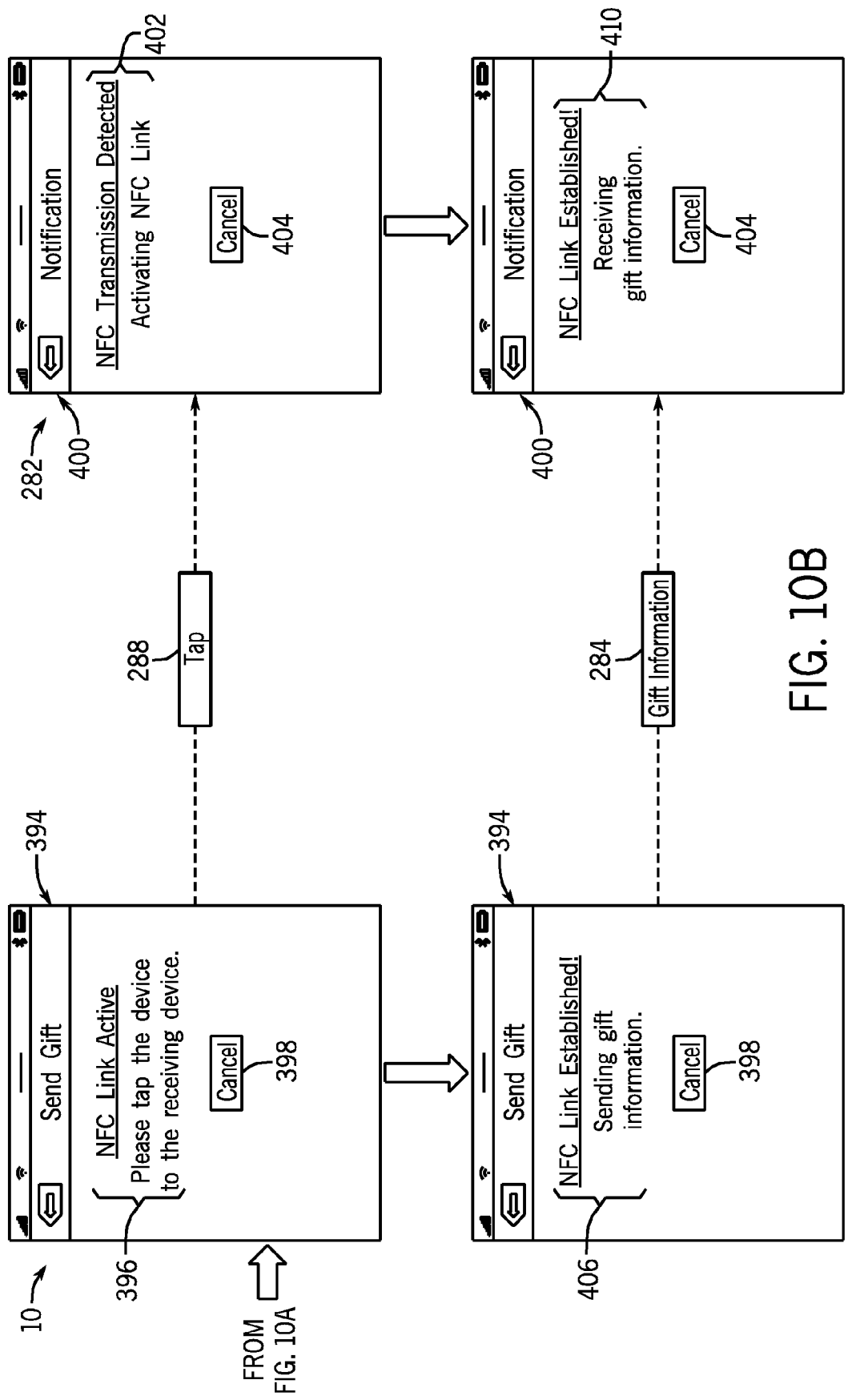
FIG. 10B shows a plurality of screen images depicting the transmission of gifting information from the gifter device to the giftee device using a communication path in accordance with the gifting process depicted in FIG. 7.

Referring now to FIGS. 10A-10C, a plurality of screen images depicting the gifting of a media file in accordance with the gifting process shown in FIG. 7 is illustrated. For instance, beginning with the screen 264, which was previously discussed with reference to FIG. 6, the gifter may initiate the gifting process on the gifter device 10 by selecting the graphical button 276. Upon selection of the graphical button 276, a pop-up window 374 may be displayed on the screen 264 and provide the graphical buttons 376, 378, and 380. As shown here, the graphical button 376 may provide a function by which a media file may be gifted using an e-mail communication, which will be discussed in further detail below. The graphical button 378 may represent the function by which the gifter may gift the selected media file using an NFC connection, such as the NFC connection 286 illustrated in FIG. 7. Additionally, the pop-up window 374 may provide the graphical button 380 by which the giftee may select to cancel the gifting process and return to the screen 264.

As shown in the present figure, the gifter may select the graphical button 378 to navigate to the screen 382 in order to initiate the process of gifting the selected music file 196 using an NFC connection. As displayed on the screen 382, a notification message 384 may appear on the gifter device 10 generally informing the gifter as to the identity of the media file 196 that has been selected for gifting to the giftee device 282. The notification message 384 may further prompt the gifter to select a payment method to which the gifting of the selected file 196 may be charged. For instance, as illustrated in the present figure, the gifter may select the check box graphic 386 to specify that the gifted file is to be charged to a credit card account associated with the gifter's online digital media provider account. The screen 382 may also display the graphical button 388 by which the user may select to initiate the NFC connection once the payment method has been selected, as well as the graphical button 390 by which the user may select to cancel the gifting process. As will be appreciated, the steps performed in accordance with the screen images of FIG. 10A may constitute the determination of the gift offer 284 of FIG. 7 to be transmitted to the giftee device 282.

The function represented by the graphical button 388 may correspond to executing an instruction on the gifter device 10 to power on the NFC device 50 of the gifter device 10, thus placing the device 10 into an NFC active mode and enabling the NFC interface 64, as described above. For example, referring now to FIG. 10B, upon selection of the graphical button 388, the screen 394 may be displayed on the gifter device 10. The screen 394 may include a notification message 396 indicating that the NFC interface 64 of the gifter device 10 is presently active and capable of establishing an NFC connection with an external device for the transmission of the gift offer 284. Accordingly, the notification message 396 may further instruct the gifter to tap the gifter device 10 to the giftee device 282 in order to establish the NFC connection (e.g., 286) for transferring the gift offer 284.

Referring briefly to FIG. 10C, the establishment of an NFC connection 286 between the gifter device 10 and the giftee device 282 by way of the tap operation 288 is illustrated. As discussed above, the NFC device 50 of the gifter device 10 may be powered on upon the selection of the graphical button 388 illustrated in FIG. 10A, thus placing the gifter device 10 into a host mode or active mode (e.g., 292) in which the active gifter device 10 may periodically emit NFC transmission ping messages 298, as discussed above with reference to FIG. 8. As the active gifter device 10 is placed within an acceptable distance 399 (e.g., 2-4 cm) from the giftee device 282, which may presently be in a passive or wake on NFC mode (e.g., 290), the giftee device 282 may transition from the passive to an active mode in which the NFC device 50 within the giftee device 282 is powered on, thus enabling the giftee device's 282 corresponding NFC interface 64 and providing for the establishment of the NFC connection 286 between the between respective NFC interfaces 64 on the gifter device 10 and the giftee device 282 through which the gift offer 284 may be transmitted. Further, although the giftee device 282 illustrated in FIG. 10C is depicted as being a portable device similar to the gifter device 10, it should be understood that the present technique may also be implemented in which the giftee device 282 includes a non-portable device, such as a personal computer or a computing workstation. Thus, it should be understood that various implementations of the present technique are intended to provide for the gifting of media files between any suitable types of electronic devices, whether portable or non-portable.

Returning to FIG. 10B, once the giftee device 282 and the gifter device 10 are tapped (e.g., tap operation 288), the giftee device 282 may detect the NFC transmissions (e.g., ping messages 298) being emitted from the gifter device 10, and transition from a passive to an active mode, in which a corresponding NFC device 50 of the giftee device 282 is powered on. For example, as shown in FIG. 10B, upon the detection of the NFC transmissions from the gifter device 10, the screen 400 may be displayed on the giftee device 282. The screen 400 may include a notification message 402 informing the giftee that an NFC transmission has been detected and that in response, the corresponding NFC device 50 of the giftee device 282 is being powered on, thus enabling the corresponding NFC interface 64. The notification screen 400 may further provide a graphical button 404 which, if selected, may allow the giftee to cancel the NFC connection process depicted herein.

As shown in the present figure, if the establishment of the NFC connection 286 is permitted on the giftee device 282, then the screen 394 displayed on the gifter device 10 may be updated to display the notification message 406. The notification message 406 may indicate that an NFC connection (e.g., 286) has been established between respective NFC interfaces 64 of the gifter device 10 and the giftee device 282 and that through the NFC connection 286, the gift offer 284 is being transmitted to the giftee device 282. The screen 394 may also include the graphical button 398 by which the gifter may select to canceling the gifting process either prior to or during the transmission of the gift offer 284. Meanwhile, the notification screen 400 displayed on the giftee device 282 may similarly be updated to display the notification message 410. The notification message 410 may indicate to the giftee that the NFC connection 286 has been established between the giftee device 282 and the gifter device 10, and that gift offer 284 transmitted from the gifter device 10 is being received on the giftee device 282 by way of its corresponding NFC interface 64.

Figure 10D:
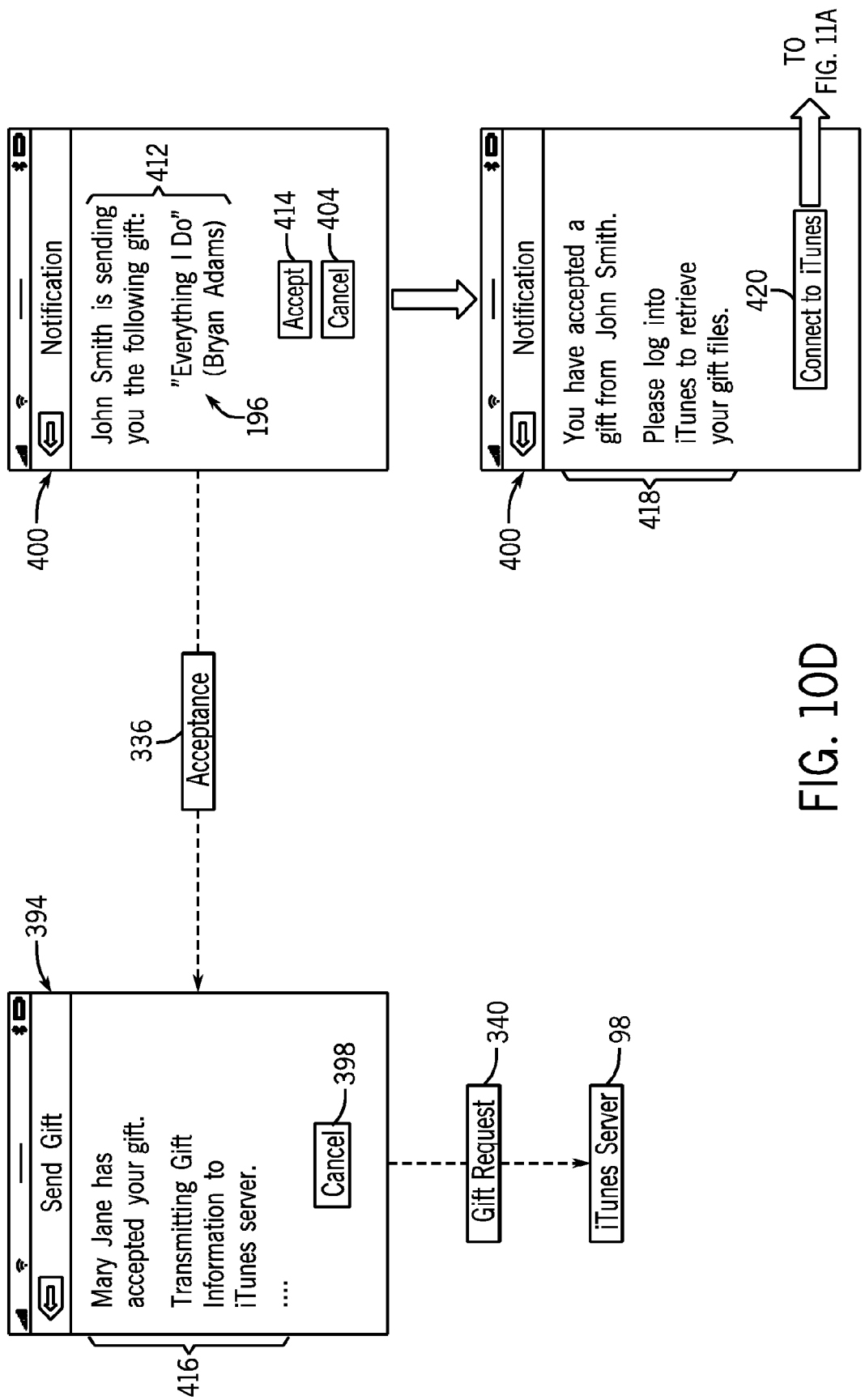
FIG. 10D shows a plurality of screen images depicting the acceptance of the gifted media file by the giftee device and the transmission of a gift request to the online service by the gifter device in accordance with one embodiment.

Continuing now to FIG. 10D, once the gift offer 284 has been received by the giftee device 282, the screen 400 may be updated to display the notification message 412. The notification message 412 may indicate to the giftee that the gifter is attempting to gift the media file 196 to the device 282 being operated by the giftee. If the giftee chooses to accept the gift offer 284, the giftee may do so by selecting the graphical button 414. Upon selection of the graphical button 414, the acceptance message 336, which may include the giftee's account information associated with the online digital media provider 92, as discussed above with reference to FIG. 7, may be transmitted to the gifter device 10 by way of the NFC connection 286. Thereafter, once the acceptance message 336 has been received by the gifter device 10, the screen 394 may be updated to display the notification message 416, which may indicate to the gifter that the giftee has accepted the gift offer 284 (e.g., in this case the media file 196) and that a gift request 340, which may include the gifter's and giftee's account information associated with the online digital media provider 92, is being sent to the online digital media provider 92 for processing.

As mentioned above with reference in FIG. 7, the server 98, based on the account information specified in the gift request 340, may obtain authorization to charge the gifter's account for the price of the media file 196 to be gifted to the giftee. Once the gifter's account has been charged, the server 98 may generate a gift file using one or more DRM encryption keys associated with the giftee's account. In accordance with one aspect of the present technique, the generated gift file may be stored on the server 98 and may be retrieved by the giftee, for example, by connecting to the online digital media service 92. For instance, referring back to the screen 400, once the acceptance 336 of the gift offer 284 has been sent, the screen 400 may be updated to display the notification message 418. The notification message 418 may inform the giftee that the accepted gift, which may be the media file 196, may be retrieved or downloaded to the giftee device 282 by connecting into the online digital media provider 92. Additionally, the updated screen 400 may include the graphical button which when selected may initiate a connection to the online digital media provider 92, such as by initiating the application associated with the graphical icon 34 discussed above, through which the giftee may retrieve the gifted media file 196. In other implementations, the server 98 of the online digital media provider 98 may be configured to automatically transfer the generated gift file to the giftee as an attachment in an e-mail message, as mentioned above.

Figure 11A:
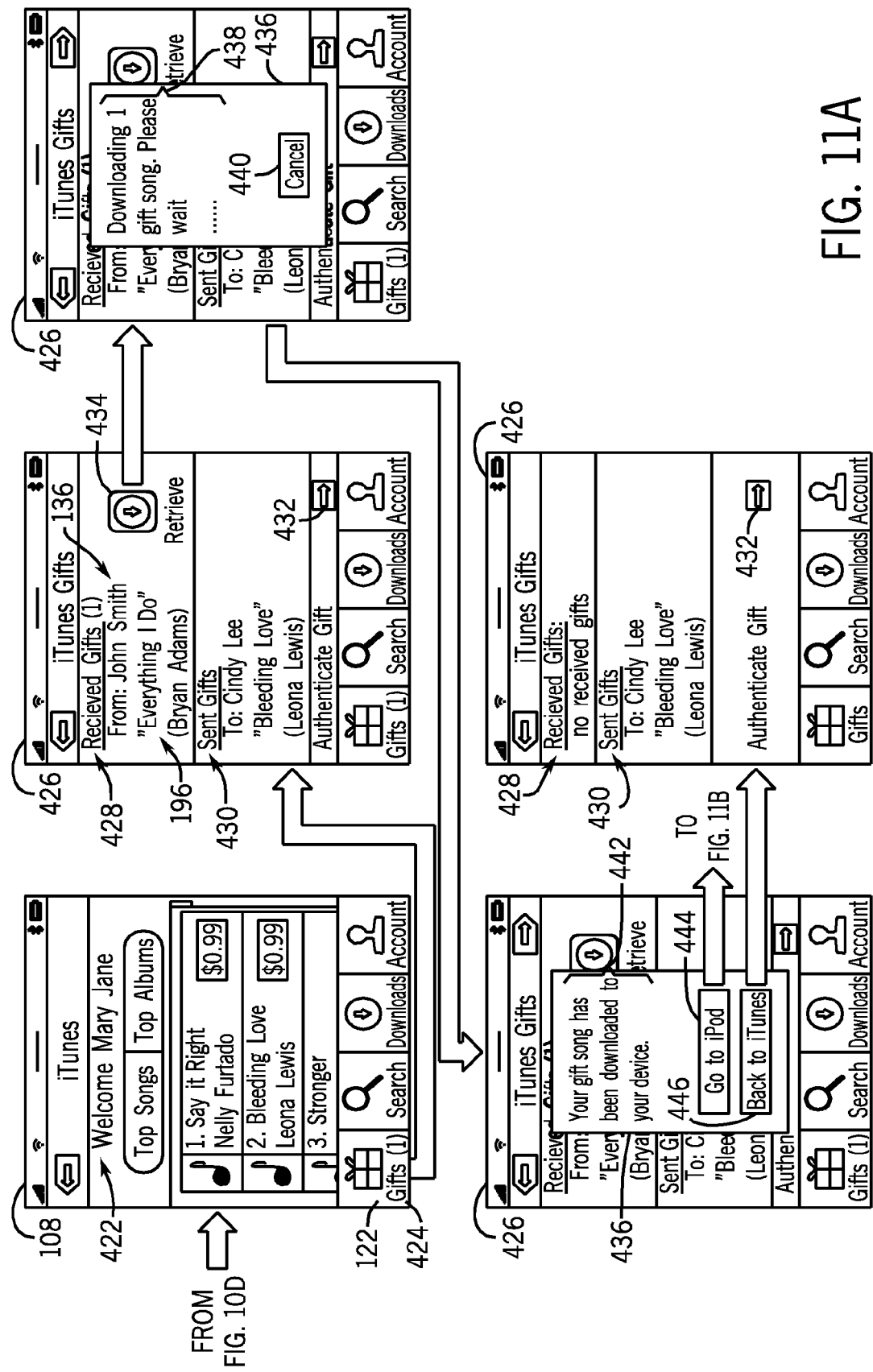
FIG. 11A shows a plurality of screen images illustrating the connection of the giftee device to the online service of FIG. 4 to retrieve the gifted media file accepted by the giftee device in FIG. 10D.

The retrieval of the gifted media file 196 from FIG. 10D may now be illustrated by the screen images depicted in FIG. 11A. For example, by selecting the graphical button 420, the giftee may initiate a connection to the online digital media provider 92 and cause the home screen 108 of a virtual store interface provided by the online digital media provider 92 to be displayed on the giftee device 282. As noted above, the home screen 108 may essentially provide the giftee with a virtual store interface through which the giftee may search for and select from various types of media files for purchase. It should also be noted that the screen 108 illustrated in FIG. 11A may be identical to the screen 108 depicted in FIG. 5A with the exception of the notification message 422. Here, the notification message 422 may display the identity of the giftee as opposed to the identity of the gifter (e.g., notification message 110).

As discussed above, the screen 108 may also display the graphical icon 122. The graphical icon 122 may provide a user with access to one or more gifting functions, which may include the retrieval of gifted files sent by another user (e.g., the gifter), as well as provide functions for the redeeming of electronic gift certificates or the authentication of locked gift files, as will be discussed in detail below. For example, by selecting the graphical icon 122, the giftee may navigate to the screen 426, which may display a listing 428 of received gifts that have been received by the giftee, as well as a listing 430 of gifts that have been sent to other users of the online digital media provider 92 by the giftee. Additionally, the graphical button 432 may also be provided on the screen 426, and may provide additional functions, such as the above-mentioned functions for redeeming electronic gift certificates and for authenticating and unlocking gifted files, as will be discussed in further detail below. Further, thought not depicted in the present figure, in some implementations, the screen 426 may further provide the giftee with additional media file recommendations based on the received gifts. For instances, the online digital media provider 92 may suggests additional songs in the same genre as the gifted song 196, by which the giftee may decide to purchase.

Referring back to the listing 428 of received gifts, the screen 426 may indicated to the giftee that the gifted media file 196 has been sent by the gifter 136. In order to retrieve the gifted media file 196, the giftee may select the graphical button 434. For example, by selecting the graphical button 434 the giftee may initiate the process of downloading the gifted file, which may have been temporarily stored on the server 98 of the online digital media provider 92, to the giftee device 282. For instance, as illustrated in the present figure, the selection of the graphical button 434 may cause the pop-up window 436 to be displayed on the screen 426. The pop-up window 436 may include the notification message 438 informing the giftee that the gifted music file 196 is currently being downloaded to the giftee device from the server 98. The pop-up window 436 may include the graphical button 440 which may allow the giftee to cancel the download is necessary.

Once the download has been completed, the popup window 436 may be updated to display the notification message 442. Next, the giftee may have the option of selecting the graphical button 444 in order to initiate the media player application (e.g., represented by the icon 36) discussed above, or may return to the virtual store application of the online digital media provider 92 by selecting the graphical button 446. For example, by selecting the graphical button 446, the giftee may be returned to the screen 426. It should be noted, that the listing of received gift files 428 in the updated screen 426 may reflect that there are currently no gifted files to be downloaded since the gifted file 196 has already been received on the giftee device 282.

Figure 11B:
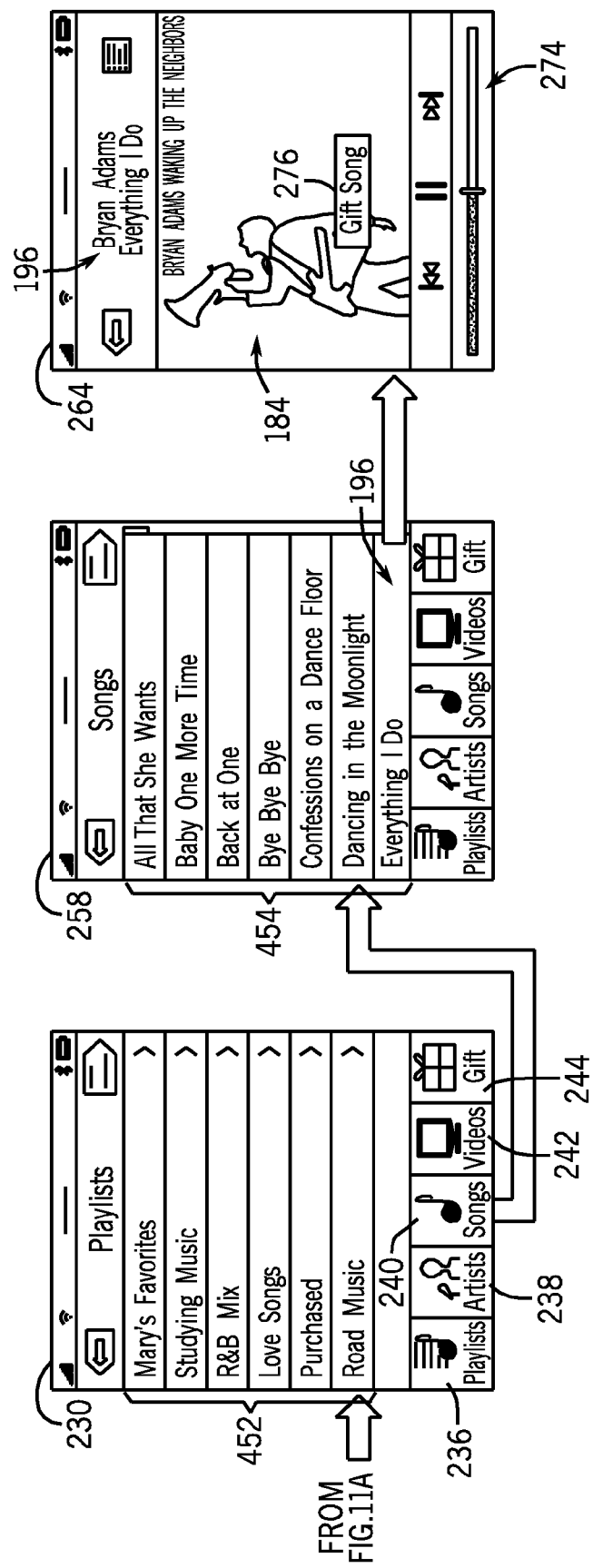
FIG. 11B shows a plurality of screen images illustrating the playback of the retrieved gifted media file from FIG. 11A on the giftee device using a media player application.

Referring back to pop-up window 436, if the giftee chooses to select the graphical button 444 once the download of the gift media file 196 has been completed, the media player application 36 may be initiated on the giftee device 282. Referring to FIG. 11B, a technique for playing back received gifted music file 196 on the giftee device 282 is illustrated. As discussed above, the initiation of the media player application 36 may cause the screen 230 to be displayed on the giftee device 282. Here, the screen 230 displayed on the giftee device 282 may include a listing 452 of the playlists defined by the giftee. By selecting the graphical button 240 on the screen 230, the giftee may navigate to the screen 258 which, as discussed above, may display a listing 454 of music files presently stored on the giftee device 282. As illustrated in the present figure, the listing 454 of music files stored on the giftee device 282 may include the gift file 196 downloaded from the online digital media provider 92 in FIG. 11A. Accordingly, as discussed above, the giftee may play back the gifted music file 196 by selecting its location on the listing 454, thereby navigating the giftee to the screen 264 by which the giftee may enjoy the playback of the gifted music file 196 on the giftee device 282. Additionally, the giftee may have the option of gifting the media file 196 to additional users of the online digital media provider 92 by selecting the graphical button 276 and performing one or more of the gifting processes set forth in the present disclosure.

Figure 11C:
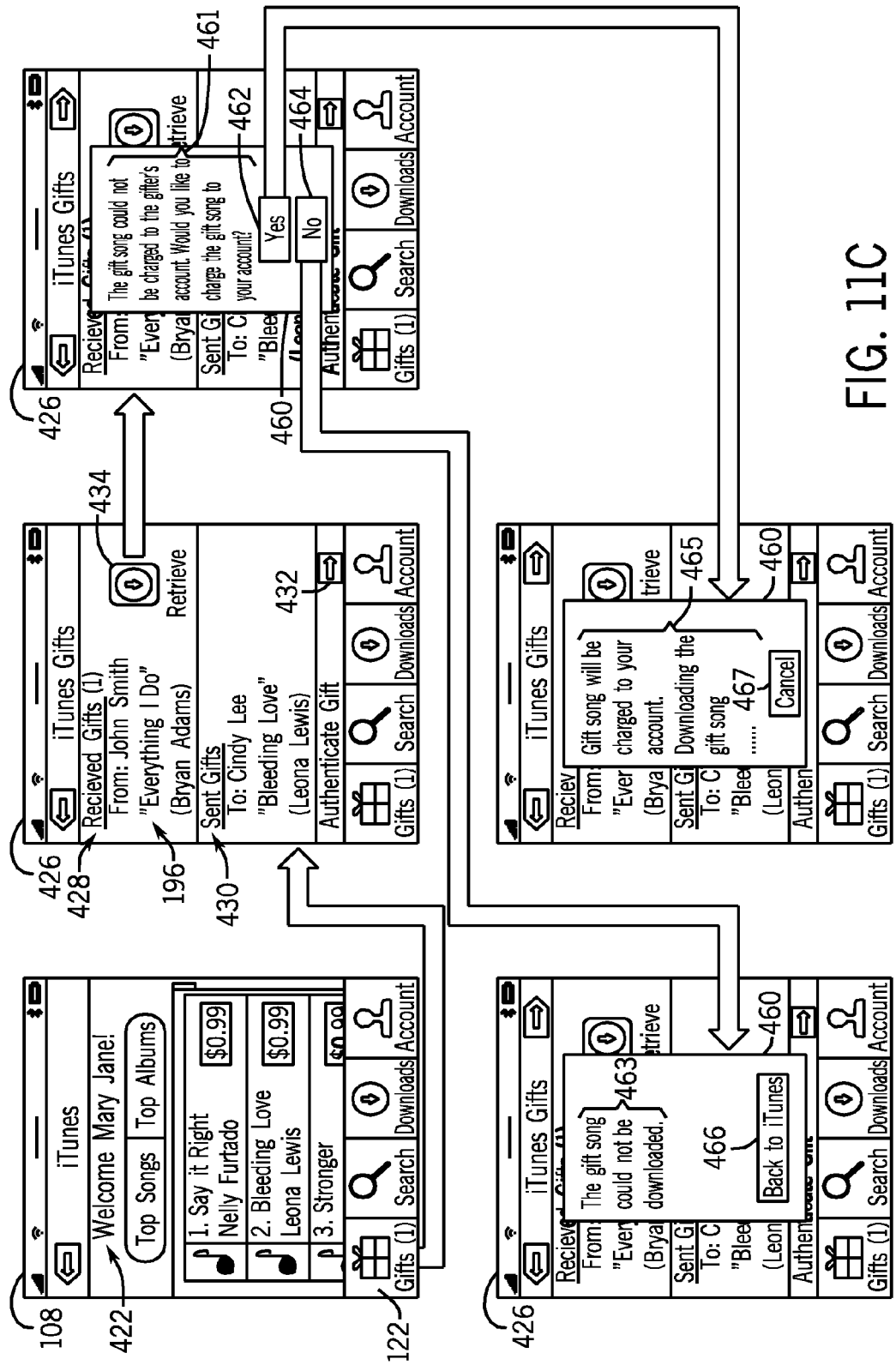
FIG. 11C shows a plurality if screen images illustrating a method by which the giftee device may approve a payment for the gifted media file if the gifter's payment account cannot be charged.

Continuing now to FIG. 11C, an alternate scenario is illustrated in which the gifter's account could not be charged for the gifted music file 196. In this situation, the giftee, upon attempting to retrieve the gifted file 196, may be notified of the failure to charge the gifter's account and may be provided the option of charging the gifted file 196 to the giftee's own account. For example, as illustrated in FIG. 11C, the giftee may access the screen 426 by selecting the graphical icon 122 from the screen 108 as discussed above. Upon selecting the graphical button 434 from the screen 426 to download the gifted media file 196, the pop-up window 460 may be displayed on the giftee device 282 and may include the notification message 461 informing the giftee that the gifted media file 196 could not be charged to the gifter's account. The notification message 461 may further offer the giftee the options, by way of the graphical buttons 462 and 464, respectively, of either charging a payment associated with the gifted music file 196 to the giftee's own account or declining the download of the gifted media file 196. For example, as illustrated in the present figure, if the graphical button 464 is selected, the pop-up window 460 may be updated to display the notification message 463 informing the giftee that the gifted media file 196 cannot be downloaded. Thus, the giftee may select the graphical button 466 to return to the virtual store interface of the online digital media provider 92, such as the screen 108, and may have the option of selecting additional media files for purchase and download to the giftee device 282.

If the giftee chooses to charge the gifting of the media file 196 to the giftee's own account, the giftee may select the graphical button 462, whereby the pop-up window 460 may display the notification message 465 indicating to the giftee that the charge for the gifted media file 196 will be applied to the giftee's account. Thereafter, the download of the gifted music file 196 may begin, thus transferring the gifted media file 196 from the server 98 to the giftee device 282. As shown here, the giftee may cancel the download if necessary by selecting the graphical button 467. In accordance with one embodiment, a download of a gifted file that was canceled while in progress may be resumed from the point from which the download was canceled.

Figure 12:
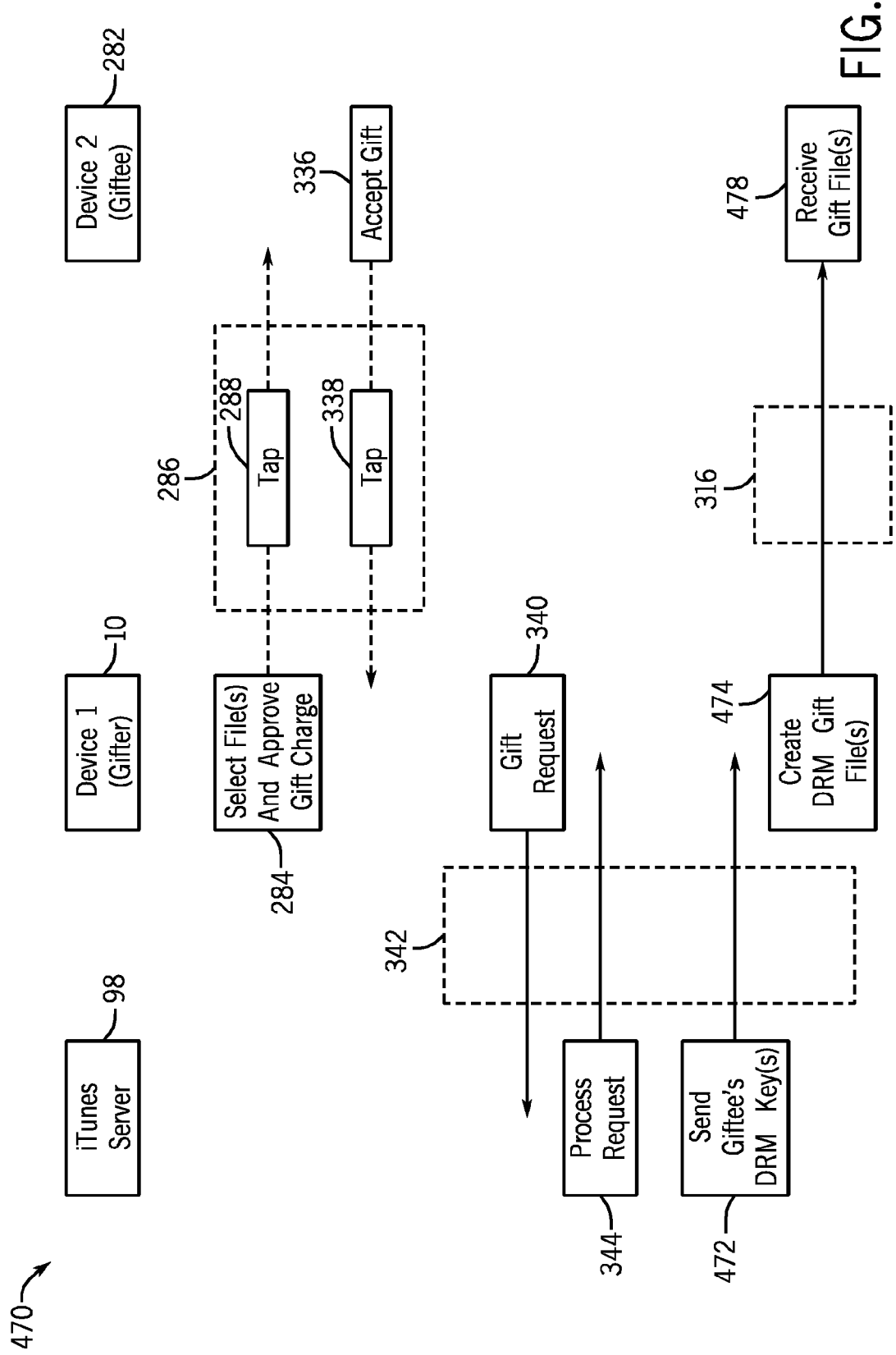
FIG. 12 is a schematic representation illustrating the gifting of the purchased media file of FIG. 5B from a gifter device to a giftee device, wherein the gifted media file is created on the gifter device in accordance with a further implementation of the present technique.

Continuing now to FIG. 12, a schematic representation of a system 470 for gifting a media file from the gifter device 10 to the giftee device 282 is illustrated in accordance with a further implementation of present technique. In the presently illustrated figure, the creation of the gift file 196 may be performed externally with respect to the server 98 associated with the online digital media provider 92. For example, once the selected file or files to be gifted have been accepted by the giftee device 282, such as by transmitting the acceptance message 336 to the gifter device 10, a gift request 340 may be transmitted to the server 98 of the online digital media provider 92 by way of the network 340 which, as discussed above, may be provided by any of the networking communication interfaces available on the gifter device. In the present implementation, the gift request 304 may include a request for one or more DRM keys associated with the giftee's account.

As illustrated by the reference number 344, the gift request 340 may be processed by the server 98, such as to charge the price of the gifted media file or files to the gifter's account. In the presently illustrated embodiment, once the gift request has been processed, the creation of the gifted file may be delegated to the gifter device 10. For example, rather than creating the gifted file on the server 98, the server 98 may instead transmit the giftee's DRM keys to the gifter device, as indicated by the reference number 472, in response to the gift request 340. As shown here, the giftee's DRM keys may be transmitted to the giftee device 282 by way of the network 342. Upon receiving the giftee's DRM keys, these keys may be used by the gifter device 10 to create the gift file, which may essentially be a duplicate file of the originally selected media file 196, but with DRM protection applied such that the gift file 196 may only be played on authorized devices associated with the giftee's account. As will be appreciated, by offloading the tasks of processing media files for the application of DRM protection in creating the gift file to the gifter device 10, the server 98 may be able to save substantial processing and communication bandwidth for what may be a relatively light computational task.

Once DRM protection has been applied to the gift file using the giftee's DRM keys, as indicated by the reference number 474, the gift files may be transferred to the giftee device by way of a network connection, which may be determined by the communication profiles 306 and 308 exchanged during the tap operation 288, as discussed in FIG. 9. For instance, using the device service discovery protocol mentioned above, the giftee device 282 and gifter device 10 may establish a connection to a common network, such as the wireless LAN connection 316. Thus, through the established network 316, the giftee device 282 may receive the gift files, as indicated by the reference number 478. It should be appreciated, however, that the network by which the gift files are transferred from the gifter device 10 to the giftee device 282 may be provided by any suitable peer-to-peer connection that may be established between the devices, including an ad-hoc connection, or a PAN connection, such as using the Bluetooth communication protocol, for example.

Figure 13A:
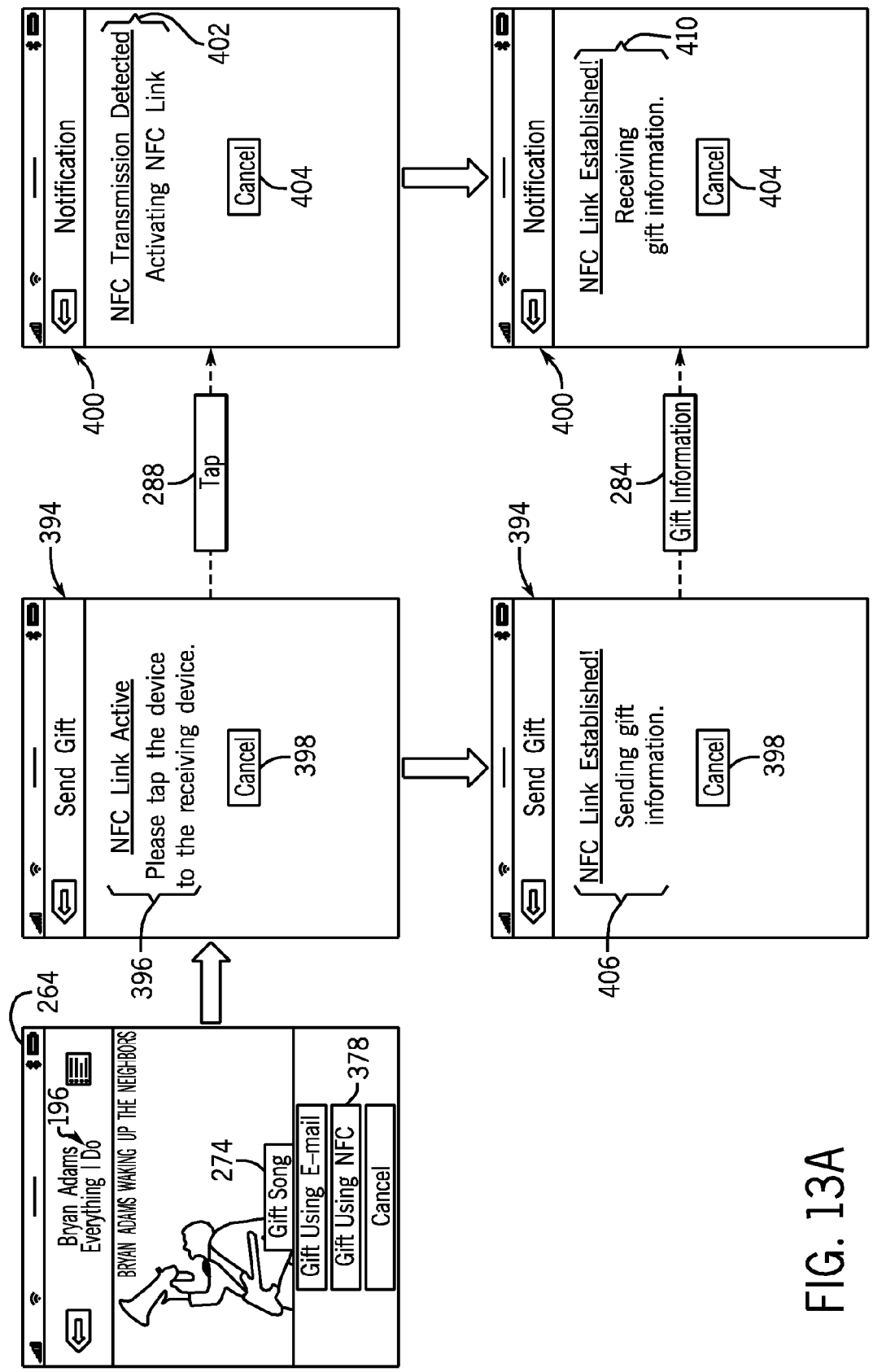
FIG. 13A shows a plurality of screen images depicting the transmission of gifting information from the gifter device to the giftee device using a communication path in accordance with the gifting process depicted in FIG. 12.
Figure 13B:
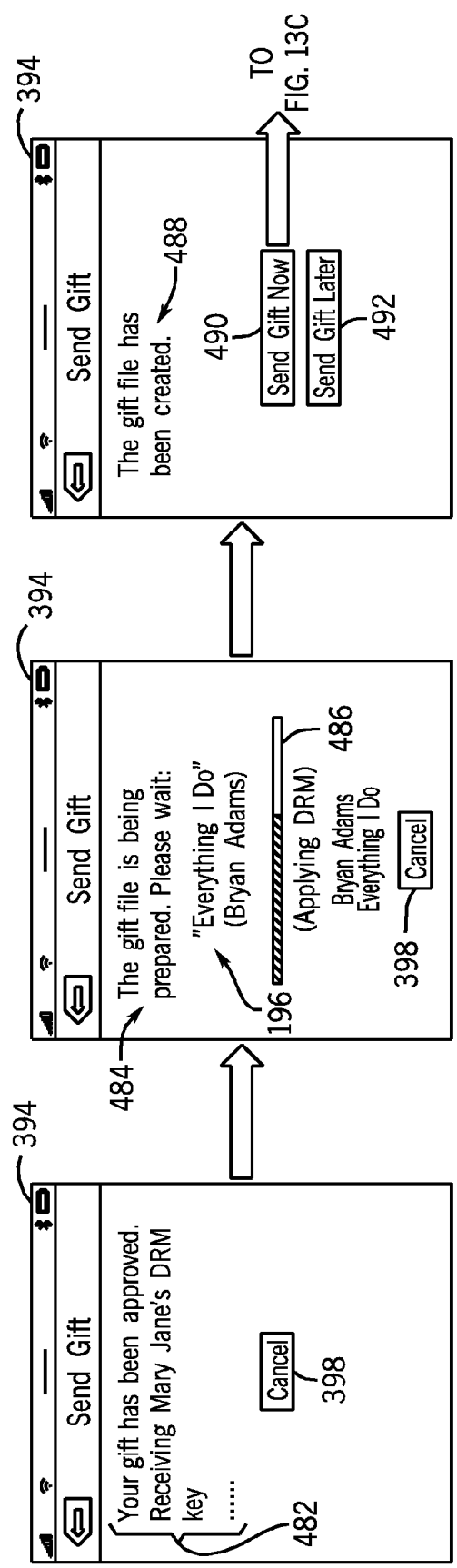
FIG. 13B shows a plurality of screen images depicting the creation of a gift file on the gifter device in accordance with the gifting process depicted in FIG. 12.

The media gifting techniques depicted in FIG. 12 may be better understood with reference to the screen images depicted in FIGS. 13A-13C. Referring first to FIG. 13A, the establishment of the NFC connection 286 through which the gifter device 10 may transmit the gift offer 284 and receive an acceptance of the gift from the giftee device 282 is illustrated. For example, as discussed above, the gifting process may be initiated by selecting the graphical button 378 from the screen 264. Once the graphical button 378 is selected, establishment of the NFC connection 286 may be initiated, as illustrated by the screens 394 and 400 in FIG. 13A. As discussed above, once the NFC connection 268 is established, gifter device 10 may transmit the gift offer 284 to the giftee device 282 and may wait for an acceptance of the gift offer by the giftee device 282. For example, as discussed above with reference to FIG. 10D, an acceptance message 336 may be transmitted to the gifter device 10 by way of the established NFC connection. Thereafter, the gifter device 10 may transmit a gift request (e.g., 340) to the server 98. As discussed above, if the gift request is approved by the server 98, one or more DRM keys associated with the giftee's account may be transmitted or sent to the gifter device 10 to be used in the creation of a DRM protected gift file which may be transferred to the giftee device 282 (e.g., using the network 316).

For instance, referring now to FIG. 13B, once the gift request 340 has been approved by the server 98, the giftee's DRM key may be sent to the gifter device 10 using the network 342, and the screen 394 displayed on the gifter device 10 may be updated to display the notification message 482. Once the giftee's DRM key is received, the screen 394 may be further updated to display the notification message 484. As shown here, the notification message 484 may indicate that a gift file 196 is being prepared. As shown in the illustrated figure, the screen 394 may further display the identity of the gift file 196, as well as a progress indicator graphical element 486. For example, the progress indicator 486 may convey to the gifter the progress of the DRM protection process being applied to the gift file 196. Once the application of DRM protection is completed, the screen 394 may be further updated to display the notification message 488 and the graphical buttons 490 and 492. As shown here, the notification message 488 may indicated to the gifter that the gift file 196 has been created and may be presently stored on the gifter device 10. Accordingly, the gifter may transmit the gift file to the giftee device 282 immediately by selecting the graphical button 490, or may choose to send the gift file at a later time by selecting the graphical button 492. For example, in one embodiment, the selection of the graphical button 492 may allow the gifter to send the gift file 196 to the giftee device 282 at a later time remotely, such as by using an e-mail program. Further, as will be appreciated, for security purposes, once the gift file 196 is created, the giftee's DRM keys may be deleted from the gifter device 10.

If the graphical button 490 is selected, the gifter device 10 may attempt to establish a network connection with the giftee device 282 in order to facilitate the transfer of the gift file 196 to the giftee device 282. For example, referring now to FIG. 13C, upon selection of the graphical button 490, the screen 394 may be updated to display the notification message 494. Referring briefly back to FIG. 9, the connection profile 306 associated with the gifter device 10 may indicate that the gifter device 10 is presently connected to a wireless LAN network 316. Thus, in the presently illustrated embodiment, the gifter device 10 may be configured to wait for the giftee device 282 to join the network 316 as well. It should be appreciated however, that in additional implementations, the gifter device 10 may be configured to identify and join a network to which the giftee device 282 is connected, such as the network 318 as indicated by the giftee device's 282 communication profile 308. Referring back to FIG. 13C, the screen 400 displayed on the giftee device 282, as discussed above, may also be updated to display the graphical message 496. As will be appreciated, the updated screen 400 in FIG. 13C may be displayed upon acceptance of the gift offer 284 send from the gifter device 10 using the NFC connection 286. Further, based on the tap operation 288 used to establish the NFC connection, the giftee device 282 may identify a network to which the gifter device 10 is presently connected, such as by analyzing the gifter device's communication profile 306. Accordingly if a commonly available network, such as the network 316, is identified, the notification message 496 may include a prompt asking whether the gifter wishes to connect to the network 316 for receiving the gift file 196. Thus, the giftee may select the graphical button 498 to connect to the network 316 or select the graphical button 500 to cancel the gifting process.

If the giftee selects the graphical button 498, a connection may be established to the network 316. As will be appreciated, the connection of the giftee device 282 to the network 316 in the presently illustrated embodiment may include first terminating the connection to the network 318 to which the giftee device 282 was previously connected. Upon detecting the connection of the giftee device 282 to the network 316, the screen 394 displayed on the gifter device 10 may be further updated to display the notification message 502 which may indicated that the giftee device 282 is presently connected to the network 316, which may be a common network to which each of the devices 10 and 282 are connect, or a peer-to-peer network, such as an ad-hoc connection or a Bluetooth pairing, for instance. In the presently illustrated embodiment, the gifter device 10 may be configured to automatically initiate the transfer of the gift file 196 once the gifter device 282 is detected on the network 316. For instance, the notification message 502 may further indicate that the gift file 196 created in FIG. 13B is being transmitted to the giftee device 282 by way of the network 316. Meanwhile, the screen 400 on the giftee device 282 may also be updated to display the notification message 506. As shown here, the notification message 506 may indicate to the giftee that the giftee device 282 has connected to the network 316 and is presently receiving the gift file 196 (e.g., via a wireless LAN interface 62).

Figure 14:
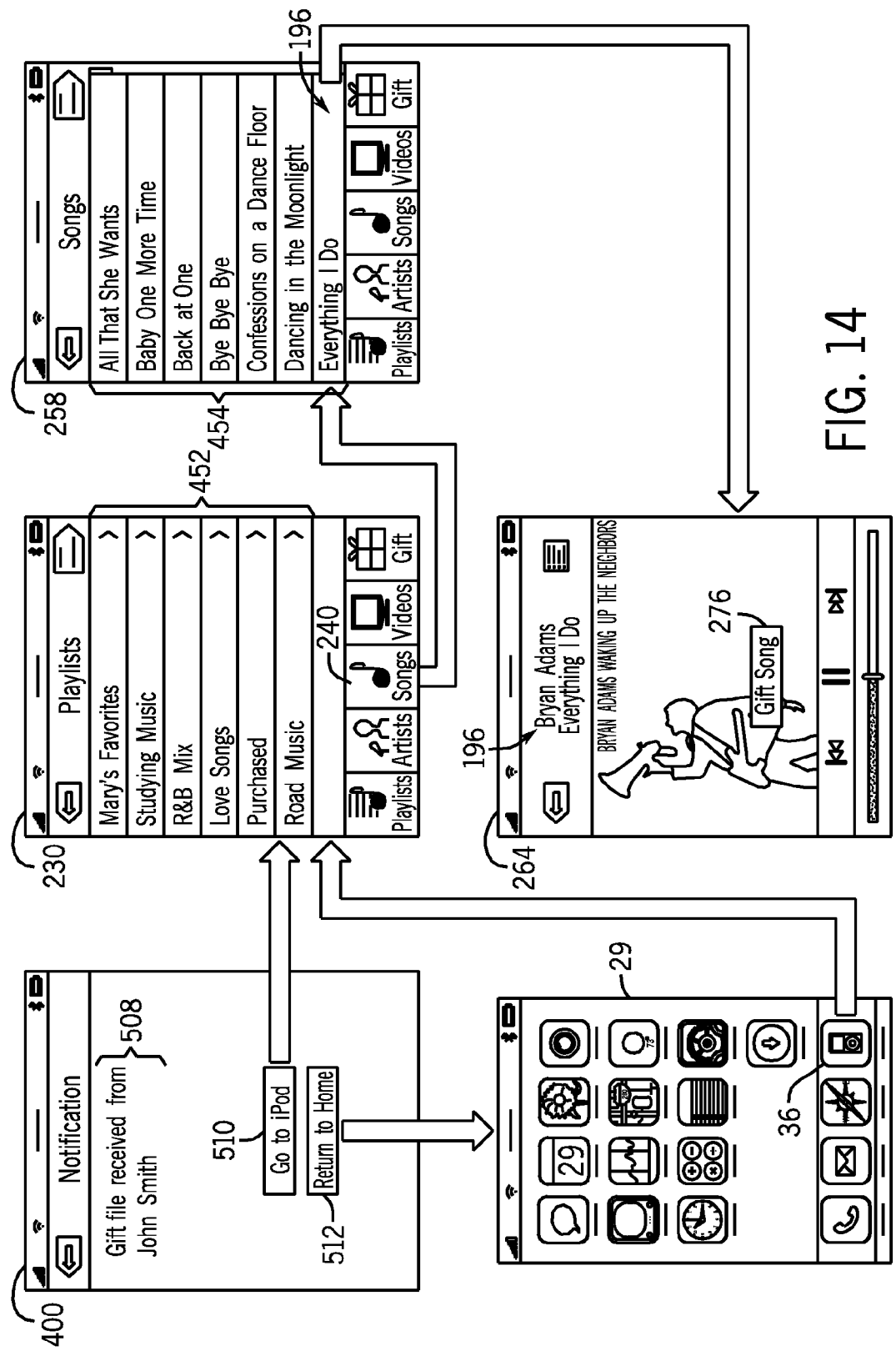
FIG. 14 shows a plurality of screen images illustrating the playback of the gift file received in FIG.13B by the giftee device.

Continuing now to FIG. 14, once the gift file 196 has been received by the giftee device 282, the screen 400 may be further updated to display the notification message 508. As shown here, the notification message 508 may indicate that the gift file 196 transmitted from the gifter device 10 has been received and stored on the giftee device 282. The screen 400 may also include the graphical buttons 510 and 512. In order to play back the received gift file 196, the giftee may select the graphical button 510 to initiate the media player application 36, as discussed above. For instance, the selection of the graphical button 510 may cause the screen 230 to be displayed on the giftee device 282. Alternatively, the user may also navigate to the screen 230 by selecting the graphical button 512 to return to the home screen 29 of the GUI 28, as discussed above, and further selecting the graphical icon 36 to initiate the media player application 36, thus displaying the screen 230 on the giftee device 282.

From the screen 230, the giftee may select the graphical icon 240 in order to navigate to the screen 258, which, as discussed above, may display a listing 454 of music files presently stored on the giftee device 282 and available for playback. As shown here, the listing 454 may include the gift file 196 transferred from the gifter device 10 in FIG. 13C. Accordingly, the giftee may select the gift file 196 to further navigate to the screen 264, in which the gift file may be played back on the giftee device 282. For example, as discussed above, where the gift file is a music file, the audio input/output elements 46 may be utilized to output sound from the device 282. Alternatively, the user may connect a set of headphones or external speakers to the input port 44 in order to facilitate the playback of the gift file 196. As discussed above, the screen 264 may also display the graphical button 276 by which the giftee may further gift the media file 196 to additional users of the online digital media provider 92 using one or more of the techniques discussed in the present disclosure.

Figure 15:
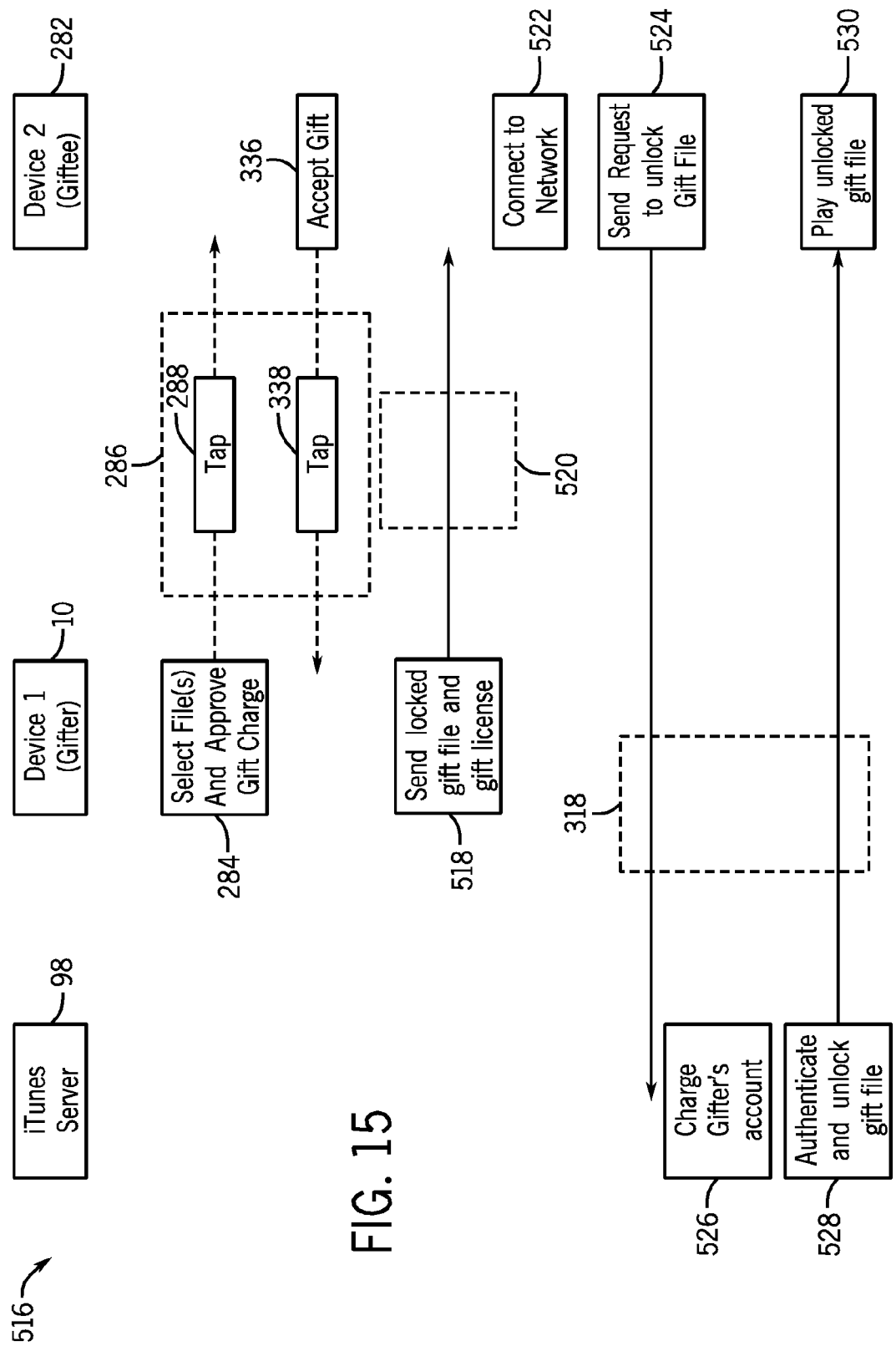
FIG. 15 is a schematic representation illustrating the a technique for gifting the purchased media file of FIG. 5B from a gifter device to a giftee device in accordance with a further implementation of the present technique, wherein the gifter device is temporarily unable to connect to the online service to transmit a gift request.

Continuing now to FIG. 15, a system for gifting a media file in accordance with a further implementation of the present technique is illustrated and generally referred to herein by the reference numeral 516. Specifically, the presently illustrated embodiment depicts a scenario in which subsequent to the acceptance of a gift offer 284 by the giftee device 282, the gifter device 10 is unable to connect to a network to communicate a gift request 340 to the server 98 of the online digital media provider 92. As illustrated in the present figure, the steps of selecting one or more gift files and transmitting a gift offer (e.g., 284) to the giftee device 282, as well as the acceptance of the gift (e.g., 336) by the giftee device 282 may be generally identical to the techniques described above with reference to FIGS. 7 and 12. Specifically, these actions achieved by way of an NFC connection 286 established between the devices 10 and 282 which, as discussed above, may be established by one or more tap operations (e.g., 288 and 338).

Because the gifter device 10 is unable to connect to the server 98 to transmit the gift request 340 in the presently illustrated embodiment, the gifter device 10 may instead transferred a locked gift file, which may correspond to the selected media file 196, as well as a gift license. The locked gift file, once received on the giftee device 282, may not be played back on the giftee device 282 until the gift license is authenticated with the server 98 upon which the gifter's account may be charged for the gifting of the media 196. As illustrated here by the reference numeral 518, upon receiving acceptance 336 of the gift offer 284, the gifter device 10 may transfer a locked gift file and a corresponding gift license to the giftee device 282 by way of a peer-to-peer network 520 which may be an ad-hoc network, or a personal area network, such as via a Bluetooth connection. As will be appreciated, the gift license associated with the locked gift file may contain the gifter's account information in order to insure that the gifter's account is properly charged when the giftee authenticates the gift license to unlock the locked gift file 518. After receiving the locked gift file and gift license, the giftee device 282 may connect to a network, as indicated by the reference numeral 522. For example, referring back to FIG. 8, the giftee device 282 may connect to the wireless LAN network 318, as discussed above with reference to the communication profile 308 in FIG. 9. It should be appreciated however, that any type of suitable network capable of establishing a communication path between the giftee device 282 and the server 98 of the online digital media provider 92 may be utilized in accordance with the present technique.

Once the giftee device is connected with the server 98 by way of the network 318, the giftee device 282 may transmit a request to the server 98 to authenticate the gift license and to unlock the locked gift file 518 received from the gifter device 10, as indicated by the reference number 524. The server 98, upon receiving the unlock request may first charge the gifter's account for a payment amount corresponding to the gift file, illustrated here by the reference number 526. Once the gifter's account has been charged, the server 98 may authenticate the locked gift file 518, thus unlocking the gift file and permitting the playback of the gift file on the giftee device 282, as indicated by the reference number 528. As will be appreciated, the unlocking process may take place via the network connection 318. Accordingly, once the locked gift file 518 originally received from the gifter device 10 has been unlocked (e.g., creating the unlocked gift file 196), the giftee may play back the unlocked gift file 196 on the giftee device 282, as depicted by the reference number 530.

Figure 16A:
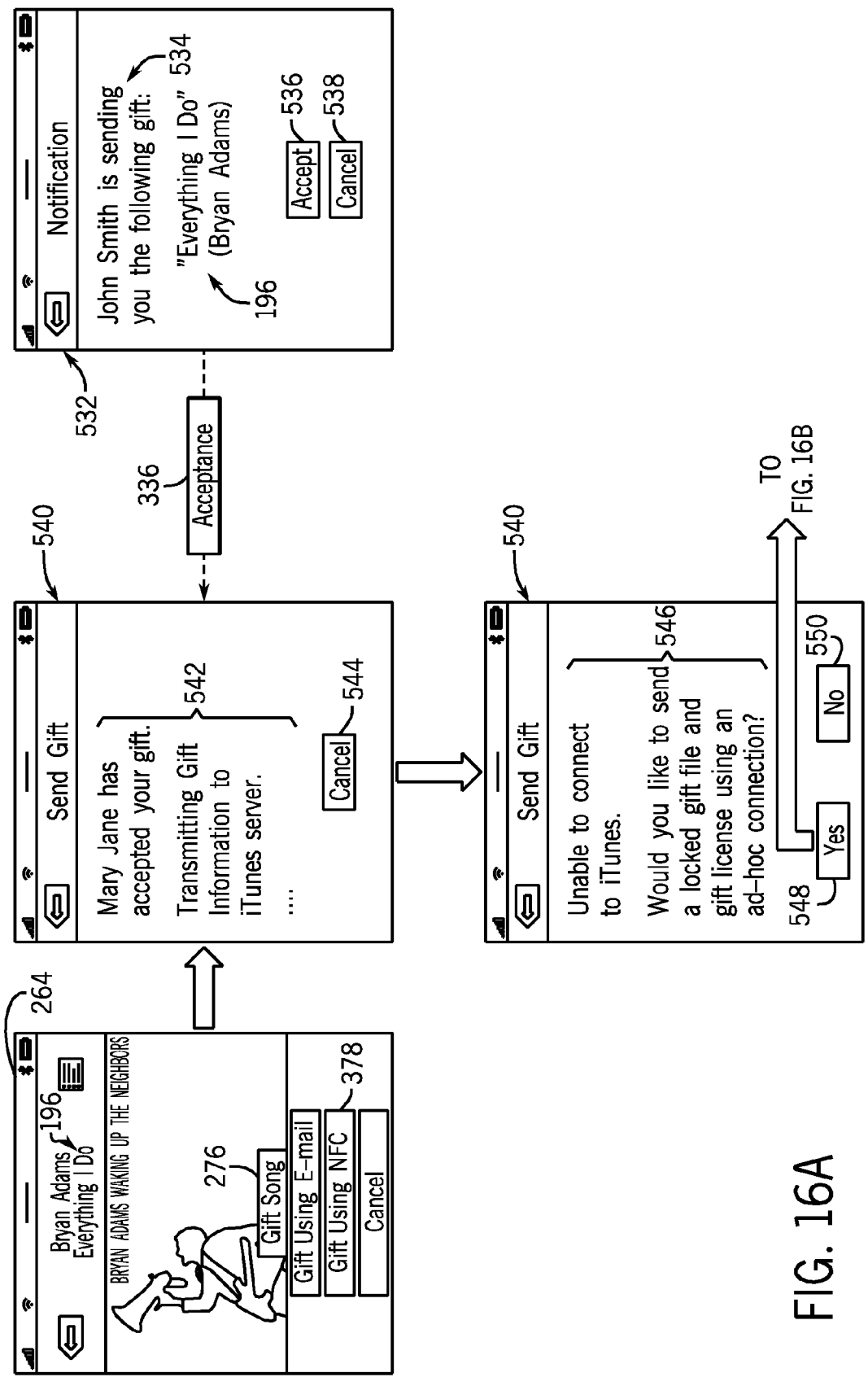
FIG. 16A shows a plurality of screen images depicting the acceptance of a gift offer by the giftee device in accordance with the gifting process depicted in FIG. 15, and further illustrates, with respect to the gifter device, the unavailability of a connection to the online service.
Figure 16B:
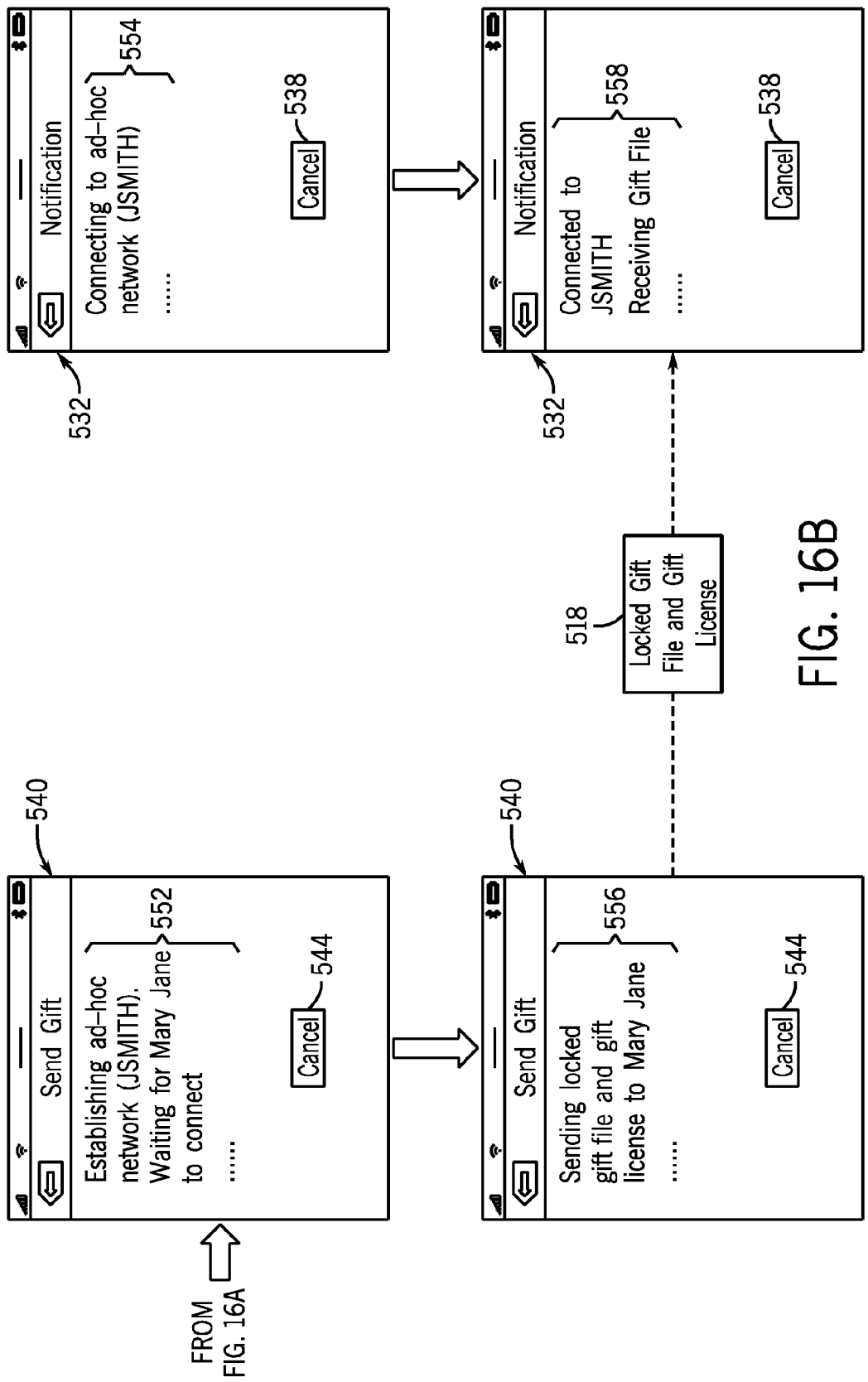
FIG. 16B shows a plurality of screen images depicting the transmission of a locked gift file and a gift license from the gifter device to the giftee device.

Referring now to FIGS. 16A and 16B, a plurality of screen images illustrating a technique for transmitting a locked gift file 518 from the gifter device 10 to the giftee device 282 is illustrated. For instance, as shown in FIG. 16A, the transfer of the gift offer (e.g., 284) from the gifter device 10 and the subsequent acceptance 336 of the gift offer by the giftee device 282 using the NFC interface 286 may be initiated by selecting the graphical button 378 from the screen 264, as discussed above. Upon receiving the notification of the gift offer has been accepted, the screen 532 may be displayed on the giftee device 282. As shown here, the screen 532 may display the notification message 534 which may identify the gifter, as well as provide the identity of the media file 196 being offered by the gifter as a gift file. The screen 532 may further include the graphical buttons 536 and 538. The graphical button 538 may be selected if the giftee wishes to accept the gift file 196 being offered by the gifter. If the giftee does not wish to accept the gift file 196, the giftee may select the graphical button 538 to cancel the gifting process. As discussed above, upon selection of the graphical button 536, an acceptance message 336 may be transmitted to the gifter device 10, such as by way of the NFC interface 286.

Upon receiving the acceptance message 336, the screen 540 may be displayed on the gifter device 10 and may include the notification message 542. The screen 540 may also include the graphical button 544 by which the gifter may select to cancel the gifting process if necessary. As shown here, the notification message 542 may indicate that the giftee has accepted the gift offer 284 and that the gifter device 10 is presently attempting to initiate the transmission of a gift request to the server 98 of the online digital media provider 92. As discussed above and shown in FIG. 16A, a network capable of providing the gifter device 10 a connection to the server 98 may not be presently available. Thus, upon detecting a failure to establish a connection to the online digital media provider 92, the screen 540 on the gifter device 10 may updated to display the notification message 546, which may offer the gifter the option of transferring a locked gift file (e.g., 518) to the giftee device 282 in accordance with the gifting process illustrated in FIG. 15. The screen 540 may also include the graphical buttons 548 and 550 which, respectively, may be selected by the gifter to either proceed or not proceed with the sending of the locked gift file 518.

If the graphical button 548 is selected, a locked gift file 518 may be created and temporarily stored on the gifter device 10. In one embodiment, the locked gift file may not have the appropriate DRM protection applied to enable playback on the giftee device 282. Accordingly, the giftee may be required to authenticate a gift license, which may be sent along with the locked gift file 518, in order to unlock the locked gift file 518 to enable playback on the giftee device 282. The gift license may include the gifter's account information as well as an indication of an approval of applicable gift charges. Thus, the process of unlocking a locked gift file, as will be explained in further detail below, may entail applying DRM protection to the gift file only after the gift license is authenticated and the gifter's account is successfully charged for the gift file.

If the gifter selects the graphical button 548 to send the locked gift file 518 to the giftee device 282, an ad-hoc network, such as the network 520 depicted in FIG. 15, may be established to facilitate the transfer of the locked gift file 518. For instance, referring now to FIG. 16B, upon selection of the graphical button 548, the gifter device 10 may initiate the ad-hoc network 520 and wait for a connection to be established between the gifter device 10 and the giftee device 282. This may be reflected in the notification message 552 displayed on the updated screen 540 of FIG. 16B. Accordingly, the giftee may be presented on the giftee device 282 the option of joining the ad-hoc network 520 established by the gifter device 10. For instance, the screen 532 on the giftee device 282 may be updated to display the notification message 554 indicating to the giftee that the giftee device 282 is establishing a connection to the ad-hoc network 520. Thereafter, once the giftee device 282 is connected to the ad-hoc network 520, the screens 540 and 532 may be updated to display the notification messages 556 and 558, respectively. As shown here, the notification message 556 may indicate to the gifter that a locked gift file and a gift license, represented here by the reference number 518, is being transferred to the giftee device 282. The notification message 558 may indicate to the giftee that the giftee device 282 is connected to the ad-hoc network 520 and that the locked gift file 518 is being received on the giftee device 282.

Continuing now to FIG. 17A, a series of screen images is provided in order to demonstrate how the locked gift file 518 must be first authenticated with the online digital media provider 92 prior to being unlocked for playback on the giftee device 282. As shown in FIG. 17A, once the transfer of the gift file 518 has been completed, the screen 532 displayed on the giftee device 282 may display the notification message 560. The notification message 560 may inform the giftee that the gifted file 518 has been received, but may indicate that the gifted file must first be authenticated with the online digital media provider 92 prior before playback on the giftee device 282 is permitted. Accordingly, the graphical button 562 is provided by which the giftee may select to connect to the online digital media provider 92 for authentication of the gift license and unlocking of the locked gift file 518. The graphical button 564 is also provided and, if selected, may allow the giftee to return to the home screen 29 as illustrated in the present figure. The remaining screens in FIG. 17A are meant to illustrate how the gift file 518 is not permitted to be played or accessed by the giftee device 282 until being authenticated and unlocked by the online digital media provider 92. For example, upon returning to the home screen 29, the giftee may select the graphical icon 36 to execute the media player application discussed above and to display the screen 230

From the screen 230, the giftee may select the graphical icon 240 in order to access the screen 258, which may display the listing 454 of music files presently stored on the giftee device 282. As shown here, the locked gift file 518 received from the gifter device 10 may be included in the listing 454 in FIG. 17A. If the locked gift file 518 is selected for playback, as indicated in the present figure, the giftee may be navigated to the screen 264 which, as discussed above, may be utilized for the playback of selected media files. However, as shown in the present figure, because the selected media file is locked, the pop-up window 568 may be displayed when the giftee device 282 attempts to play the locked gift file 518. The pop-up window 568 may inform the giftee that the selected file 518 is locked and must be first authenticated with the online digital media provider 92 and unlocked before playback may be permitted. The pop-up window 568 may further provide the graphical button 570 and 572. Accordingly, the giftee may select the graphical button 572 to return to the screen 258 to access the listing 454, such as to select another media file that is not currently locked, or the giftee may select the graphical button 570 to connect to the online digital media provider to perform the authentication process and unlock the gift file 518.

Figure 17B:
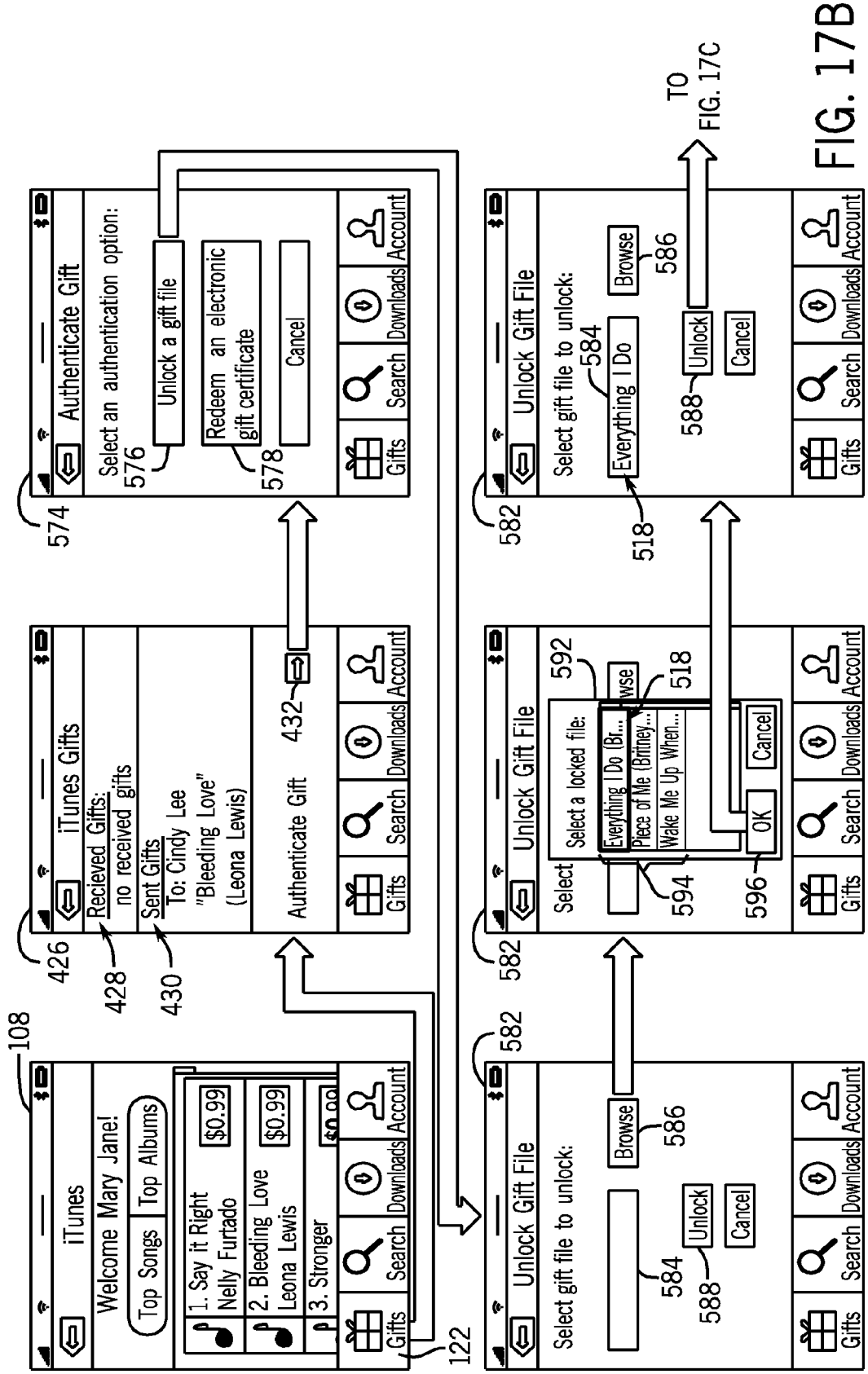
FIGS. 17B and 17C show a plurality of screen images illustrating the authentication and unlocking of the locked gift file of FIG. 16B and the subsequent playback of the unlocked gift file on the giftee device.

If the graphical button 570 is selected, the giftee device 282 may establish a connection to the online digital media provider 92 and initiate the virtual store interface application 34, thus displaying the screen 108 as shown in FIG. 17B. From the screen 108, the giftee may select the graphical icon 122 to navigate to the screen 426 which, as discussed above, may include a listing 428 of gifted media files received, as well as a listing 430 of media files recently sent by the giftee to other users of the online digital media provider 92 as gift files. As discussed above, the graphical button 432 may also be provided in order to perform one or more authentication functions applicable to the embodiment illustrated in FIG. 15. As shown here, upon selection of the graphical button 432, the giftee may be presented with the screen 574. The screen 574 may include the graphical buttons 476 and 478. The graphical button 476 may represent a function by which a giftee may unlock a locked gift file, such as the locked gift file 518. Additionally, the graphical button 578 may represent a further function by which the giftee may not presently have a gift file, either locked or unlocked, but may redeem an electronic gift certificate received from a gifter with the online digital media provider 92 to receive a gift file. The latter function will be described in further detail below.

As shown in the present figure, the giftee may select the graphical button 576 to further navigate to the screen 582. The screen 582 may include a field 584 in which the giftee may specify the identification of a locked gift file 518 that the giftee wishes to unlock. As discussed above, the locked gift file 518 may include a gift license which may include the identity of the gifter, as well as the gifter's account information. The screen 582 may also include the graphical button 586 by which the giftee may select in order to display a listing of locked gift files present on the giftee device 282 that may be selected for authentication and unlocking by the online digital media provider 92. For example, as illustrated in the present figure, the selection of the graphical button 586 may cause the pop-up window 592 to be displayed on the screen 582. As shown here, the pop-up window 592 may include a selectable listing 594 of locked gift files presently stored on the giftee device 282. Thus, the giftee may select the locked gift file 518 received from the gifter device 10 in FIG. 15, and then select the graphical button 596 in order to return tot the screen 582 to complete the process of selecting a locked gift file 518 to unlock. As shown in the updated screen 582, based on the giftee's selection in the pop-up window 592, the field 584 may be populated to display the name of the locked gift file 518. The giftee may then select the graphical button 588 to initiate the process of authenticating the gift license and unlocking the locked gift file 518.

As will be appreciated, upon selection of the graphical button 588, the online digital media provider 92 may determine the identity of the gifter and the gifter's account based on, for example, the information contained in the gift license associated with the locked gift file 518. If the online digital media provider 92 (e.g., by way of the server 98), determines that the gifter's account may be charged for the gifting of the gift file 518, then the server 98 may authorize the unlocking of the locked gift file 518. For example, referring now to FIG. 17C, once the locked gift file 518 and its associated gift license has been authenticated by the server 98, the screen 600 may be displayed on the giftee device 282. The screen 600 may include the notification message 602 indicating to the giftee that the locked gift file 518 is presently being unlocked. For example, in the presently illustrated embodiment, the unlocking of the gift file 518 may include applying DRM protection to the gift file 518 using one or more DRM keys associated with the giftee's account, such that the gift file 518 may be authorized for playback on the giftee device 282. The screen 600 may also include the graphical button 604 by which the giftee may select in order to cancel the unlocking process if necessary.

As will be appreciated, the unlocking of the gift file 518 may be performed locally on the giftee device 282. For example, the unlocking process may allow the giftee device 282 to process the locked gift file 518 using the giftee's DRM keys in order to generate a media file that is specific for playback on authorized devices belonging to the giftee, which may include the giftee device 282. Further, as discussed above, in a situation in which the gifter's account specified in the gift license associated with the locked gift file 518 cannot be charged, the giftee may be presented with the option of charging the gifting of the file 518 to the giftee's own account, or else declining the gift file 518.

Once the gift file 518 has been unlocked, the screen 608 may be displayed on the giftee device 282 and indicate to the giftee, by way of notification message 610, that the gift file 518 has been authenticated and is now enabled for playback on the gift device 282. Accordingly, the screen 608 may provide the giftee with several options, by way of graphical buttons 612, 614, and 616. As illustrated here, the graphical button 612 may represent a function by which a giftee may return to the previous screen 582 to unlock additional locked gift files, such as those provided in the listing 594 in FIG. 17B. The graphical button 614 may represent a function by which a giftee may initiate the media player application 36, as discussed above, in order to select the now unlocked gift file 518 for playback on the giftee device 282. Additionally, the giftee may select the graphical button 616 to disconnect from the online digital media provider 92 and exit the associated virtual store interface application 34 to return to the home screen 29 of the GUI 28 on the giftee device 282.

Figure 17C:
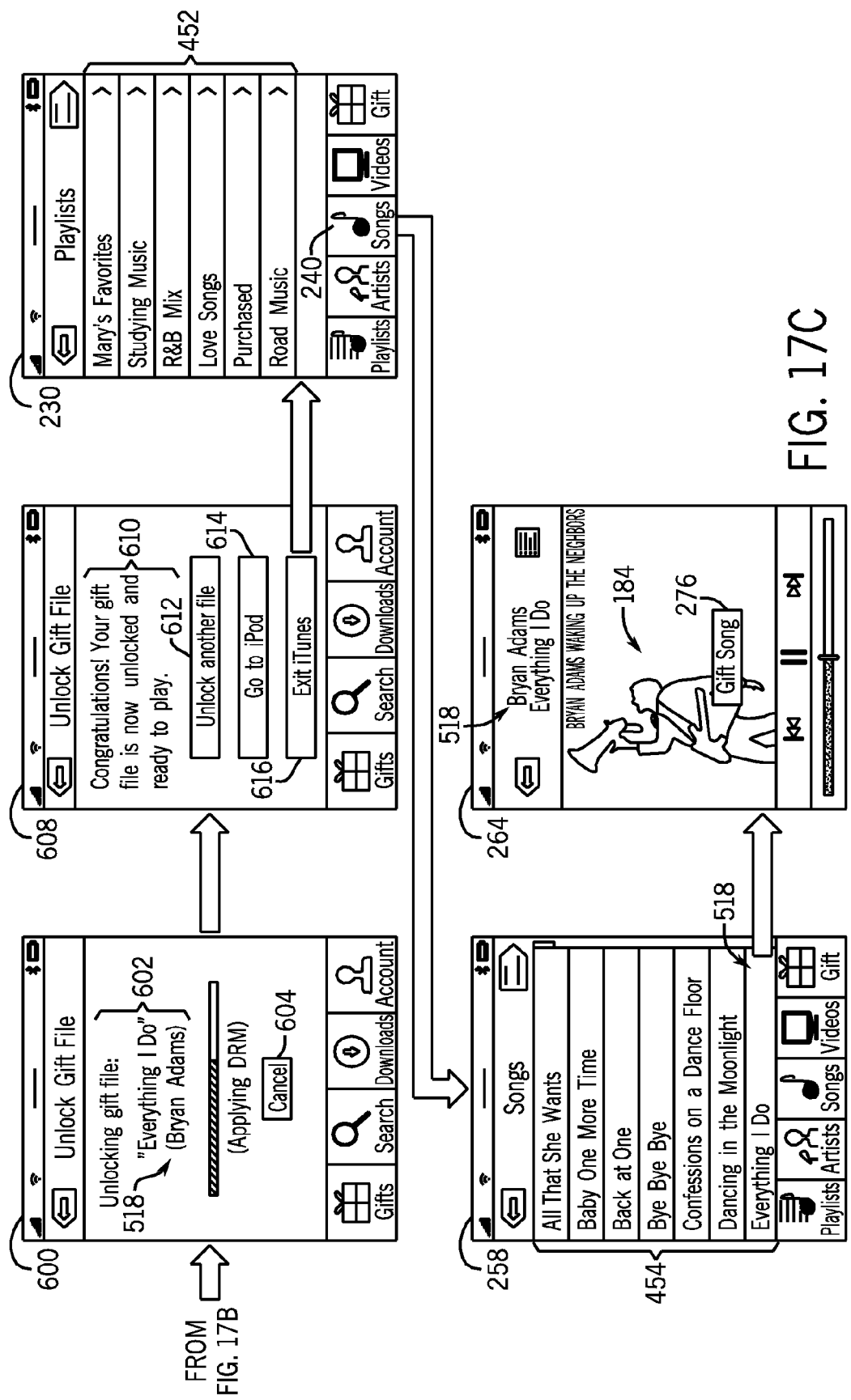

As shown in FIG. 17C, the selection of the graphical button 614 may initiate the media player application 36 and cause the screen 230 to be displayed on the giftee device 282, as discussed above. Here, the giftee may select the graphical icon 240 to access the listing of music files 454 presently stored on the giftee device 282 on the screen 258. As shown here, the listing 454 has been updated to indicate that the gift file 518 is no longer locked and may now be selected for playback using the media player application 36. Thus, by selecting the now unlocked gift file 518, the giftee may advance to the screen 264, whereby the gift file 518 may be played back on the device 282. Additionally, as discussed above, the giftee may further select the graphical button 276 displayed on the screen 264 in order to initiate a process of gifting the received gift file 518 to additional users of the online digital media provider 92 using any of the gifting techniques set forth in the present disclosure.

Figure 18:
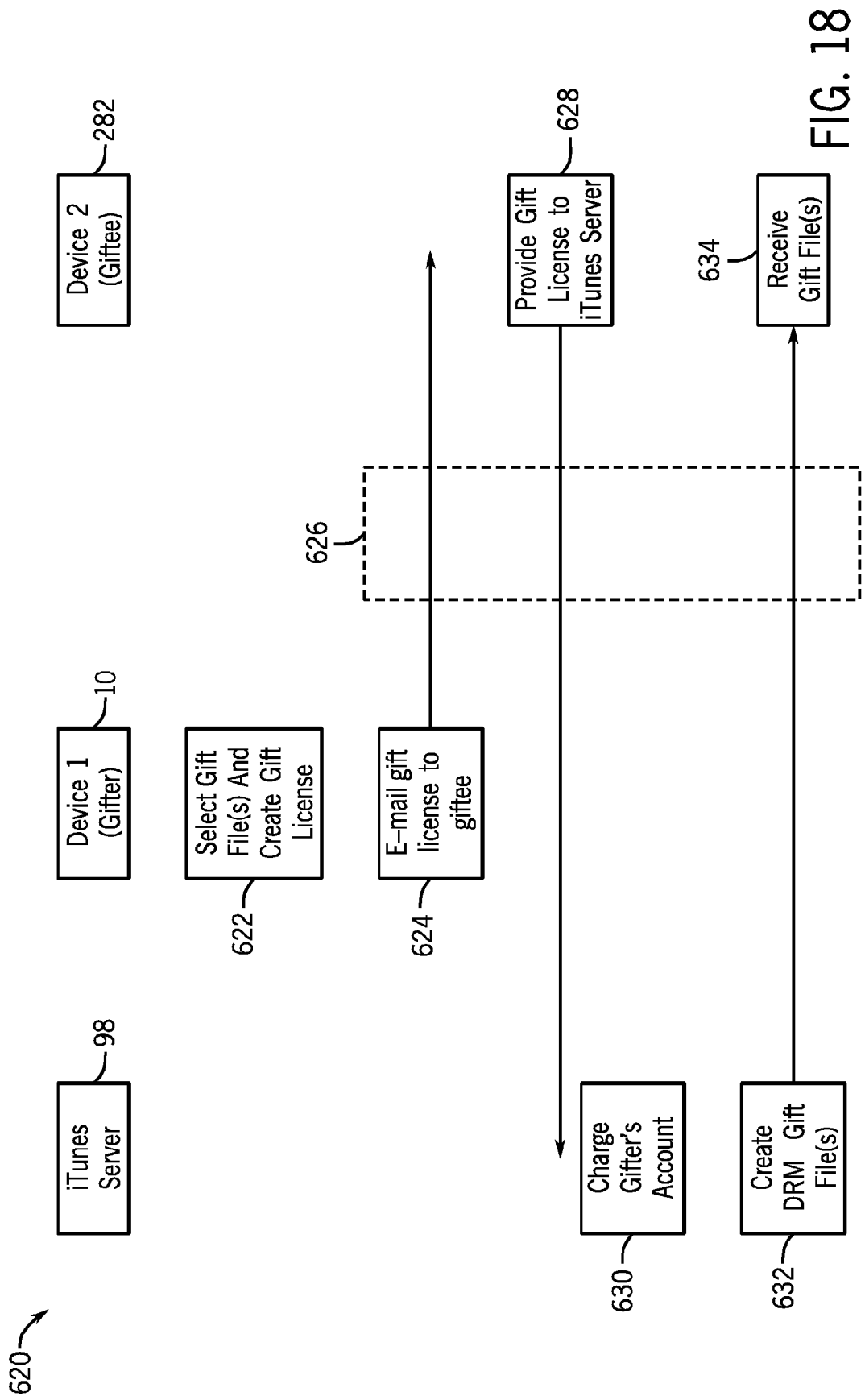
FIG. 18 is a schematic representation illustrating a technique for gifting the purchased media file of FIG. 5B from a giftee device to a giftee device without the use of the communication path depicted in FIGS. 10B and 10C in accordance with a further implementation of the present technique.

While the above described techniques for gifting a media file have been initiated using a close range communication process, such as the NFC connection 286, additional aspects of the present technique may further provide for the gifting of media files without the use of close range communications. For instance, continuing now to FIG. 18, the present technique also provides an implementation in which the offer and acceptance of a gift file, or multiple gift files, need not require that the giftee device 282 and the gifter device 10 are within the proximity required for an NFC connection to occur. For example, the system depicted by the reference number 620 in FIG. 18 illustrates an embodiment in which the gifting of a media file may be initiated using an e-mail communication. For example, as indicated by reference numeral 622, the gifting process may begin with the selection of one or more gift files on the gifter device 10, as well as the creation of a gift license. In accordance with the present embodiment, a gift license may essentially function as an electronic gift certificate that may be redeemed with the online digital media provider 92 by the giftee in order to acquire the gifted files selected by the gifter. For instance, as mentioned above, the gift license may include the gifter's account information, such that upon redemption by the giftee, the gifter's account may be charged for the gifted file or files. If multiple gift files are selected for gifting, a separate respective gift license may be generated for each gift file, or, in some embodiments, a single license including all the selected gift files at step 622, may be created. Once the gift license or licenses are created, the licenses may be transmitted to the giftee device 282 by using an e-mail message, as illustrated by the reference number 624.

As shown in FIG. 18, the e-mail communication may occur by way of a network 626. The network 626 may be provided by any suitable type of network interface available on the gifter device 10 and the giftee device 282, such as those provided in the communication interface circuitry 60 discussed above with reference to FIG. 3 and may not require a direct connection between the two devices. For example, the e-mail communication may be transmitted from the gifter device 10 to the giftee device 282 using the Internet. Upon receiving the e-mail message containing the gift license or licenses transmitted by the gifter, the giftee device 282 may initiate a connection to the online digital media provider 92. Once a connection is established, such as by using the network 626, the giftee device 282 may provide the gift license to the server 98 of the online digital media provider 92, as shown by reference number 628, in order to redeem the electronic gift certificate and retrieve the gift file selected by the gifter at step 622. As will be appreciated by those skilled in the art, security measures may be implemented such that the electronic gift certificate 664 may only be used one time and only by the giftee to acquire the gifted media files. This ensures that the electronic gift certificate may not be used by unauthorized persons and may not be used to retrieve the same gift file(s) multiple times.

Upon receiving the gift license, the server 98 may first process the license information in order to charge the gifter's account for the gifted file (or files), as indicated by the reference number 630. Thereafter, once the gifter's account is successfully charged, a corresponding gift file may be created using the giftee's DRM keys. The creation of the DRM protected gift file is illustrated here by the reference numeral 632. Accordingly, once the DRM protected gift file has been created, the gift file may be transmitted to the giftee device 282 by way of the network 626. Upon receiving the DRM protected gift file, as indicated by the reference number 634, the giftee may select these files for playback on the giftee device 282, such as by using the media player application 36. Here again, it should be kept in mind that if the gifter's account specified in the provided gift certificate (e.g., step 628) cannot be charged, the giftee may be presented with the option of charging the gifting of the file to the giftee's own account, or else declining the gift file altogether.

Figure 19:
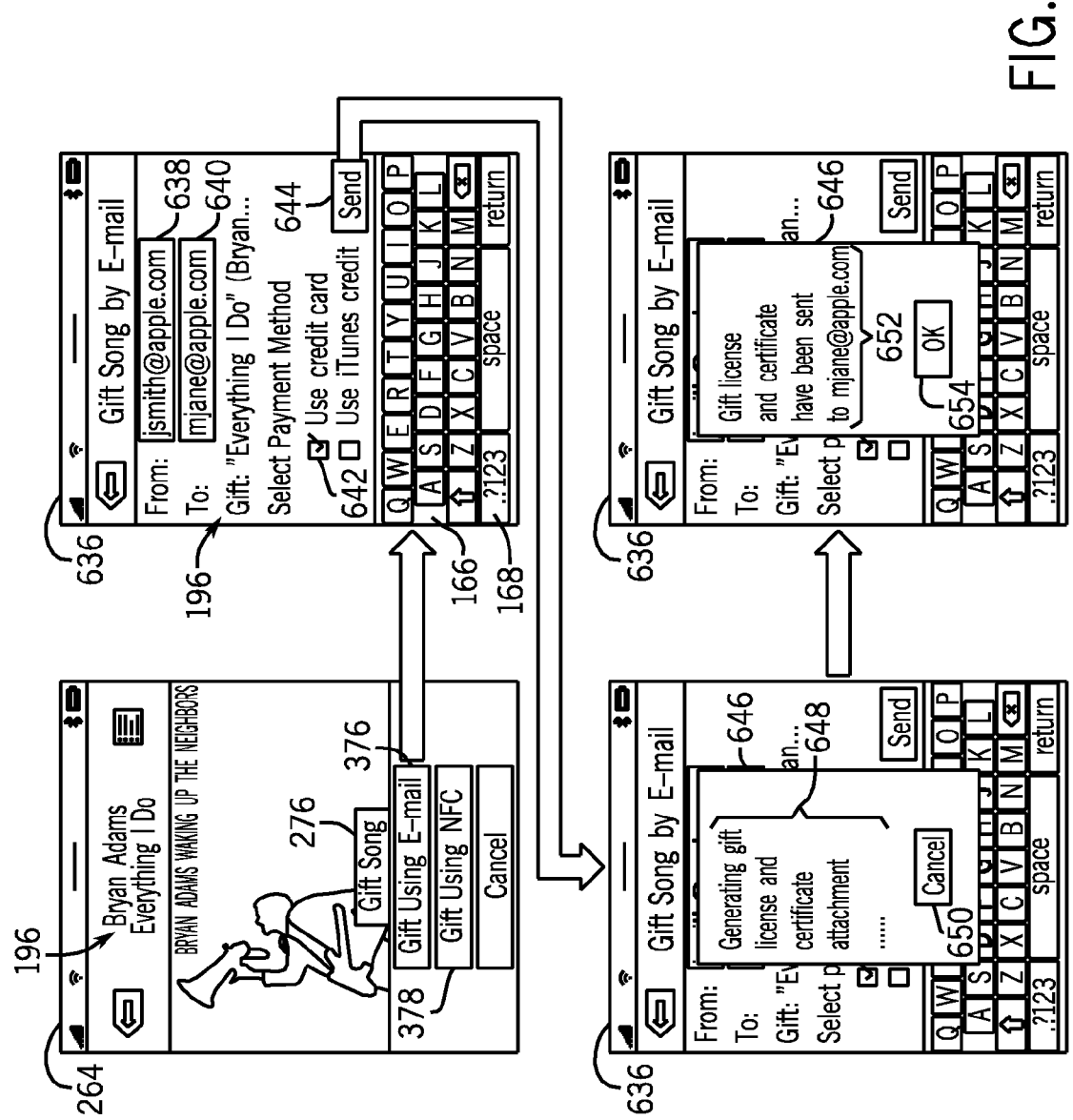
FIG. 19 shows a plurality of screen images depicting the creation of an electronic gift certificate on the gifter device in accordance with the gifting process depicted in FIG. 18.

The technique described in FIG. 18 may be better understood with reference to FIG. 19, in which a series of screen images depicting the gifting process illustrated in FIG. 18 is provided. For example, the gifting process may begin with the selection of the music file 196, which may be in the process of being played back on the screen 264 on the gifter device 10. As discussed above, the selection of the graphical button 276 may cause the graphical buttons 376 and 378 to be displayed thus providing the gifter with various gifting options. Here, instead of initiating the gifting process using an NFC connection, as provided by the graphical button 378 (e.g., in accordance with techniques of FIGS. 7, 12, and 15), the gifter may instead select the graphical button 376 to initiate the gifting processing using an e-mail communication. For example, the selection of the graphical button 376 may cause the screen 636 to be displayed on the gifter device 10. The screen 636 may include the text fields 638 and 640. As shown here, the text field 638 may request that the gifter provide the gifter's e-mail address, and the text field 640 may request that the gifter provide an e-mail address associated with the giftee receiving the gift file 196. The information required by the text fields 638 and 640 may be entered by the gifter using the provided text keyboard interface 166, as discussed above. Additionally, the gifter may also be prompted to select a payment method which, as discussed above, may be a credit card account associated with the gifter's online digital media provider account. Additionally, the gifter may also elect to pay for the gifting of the file 196 by the use of credits associated with the gifter's account. As shown in the present figure, the gifter may select a credit card account as the payment method by selecting the check box graphic 642.

Once the required information has been provided on the screen 636 by the gifter, the gifter may select the graphical button 644 to generate the gift license which is then e-mailed to the giftee. For example, upon selection of the graphical button 644, the pop-up window 646 may be displayed on the screen 636. The pop-up window 646 may include the notification message 648 indicating to the gifter that a gift license is presently being generated in the form of the electronic gift certificate file. As shown here, the pop-up window 646 may also include the graphical button 650 allowing the gifter to cancel the generation of the electronic gift certificate if selected. In the present embodiment, once the gift license and electronic gift certificate have been generated, the certificate and license may be sent to the giftee's e-mail address provided in the text field 640, as indicated by the notification message 652 in the updated pop-up window 646. The updated popup window 646 may also include the graphical button 654, which may allow the gifter to return to the screen 264 to resume playback of the music file 196, for instance.

Next, the redemption of the electronic gift certificate described in FIG. 19 by the giftee device 282 may be explained with reference to FIGS. 20A-20C, which depict by way of screen images a technique for receiving electronic gift certificate and redeeming the received gift certificate with the online digital media provider 92 in order to acquire a gifted media file. For example, referring first to FIG. 20A, from the home screen 29 on the giftee device 282, the giftee may select the graphical icon 38 in order to initiate an e-mail application. Upon the initiation of the e-mail application 38, the screen 656 may be displayed on the giftee device 282. The screen 656 may display a listing of recent e-mail messages received on the giftee device 282 and may include the e-mail message referred to by the reference number 658, which may correspond to the e-mail sent by the gifter device 10 in FIG. 19. The screen 656 may also include a variety of graphical icons 660, each of which may represent various functions associated with the e-mail application 38. Upon selecting the e-mail message 658, the giftee may view the text associated with the e-mail message 658 on the screen 662. As shown here, the screen 662 may further indicate that the e-mail message 658 has been sent with an included file attachment, referred to here by the reference number 664. In the present illustration, the attached file may represent the electronic gift certificate generated and sent by the gifter device 10, as described above with reference to FIG. 19. Thus, as will be understood, the giftee may save the electronic gift certificate locally on the giftee device 282, wherein the saved gift certificate may be used later to acquire a corresponding gift file from the online digital media provider 92. Further, as shown in the present figure, by using the scroll bar element 120, the giftee may view the remainder of the e-mail message 658, which may include a hyperlink 668 allowing the user to directly connect to the online digital media service 92 for redemption of the electronic gift certificate 664.

Figure 20B:
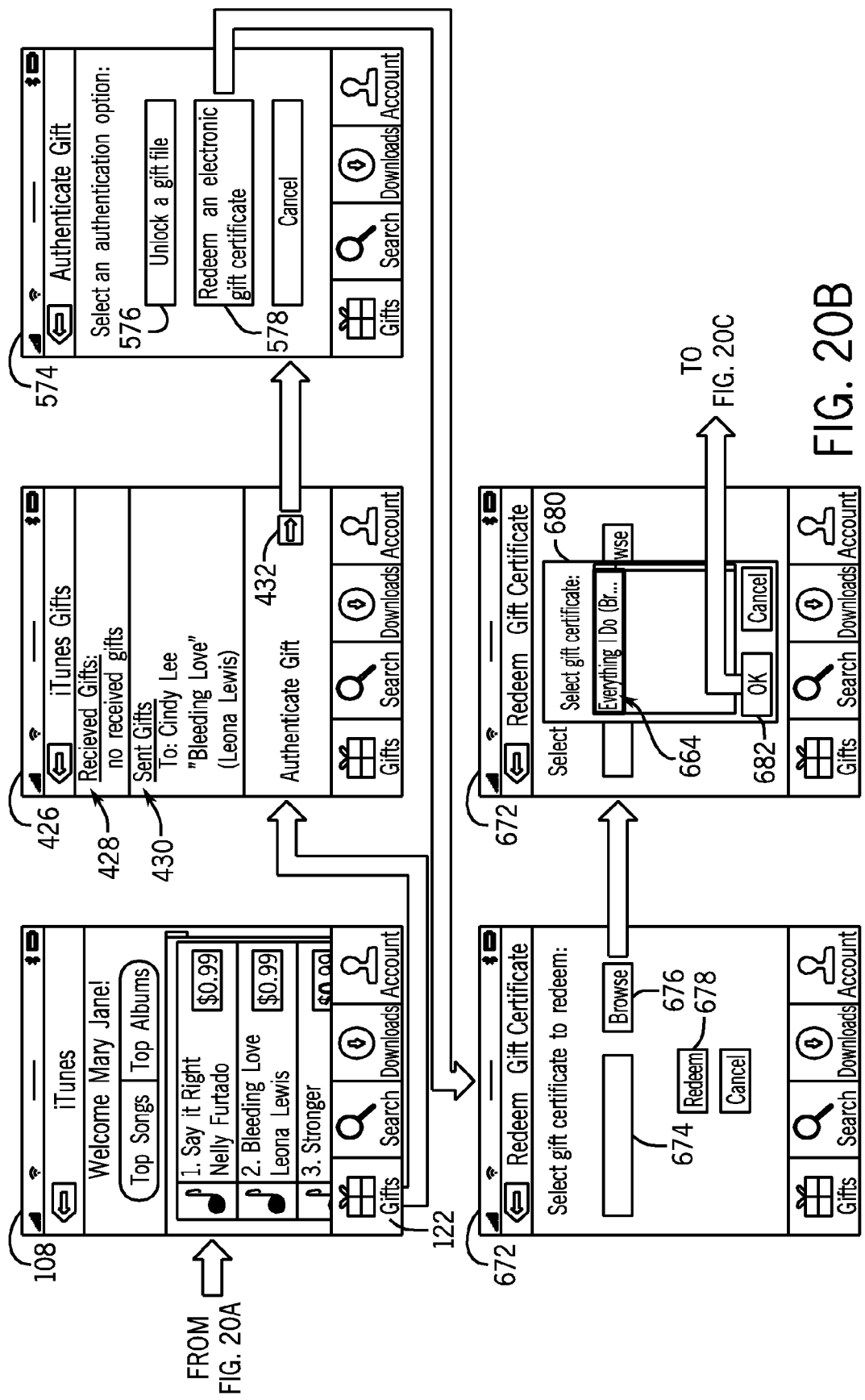

Referring now to FIG. 20B, upon selecting the hyperlink 668, a connection may be established with the online digital media provider 92 and the virtual store application 34 may be initiated, thus displaying the home screen 108 of the online store interface on the giftee device 282. As discussed above, the giftee may then access the screen 426 by selecting the graphical icon 122. In order to authenticate the electronic gift certificate 664, the giftee may further select the graphical button 432, thus advancing to the screen 574. Here, rather than select the graphical button 576, as discussed above in FIG. 17B, the giftee may instead select the graphical button 578, which represents a function by which the giftee may redeem an electronic gift certificate (e.g., 664) to download corresponding gifted media file. As shown here, the selection of the graphical button 578 may further advance the giftee to the screen 672. The screen 672 may include the field 674 in which the giftee may specify a particular electronic gift certificate file to be redeemed. For example, by selecting the graphical button 676, the pop-up window 680 may be displayed on the screen 672. As shown in the present figure, the pop-up window 680 may display a listing of available redeemable electronic gift certificates stored on the giftee device 282, and may include the electronic gift certificate 664 received in the e-mail message 658 discussed in FIG. 20A.

Figure 20C:
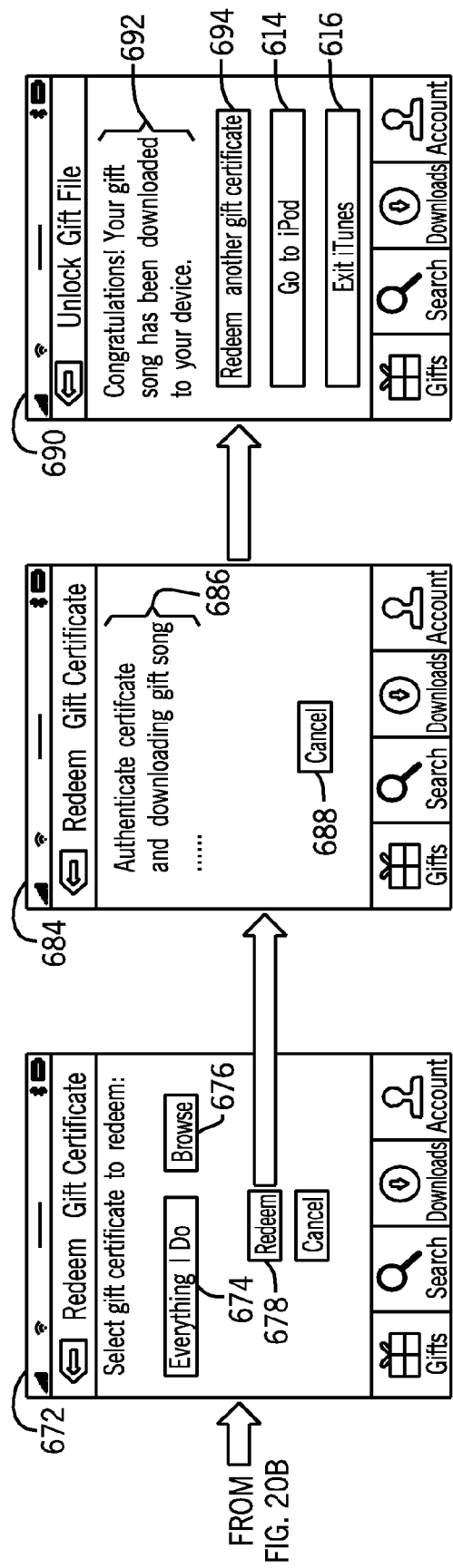

Continuing now to FIG. 20C, once the electronic gift certificate 664 is selected, the giftee may select the graphical button 682 to return to the screen 672, in which the field 674 may be updated to reflect the selection of the electronic gift certificate 664 for redemption. Thereafter, the giftee may select the graphical button 678 in order to initiate the process of redeeming the provided electronic gift certificate 664 and acquiring a corresponding gifted media file. For instance, upon selecting the graphical button 678, the screen 684 may be displayed on the giftee device 282. The screen 684 may include the notification message 686 indicating that the provided gift certificate 664 is being authenticated and that the gift file specified in the certificate 664 is being downloaded to the giftee device 282. As will be appreciated, the authentication of the gift certificate 664 may include determining, based on information contained in the gift certificate, the account corresponding to the gifter. Accordingly, once the gifter's account is properly charged for the gifting of the selected file, a gift file may be generated on the server 98 using the giftee's DRM keys, as discussed above, and subsequently transferred to the giftee device 282 from the server 98. As shown here, the screen 684 may also include the graphical button 688 by which the giftee may select to cancel the process of redeeming the certificate 664 if needed.

Once the gift file has been successfully downloaded to the giftee device 282, the screen 690 may be displayed on the giftee device 282. The screen 690 may include the notification message 692 informing the giftee that the gift file has been received on the device 282 and is now available for playback. Here, the screen 690 may further provide the giftee with various options by way of the graphical button 694, as well as the graphical buttons 614 and 616 discussed above with reference to FIG. 17C. As shown here, the graphical button 694 may represent a function by which the giftee may return to the screen 672 in order to redeem additional gift certificates. The giftee may also exit the interface application 34 with the online digital media provider 92 by selecting the graphical button 616, thus returning to the home screen 29 of the device 282, or the giftee may select the graphical button 614 to execute the media player application 36 discussed above in order to select the downloaded gift file for playback, such as illustrated by the screens 230, 258, and 264 in FIG. 17C.

Figure 21A:
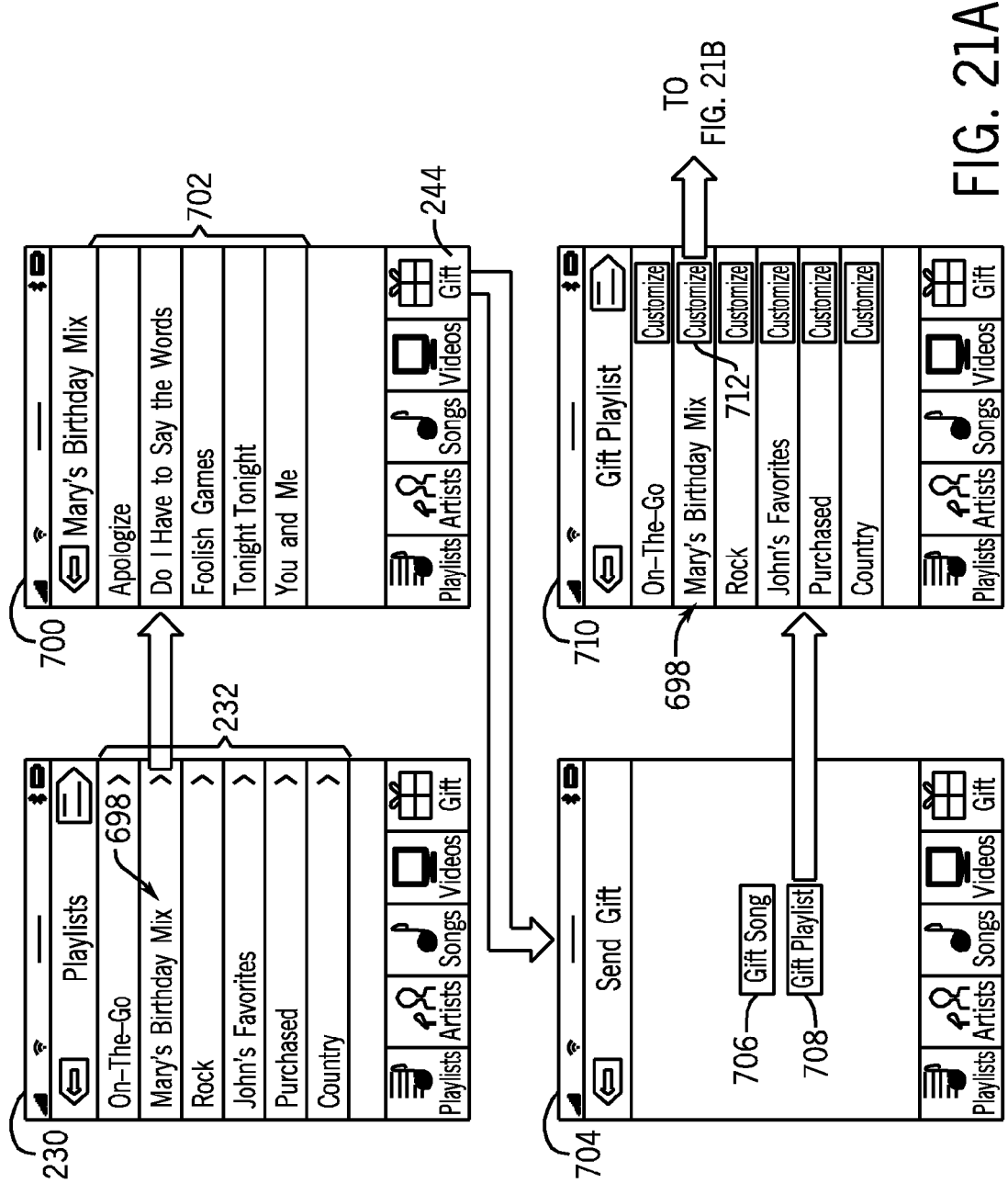

While the above-described embodiments have depicted the gifting of a single media file, namely the media file 196, it should be appreciated that the present technique also provides for the gifting of multiple media files in a single gifting session. For example, referring to FIG. 21A, in accordance with one implementation of the present technique, the gifter may select a playlist, which as discussed above, may include a plurality of music files, to be gifted to a giftee device 282. Referring now to the screen 230 in FIG. 21A, a listing 232 of playlists presently stored on the gifter device 10 may be displayed upon initiation of the media player application 36 on the gifter device 10. The presently illustrated figures may depict a technique by which the gifter may choose to gift the playlist referred to by the reference numeral 698 to the giftee device 282 using one or more of the gifting techniques set forth in the present disclosure. As shown here, the gifter may select the playlist 698 in order to view each of the media files defined in the playlist 698, as shown by the screen 700. Thus, by gifting the playlist 698 to the giftee device 282, each of the music files in the listing referred to by the reference number 702 may be gifted in one transaction in which the gifter's account is charged for each of the media files in the playlist.

In order to begin the process of gifting the playlist 698, the gifter may first select the graphical icon 244, which may advance the gifter to the screen 704. As shown on the screen 704, the graphical buttons 706 and 708 may be provided. The graphical button 706 may represent a function by which the gifter may select an individual media file for gifting, as discussed in the above embodiments. The graphical button 708 may represent the function of gifting a playlist having multiple media files in accordance with the present embodiment. By selecting the graphical button 708, the gifter may be presented with the screen 710 by which the gifter may select the playlist to be gifted (e.g., the playlist 698), as well as add additional customized or personal components to the gifted playlist 698. For instance, additional personal components that may be included with the gifted playlist may include a personalized voice greeting and/or a custom or personalized image that may be displayed as an album image on the screen 264 of the giftee device during the playback of the gifted playlist 282.

In order to customize the playlist 698 prior to gifting, the gifter may select the graphical button 712 to access the screen 714, as depicted in FIG. 21B. The screen 714 may include the graphical buttons 716 and 718. For example, as illustrated in the present figure, the graphical button 716 may allow the gifter to record a voice greeting that may be included with the gifted playlist 698. For example, upon selecting the graphical button 716, the gifter may be able to record a voice greeting, depicted here by the reference numeral 720, which may be and recorded and stored by the gifter device 10, such as in the storage device 58, discussed above. As shown in the present figure, the selection of the graphical button 716 may cause a pop-up window 722 to be displayed on the screen 714. The pop-up window 722 may represent a recording application configured to receive sound inputs, such as through the audio input/output elements 46, as depicted in FIG. 1. For example, the pop-up window 722 may include the notification message 724 indicating to the gifter that a microphone, which may be one or more of the components included with the audio input/output elements 46, is active. The pop-up window 722 may also display a timer 726 which may indicate to the gifter as to the length of the voice greeting being recorded. Thus, once the desired voice greeting 720 has been recorded by the device 10, the gifter may select the graphical button 728 to exit recording application 722 and return to the screen 714. As shown in the updated screen 714, the graphical button 730 may be displayed, and may provide the gifter with the function of playing back the recorded voice greeting 720 prior to gifting the playlist 698.

Next, the gifter may proceed to add a personalized image to the gifted playlist 698 by selecting the graphical button 718. By selecting the graphical button 718, an imaging application may be initiated on the gifter device 10. For example, as illustrated in FIG. 21C, the selection of the graphical button 718 may cause the screen 732 to be displayed on the gifter device 10. The screen 732 may display a viewfinder 734 that may be configured to display in real time the images being acquired by the camera device 52. The viewfinder may include an image frame 736 which may assist the gifter in aligning or centering a desired image. As shown in the present figure, the gifter may then position the device 10 to acquire an image of the object 738. Once the object 738 is aligned or centered within the imaging frame 736 of the viewfinder 734, the gifter may select the graphical button 740 to acquire an image 744 of the object 738. If the acquired image 744 is satisfactory, the gifter may select the graphical button 742 to return to the screen 714. Additionally, if the gifter wishes to acquire another image, the gifter may return to the viewfinder 734 by selecting the graphical button 746. Further, in some implementations, the technique may provide for the acquisition of multiple images which may be gifted with the selected playlist 698 as a slideshow, for instance. These images may be acquired using either the camera 52 or from images previously stored on the device or downloaded from another source (e.g., Internet). As will be understood, a slideshow need not necessary be limited to the gifting of a playlist (e.g., multiple files) and, in some implementations, may be gifted with an individual file as well.

Figure 21D:
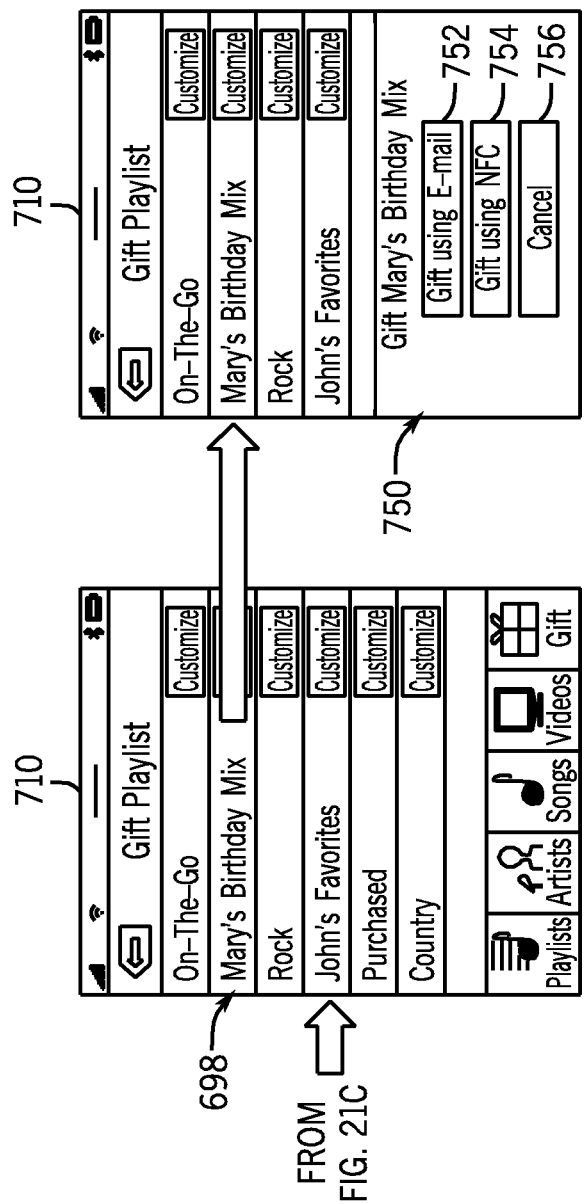

As shown in the updated screen 714 of FIG. 21C, once the acquired image 744 has been accepted, the screen 714 may further display the graphical button 748. The graphical button 748 may allow the gifter to view the image 744 prior to initiating the gifting of the playlist 698. At this point, if the voice greeting 720 and the personalized image 744 are satisfactory, the gifter may select the graphical button 130 to return to the screen 710 as illustrated in FIG. 21D to begin the process of gifting the playlist 698. For instance, by selecting the playlist 698 on the screen 710, the pop-up window 750 may be displayed on the screen 710, and provide the gifter with a variety of options, as indicated by the graphical buttons 752, 754, and 756. As can be appreciated, the graphical button 752 may provide a function by which the gifter may gift the playlist 698 using an e-mail communication, such as in accordance with the technique illustrated in FIG. 18. Additionally, the gifter may select the graphical button 758 to initiate the gifting of the playlist 698 using an NFC connection to the giftee device 282 in accordance with one or more of the techniques illustrated in FIGS. 7, 12, and 15. The gifter may also cancel the gifting process of the playlist 698 by selecting the graphical button 756. Thus, it should be understood that the gifting of the playlist 698 may be performed in accordance with any of the gifting techniques provided in the present disclosure.

Figure 22:
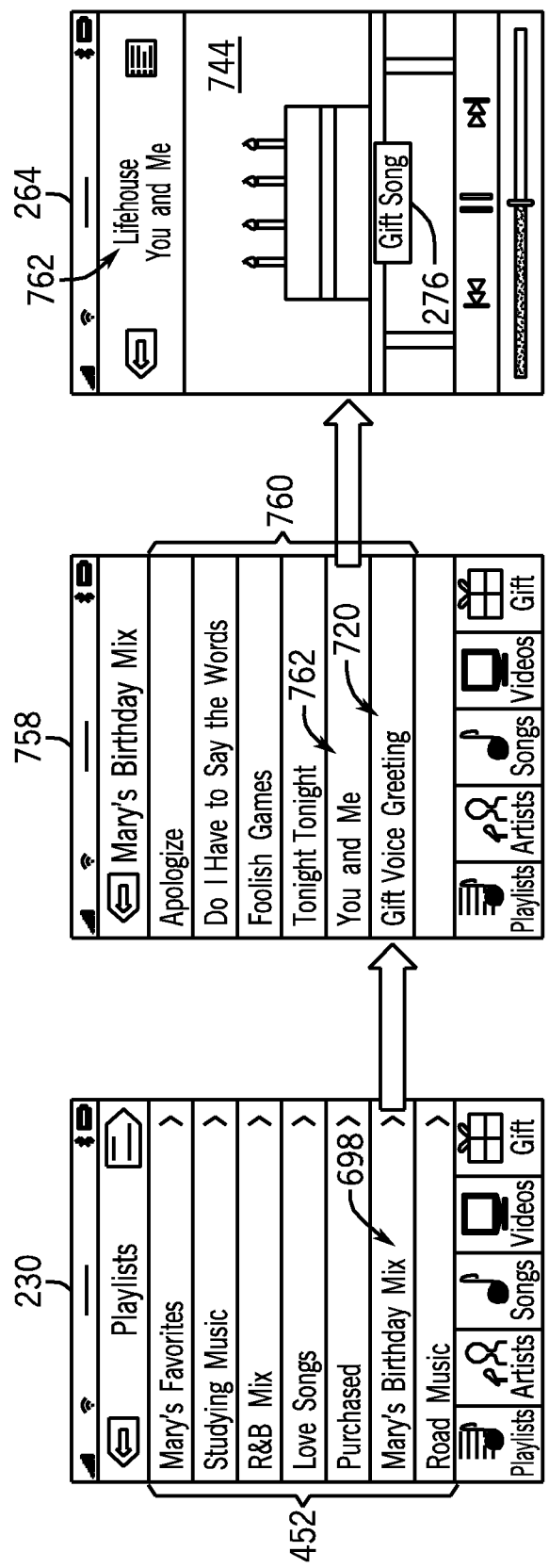
FIG. 22 shows a plurality of screen images for playing back media files associated with the gifted playlist described in FIGS. 21A-21D.

Referring now to FIG. 22, a plurality of screen images is provided depicting the playback of a media file from the gifted playlist 698 on the giftee device 282. For example, after receiving the gifted playlist 698, the giftee may initiate the media player application 36 on the giftee device 282. As discussed above, upon being initiated, the media player application 36 may cause the screen 230 to be displayed. The screen 230 may display a listing of playlists presently stored on the giftee device 282, which may include the received gifted playlist 698. As shown here, by selecting the gifted playlist 698, the giftee may navigate to the screen 758 in which the giftee may view a listing, referred to here by the reference number 760, of all media files associated with the gifted playlist 698. It should be noted here that the listing 760 may be identical to the listing 702 provided in FIG. 21A on the gifter device 10, with the addition of the voice greeting 720 recorded by the gifter, as described above with reference to FIG. 21B. Accordingly, the giftee may have the option of listening to the voice greeting 720 by selecting it from the listing 760.

In the present figure, the giftee may select the music file 762 for playback, thus advancing the giftee to the screen 264. As shown here, the screen 264, during the playback of the music file 762, may display the image 744 acquired by the gifter, as described in FIG. 21C, and sent as a gift image along with the gifted playlist 698. It should be understood that the displaying of the personalized image 744 may be a default setting associated with the gifted playlist 698, and that the giftee may choose to configure the media player application to display an alternate image, such as an album cover, associated with the selected playback file 762. Further, if multiple images are provided with the gifted playlist 698 (e.g., a slideshow), the device 282 may display the slideshow of multiple images, such as during the playback of files from the gifted playlist 698.

The giftee may have the option of gifting individual music files from the gifted playlist 698, such as by selecting the graphical button 276 on the screen 264. The giftee may also have the option of gifting the entire gifted playlist 698, to additional users if so desired, using the playlist gifting techniques described with reference to FIGS. 21A-21D. As can be appreciated, further gifting of the playlist 698 by the giftee may replacing the personalized components (e.g., image 744 and voice greeting 720) selected by the gifter and received by the giftee with personalized components selected by the giftee.

Figure 23:
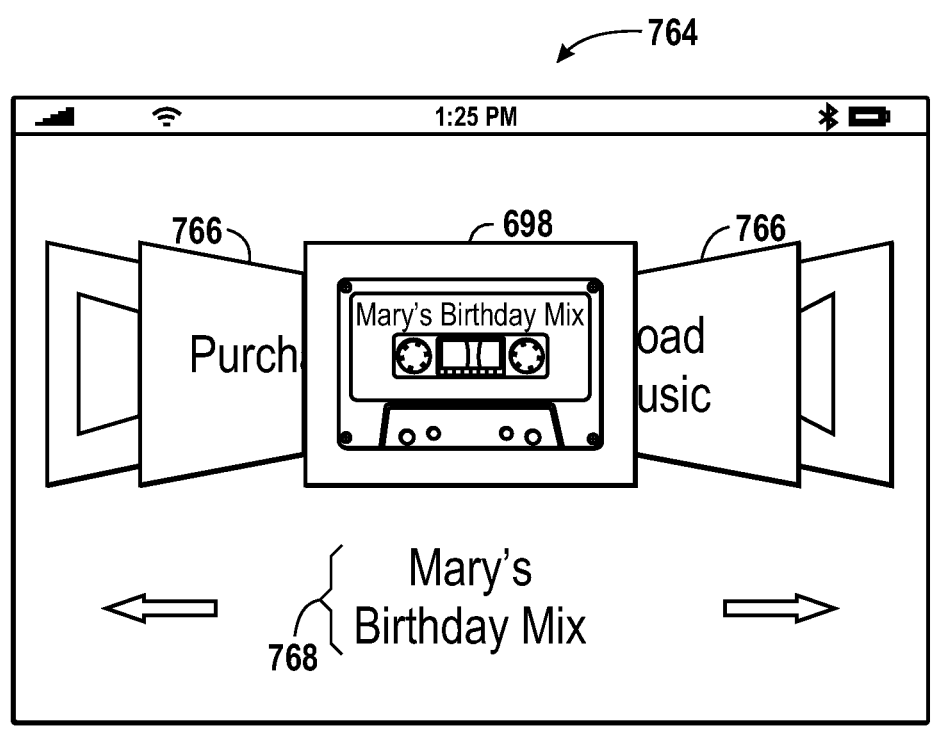
FIG. 23 shows a screen image depicting a graphical user interface for navigating and selecting the gifted playlist of FIG. 22.

As can be appreciated, each of the devices 10 and 282 may include various user interface techniques allowing for a user of the device to select media, such a playlist of song files, for playback using the media player application 36. In certain embodiments, an electronic device may include one or more accelerometers configured to register a change in device orientation. For example, when a device (e.g., 10 or 282) displaying the screen 230 of FIG. 22 is turned sideways by a user, the accelerometer may detect the change in the orientation of the device and cause the device to display the screen 764 illustrated in FIG. 23. As shown in the FIG. 23, the screen 764 may display each the items in the listing 452 as a selectable image, represented by the reference numbers 766. For example, by moving an object (e.g., a stylus) or a finger across the screen 764, a user may easily navigate through the playlists stored on the device. As the user navigates through the selectable images 766, the label or name associated with the playlist represented by the selectable image may be displayed, as indicated by the reference number 768. Thus, by navigating the selectable images 766, the user (in the case the giftee) may select the gifted playlist 698 from FIG. 22. By way of example only, the user interface technique depicted in FIG. 23 may be provided using the Cover Flow format by Apple Inc. Additionally, it should be understood that by turning the device 282 upright, the user (e.g., the giftee) may navigate back to the screen 230 of FIG. 22.

Additionally, it should be understood that the gifting of either the playlist 698 or any of the media files provided in the listing 760 by the giftee to additional users of the online digital media provider 92, may be performed using any of the media gifting techniques described in the present disclosure. Further, while the implementations provided here by way of example in the present disclosure have discussed the gifting of music files, it should be appreciated that the media gifting techniques disclosed herein may be applicable to any suitable type of digital media files, including video files, e-books, audiobooks, podcasts, copyrighted images, video games, or the like. Further, as mentioned above, the present techniques may also be applicable for the gifting of software applications and programs. By way of example, such software applications may be purchased from App Store®, provided by Apple, Inc., and subsequently gifted to other users having accounts associated with App Store® in accordance with one or more of the presently disclosed techniques.

Additionally, as shown in presently illustrated implementations of the present disclosure, the various gifting functionalities discussed herein may be provided by way of the media player application 36 in conjunction with the store interface application 34 associated with the online digital media provider 92. The applications may be stored on a device in accordance with embodiments of the present disclosure. Indeed, the applications 34 and 36 may include encoded instructions stored on one or more machine readable media, such as on the storage device 54, and configured to be executed by the processor 50 to provide for one or more of the functionalities of the device 10 discussed above. Additionally, it should be appreciated that the applications 34 and 36 may also include encoded instructions defining the various graphical screen images and user interface functions discussed throughout the present disclosure. However, it should also be understood that the functionalities set forth and described in the above figures may be achieved using a wide variety graphical elements and visual schemes, and that the present invention is not intended to be limited to the precise user interface conventions depicted above.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for using a first device operable by a first user to gift one or more digital media files to a separate second device operable by a second user comprising:

transmitting a gift offer from the first device to gift the one or more digital media files to the second device;
receiving an acceptance of the gift offer from the second device using the first device; and
after receiving the acceptance of the gift offer, transmitting a gift request from the first device to a separate external server associated with an online digital media provider and configured to, based upon the gift request, authorize the creation of a gift file corresponding to each of the one or more digital media files for transmission from the external server to the second device.

2. The method of claim 1, wherein the gift offer is transmitted and the acceptance is received using a communication interface on the first device configured to establish a communication path with a communication interface on the second device.

3. The method of claim 2, wherein the communication interfaces comprise near-field communication (NFC) interfaces, and wherein the communication path comprises an NFC path.

4. The method of claim 1, wherein the gift request comprises information identifying at least the account belonging to the first user and an account belonging to the second user, the accounts being associated with the online digital media provider, and wherein the authorization to create the gift file corresponding to each of the one or more digital media files includes charging a payment to the account belonging to the first user.

5. The method of claim 1, wherein the one or more digital media files comprise at least one of a music file, a video file, an electronic book file, a software application file, or an audio book file, or any combination thereof.

6. The method of claim 1, wherein the one or more digital media files comprise a plurality of digital media files defining a playlist on the first device.

7. The method of claim 6, comprising adding at least one personal component to the playlist, wherein adding the at least one personal component comprises the addition of a personal voice greeting or a personalized image, or any combination thereof.

8. An electronic device comprising:
a processor;
a first communication interface being configured to establish a first communication path with a communication interface on a separate device; and
a memory device communicatively coupled to the processor and configured to store an application executable by the processor, the application being configured to cause the electronic device to transmit an offer to gift one or more digital media files to the separate device, receive a transmission of an acceptance of the offer from the separate device, and transmit a gift request to a separate external server associated with an online digital media provider, wherein the transmission of the gift request causes the external server to authorize the creation of a gift file corresponding to each of the one or more digital media files for transmission from the external server to the separate device;
wherein the offer is transmitted from the electronic device directly to the separate device without being routed through the separate external server, and wherein the transmission of the acceptance of the offer is received by the electronic device directly from the separate device without being routed through the separate external server.

9. The electronic device of claim 8, wherein the offer is transmitted from the electronic device to the separate device and the acceptance is received on the electronic device from the separate device using the first communication interface on the electronic device.

10. The electronic device of claim 9, wherein the first communication interface comprises an NFC interface, and wherein the first communication path comprises an NFC path.

11. The electronic device of claim 9, comprising a second communication interface configured to establish a second communication path with a communication interface on the external sever, wherein the gift request is transmitted from the electronic device to the external server using the second communication interface.

12. The electronic device of claim 11, wherein the second communication interface comprises a local area network (LAN) interface, a wireless LAN interface, or a wide area network (WAN) interface, or any combination thereof.

13. The electronic device of claim 8, comprising a recording device or an imaging device, or both, wherein the recording device is configured to record a voice greeting that may be included with the gifted digital media file, and wherein the imaging device is configured to acquire an image that may be included with the gifted digital media file.

14. One or more non-transitory tangible computer-readable storage media having instructions coded thereon for execution by a processor of a first electronic device, the instructions comprising:
    code to cause the transmission of a gift offer from the first electronic device to a second electronic device to initiate the gifting of a digital media file from the first electronic device to the second electronic device;
    code to determine on the first electronic device receipt of an acceptance of the gift offer by the second electronic device;
    code to cause the transmission of a gift request based on the gift offer from the first electronic device to an external server of an online digital media provider, the external server being configured to authorize the generation of a gift file corresponding to the digital media file and transmit the gift file to the second electronic device; and
    code to cause the transmission of the gift offer and the transmission of the acceptance of the gift offer directly between the first and second electronic devices without being transmitted through the external server.

15. The one or more tangible computer-readable storage media of claim 14, comprising:
    code to activate a first communication interface on the first electronic device;
    code to establish a first communication path between the first electronic device and the second electronic device using the activated communication interface on the first electronic device.

16. The one or more tangible computer-readable storage media of claim 15, wherein the communication interface on the first electronic device comprises a near-field communication (NFC) interface, and wherein the first communication path between the first electronic device and the second electronic device comprises a NFC communication path.

17. The one or more tangible computer-readable storage media of claim 16, wherein the code for activating the communication interface on the first electronic device is configured to activate the communication interface when the second electronic device is within sufficient proximity to the first electronic device to establish the NFC communication path.

18. The one or more tangible computer-readable storage media of claim 15, comprising:
    code to activate a second communication interface on the first electronic device; and
    code to establish a second communication path between the first electronic device and the external server.

19. The one or more tangible computer-readable storage media of claim 18, wherein the first and second communication interfaces comprise different types of communication interfaces.

20. The one or more tangible computer-readable storage media of claim 14, wherein the digital media files comprises a music file, a video file, an electronic book file, a software application file, or an audio book file, or any combination thereof.

21. The one or more tangible computer-readable storage media of claim 14 comprising:
    code to activate a recording device of the first electronic device;
    code to initiate the recording of a voice greeting using the recording device;
    code to cause the voice greeting to be stored using a storage device; and
    code to associate the voice greeting with the gift file prior to the gift file being transmitted to the second electronic device.

22. The one or more tangible computer-readable storage media of claim 14 comprising:
    code to activate a image capture device of the first electronic device;
    code to initiate the acquisition of an image using the image capture device; and
    code to associate the acquire image with the gift file prior to the gift file being transmitted to the second electronic device.

23. The method of claim 1, wherein the gift offer is transmitted directly from the first device to the second device without being transmitted through the external server, and wherein the acceptance of the gift offer is received by the first device directly from the second device without being transmitted through the external server.

24. The method of claim 1, wherein an account belonging to a user of the first device is charged for the creation of the gift file after the acceptance of the gift offer is received from the second device and the gift request is transmitted to the separate external server.

* * * * *